US009529724B2

(12) United States Patent
Jannyavula Venkata et al.

(10) Patent No.: US 9,529,724 B2
(45) Date of Patent: *Dec. 27, 2016

(54) LAYERED ARCHITECTURE FOR HYBRID CONTROLLER

(75) Inventors: Sumanth Jannyavula Venkata, Shakopee, MN (US); James David Sawin, Sterling, MA (US); Yunaldi Yulizar, Shakopee, MN (US); Ryan James Goss, Prior Lake, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 570 days.

This patent is subject to a terminal disclaimer.

(21) Appl. No.: 13/543,303

(22) Filed: Jul. 6, 2012

(65) Prior Publication Data

US 2014/0013027 A1    Jan. 9, 2014

(51) Int. Cl.
*G06F 12/08* (2016.01)
*G06F 12/02* (2006.01)
*G06F 3/06* (2006.01)

(52) U.S. Cl.
CPC ......... *G06F 12/0866* (2013.01); *G06F 3/0614* (2013.01); *G06F 12/0246* (2013.01)

(58) Field of Classification Search
CPC .................................................. G06F 12/0866
USPC ......................................................... 711/103
See application file for complete search history.

(56) References Cited

U.S. PATENT DOCUMENTS

| 4,899,230 A | 2/1990 | Sherritt |
| 5,274,768 A | 12/1993 | Traw et al. |
| 5,420,998 A | 5/1995 | Horning |
| 5,644,789 A * | 7/1997 | Matthews ............ G06F 13/126 710/36 |
| 6,339,811 B1 | 1/2002 | Gaertner et al. |
| 6,549,992 B1 | 4/2003 | Armangau et al. |
| 6,571,318 B1 | 5/2003 | Sander et al. |
| 6,948,015 B2 | 9/2005 | Ogasawara et al. |
| 6,976,147 B1 | 12/2005 | Isaac et al. |
| 7,181,578 B1 | 2/2007 | Guha et al. |

(Continued)

FOREIGN PATENT DOCUMENTS

EP    1890236    2/2008

OTHER PUBLICATIONS

2000, Hallnor et al., "A Fully Associative Software-Managed Cache Design", ISCA '00 Proceedings of the 27th Annual International Symposium on Computer Architecture, 2000, pp. 107-116.

(Continued)

*Primary Examiner* — Prasith Thammavong
*Assistant Examiner* — Kenneth Tsang
(74) *Attorney, Agent, or Firm* — Hollingsworth Davis, LLC

(57) ABSTRACT

Approaches for implementing a controller for a hybrid memory that includes a main memory and a cache for the main memory are discussed. The controller comprises a hierarchy of abstraction layers, wherein each abstraction layer is configured to provide at least one component of a cache management structure. Each pair of abstraction layers utilizes processors communicating through an application programming interface (API). The controller is configured to receive incoming memory access requests from a host processor and to manage outgoing memory access requests routed to the cache using the plurality of abstraction layers.

10 Claims, 32 Drawing Sheets

(56) References Cited

U.S. PATENT DOCUMENTS

| | | | |
|---|---|---|---|
| 7,305,526 B2 | 12/2007 | Benhase et al. | |
| 7,613,876 B2 | 11/2009 | Bruce et al. | |
| 7,769,970 B1 | 8/2010 | Yeh et al. | |
| 7,836,259 B1 | 11/2010 | Filippo et al. | |
| 7,979,631 B2 | 7/2011 | Ahn et al. | |
| 7,996,642 B1 | 8/2011 | Smith | |
| 8,015,360 B2 | 9/2011 | Hong et al. | |
| 8,032,700 B2 | 10/2011 | Bruce et al. | |
| 8,180,964 B1 | 5/2012 | Koh et al. | |
| 8,195,881 B2 | 6/2012 | Bohn et al. | |
| 8,341,339 B1 | 12/2012 | Boyle et al. | |
| 8,489,820 B1* | 7/2013 | Ellard | G06F 12/0246 711/120 |
| 8,583,879 B2 | 11/2013 | Na et al. | |
| 2002/0002655 A1 | 1/2002 | Hoskins | |
| 2002/0176430 A1 | 11/2002 | Sangha et al. | |
| 2003/0105937 A1 | 6/2003 | Cooksey et al. | |
| 2003/0105938 A1 | 6/2003 | Cooksey et al. | |
| 2003/0105940 A1* | 6/2003 | Cooksey et al. | 711/203 |
| 2003/0196042 A1 | 10/2003 | Hopeman et al. | |
| 2003/0200393 A1* | 10/2003 | Cornaby | G06F 12/0862 711/118 |
| 2004/0123043 A1 | 6/2004 | Rotithor et al. | |
| 2005/0108491 A1* | 5/2005 | Wong et al. | 711/167 |
| 2005/0114606 A1 | 5/2005 | Matick et al. | |
| 2005/0172074 A1 | 8/2005 | Sinclair | |
| 2005/0198438 A1 | 9/2005 | Aoki | |
| 2006/0184949 A1 | 8/2006 | Craddock et al. | |
| 2006/0248387 A1 | 11/2006 | Nicholson et al. | |
| 2007/0022241 A1 | 1/2007 | Sinclair | |
| 2007/0136523 A1 | 6/2007 | Bonella et al. | |
| 2007/0250665 A1 | 10/2007 | Shimada | |
| 2007/0288692 A1 | 12/2007 | Bruce et al. | |
| 2008/0059694 A1 | 3/2008 | Lee | |
| 2008/0162849 A1 | 7/2008 | Savagaonkar et al. | |
| 2008/0209131 A1 | 8/2008 | Kornegay et al. | |
| 2008/0288751 A1 | 11/2008 | Kocev | |
| 2009/0055595 A1 | 2/2009 | Gill et al. | |
| 2009/0089501 A1* | 4/2009 | Ahn | G06F 12/0862 711/113 |
| 2009/0106481 A1* | 4/2009 | Yang et al. | 711/103 |
| 2009/0157918 A1 | 6/2009 | Jin et al. | |
| 2009/0193193 A1 | 7/2009 | Kern | |
| 2009/0300628 A1 | 12/2009 | Patil et al. | |
| 2010/0023682 A1 | 1/2010 | Lee | |
| 2010/0095053 A1 | 4/2010 | Bruce et al. | |
| 2010/0115172 A1 | 5/2010 | Gillingham et al. | |
| 2010/0217952 A1* | 8/2010 | Iyer | G06F 12/0897 711/209 |
| 2010/0325352 A1 | 12/2010 | Schuette et al. | |
| 2011/0055458 A1 | 3/2011 | Kuehne | |
| 2011/0145489 A1* | 6/2011 | Yu et al. | 711/103 |
| 2012/0191936 A1 | 7/2012 | Ebsen et al. | |
| 2012/0210041 A1* | 8/2012 | Flynn et al. | 711/3 |
| 2012/0266175 A1 | 10/2012 | Zheng | |
| 2012/0311237 A1 | 12/2012 | Park | |
| 2012/0311269 A1 | 12/2012 | Loh et al. | |
| 2012/0317364 A1 | 12/2012 | Loh | |
| 2013/0024625 A1 | 1/2013 | Benhase et al. | |
| 2013/0179486 A1 | 7/2013 | Lee et al. | |
| 2013/0191601 A1* | 7/2013 | Peterson | G06F 12/0893 711/137 |
| 2013/0212319 A1 | 8/2013 | Hida et al. | |
| 2013/0246688 A1 | 9/2013 | Kanno et al. | |
| 2013/0268728 A1* | 10/2013 | Ramanujan et al. | 711/105 |
| 2013/0339617 A1 | 12/2013 | Averbouch et al. | |
| 2014/0013025 A1 | 1/2014 | Jannyavula Venkata et al. | |
| 2014/0013026 A1 | 1/2014 | Jannyavula Venkata et al. | |
| 2014/0013027 A1 | 1/2014 | Jannyavula Venkata et al. | |
| 2014/0013047 A1 | 1/2014 | Sawin et al. | |
| 2014/0013052 A1 | 1/2014 | Sawin et al. | |
| 2014/0013053 A1 | 1/2014 | Sawin et al. | |
| 2014/0207997 A1 | 7/2014 | Peterson et al. | |
| 2014/0241092 A1 | 8/2014 | Ha | |
| 2014/0281134 A1 | 9/2014 | Eitan et al. | |
| 2015/0033226 A1 | 1/2015 | Phelan et al. | |
| 2015/0058525 A1 | 2/2015 | Venkata | |
| 2015/0058526 A1 | 2/2015 | Venkata | |
| 2015/0058527 A1 | 2/2015 | Venkata | |
| 2015/0058683 A1 | 2/2015 | Venkata et al. | |

OTHER PUBLICATIONS

2007, Ahmadi et al., "A Cache Architecture for Counting Bloom Filters", 15th IEEE International Conference on Networks, 2007, pp. 218-223.
Apr. 25, 2014, File History for U.S. Appl. No. 13/542,990.
Apr. 25, 2014, File History for U.S. Appl. No. 13/543,123.
Apr. 25, 2014, File History for U.S. Appl. No. 13/543,036.
Jan. 23, 2015, File History for U.S. Appl. No. 13/542,990.
Jan. 23, 2015, File History for U.S. Appl. No. 13/543,123.
Jan. 23, 2015, File History for U.S. Appl. No. 13/543,036.
Jan. 23, 2015, File History for U.S. Appl. No. 13/543,079.
Jan. 23, 2015, File History for U.S. Appl. No. 13/543,100.
Jun. 5, 2015, File History for U.S. Appl. No. 13/543,079.
Sep. 21, 2015, File History for U.S. Appl. No. 13/542,990.
Sep. 21, 2015, File History for U.S. Appl. No. 13/543,123.
Sep. 21, 2015, File History for U.S. Appl. No. 13/971,770.
Feb. 4, 2016, File History for U.S. Appl. No. 13/543,079.
Feb. 4, 2016, File History for U.S. Appl. No. 13/971,770.
Feb. 4, 2016, File History for U.S. Appl. No. 13/971,773.
Feb. 4, 2016, File History for U.S. Appl. No. 13/971,778.
Feb. 4, 2016, File History for U.S. Appl. No. 13/542,990.
Feb. 4, 2016, File History for U.S. Appl. No. 13/543,036.
Feb. 4, 2016, File History for U.S. Appl. No. 13/543,123.
Feb. 4, 2016, File History for U.S. Appl. No. 13/543,100.
Mar. 29, 2016, Office Action dated Mar. 29, 2016 for U.S. Appl. No. 13/971,778, 22 pages.
Aug. 16, 2016, File History for U.S. Appl. No. 13/971,778.
Aug. 2, 2016, File History for U.S. Appl. No. 13/542,990.

* cited by examiner

LAYERED ARCHITECTURE FOR HYBRID CONTROLLER

SUMMARY

Embodiments described herein involve a controller for a hybrid memory that includes a main memory and a cache for the main memory. The controller comprises a hierarchy of abstraction layers, wherein each abstraction layer is configured to provide at least one component of a cache management structure. Each pair of abstraction layers utilizes processors communicating through an application programming interface (API). The controller is configured to receive incoming memory access requests from a host processor and to manage outgoing memory access requests routed to the cache using the plurality of abstraction layers.

These and other features and aspects of the various embodiments disclosed herein can be understood in view of the following detailed discussion and the accompanying drawings.

DETAILED DESCRIPTION

Some memory devices use at least two types of memory in a hybrid or tiered memory system, where at least one type of memory is used as a main memory and at least one other type of memory is used as a secondary. The main memory may have greater storage capacity but slower access times than the secondary memory, for example. In such cases, the secondary memory may serve as a cache for data accesses to and from the main memory. One example of such a tiered memory device is a hybrid drive, in which the main memory may comprise nonvolatile memory such as magnetic disk, magnetic tape, and/or optical disk and the cache may also be memory such as solid state flash memory. In some implementations a first cache and a second cache may be used, wherein the second cache is flash memory and the first cache comprises memory, e.g., dynamic random access memory (DRAM). Note that the terms "main", "primary", "secondary", "first", and "second" are used herein to denote differences in memory (e.g., usage, capacity, performance, memory class or type, etc.) and not necessarily order or preference. Furthermore, although many examples provided herein refer to the main memory as magnetic disk and to the cache as flash and/or DRAM or to some types of memory as "volatile" and others as "nonvolatile", these designations are used to facilitate explanation and the disclosed approaches are applicable to any types of memory.

Embodiments described herein involve layered architectures for hybrid memory controllers. The layered architectures include a hierarchy of abstraction layers wherein each abstraction layer configured to provide at least one component of a cache management structure. Each pair of abstraction layers is implemented using processors (at least one processor per layer) that communicate through an application programming interface (API). The hybrid controller is configured to receive incoming memory access requests from a host processor and to manage various types of memory access requests routed through the hierarchy abstraction layers to the cache.

The term "abstraction layer" in the context of various embodiments denotes a module configured to do some portion of the work involved in managing the hybrid memory cache. "Hierarchy of abstraction layers" refers to a plurality of abstraction layers arranged from a higher level that communicates with a host processor to a lower level that communicates with a flash memory. Each pair of layers in the abstraction layer hierarchy is communicatively coupled using an application programming interface that comprises a set of requests that can be issued from one layer to the next layer in the hierarchy. A layer receives requests from the layer above it in the hierarchy and issues requests to the layer below it in the hierarchy.

Figure 1A:
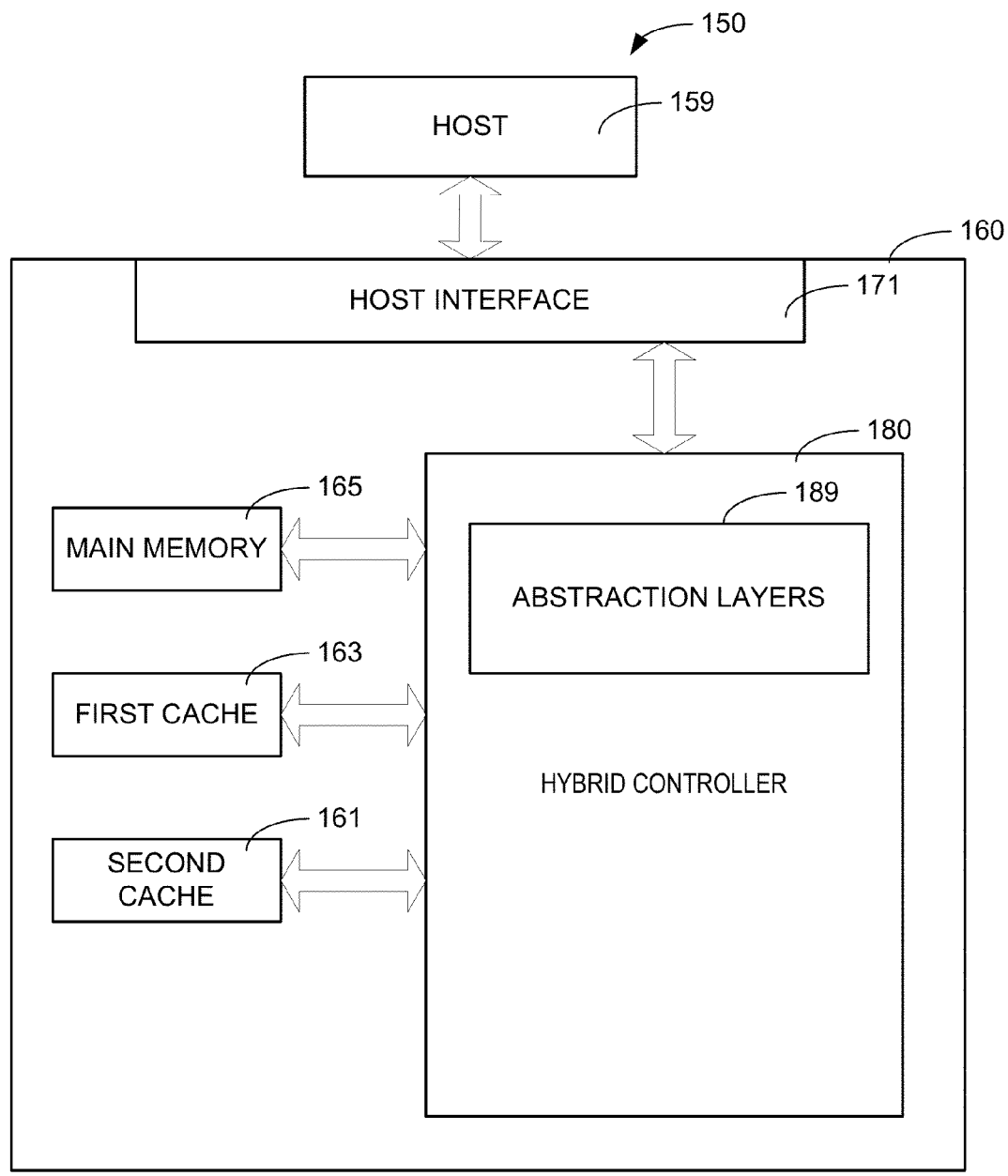
FIG. 1A is a block diagram of a hybrid memory system configured to manage memory access requests in accordance with some embodiments.

FIG. 1A is a diagram of a system 150 that includes a hybrid memory 160 comprising a number of memory components including a main memory 165, a first cache 163 and a second cache 161. The hybrid memory 160 is coupled to a host processor 159 through a host interface 171. The host interface 171 communicatively couples the host processor 159 to a hybrid controller 180. The first cache 163 and the second cache 161 can be configured to temporarily store data to enhance throughput to the main memory 165. The main memory 165 includes a memory space that corresponds to a number of memory sectors, each sector addressable using a unique a logical block address (LBA). The sectors of the main memory 165 are directly accessible by the host 159 using the LBAs, and thus the corresponding LBAs of the main memory are referred to herein as host LBAs.

The host 159 sends memory access requests to the hybrid drive 160 to read or write data. The memory access requests may specify a host LBA range used for the operation of the memory access request. For example, a memory access request from the host 159 may request that a host LBA range be written to the hybrid drive 160 and/or a memory access request may request that a host LBA range be read from the hybrid drive 160. The memory access requests are managed by the hybrid controller 180 to cause data to be written to and/or read from the hybrid drive with optimal efficiency. The second cache 161 in this example may optionally be read-only, in that only data marked for read operations by the host 159 are placed in the second cache 161. In such a configuration, data marked for writing are sent directly to the main storage 165, either directly or via the first cache 163.

According to some embodiments, the hybrid drive may be implemented as a hierarchy of abstraction layers 189. Pairs of the abstraction layers are communicatively coupled through application programming interfaces (APIs). The organization of the hybrid controller 180 into abstraction layers to some extent allows each layer to work relatively independently and/or can reduce potential conflicts that arise from processing multiple threads of execution. For purposes of discussion, some examples provided below are based on the use of a magnetic disk as the main memory, dynamic random access memory as the first (or primary) cache, and solid state flash memory as the second (or secondary) cache. It will be apparent to those skilled in the art that the various memory components are not restricted to these types of memory and may be implemented using a wide variety of memory types.

In some configurations, the cache 161 may be configured as a secondary cache, being faster and smaller than the main storage 165. The cache 163 can be a primary cache, being faster and smaller than the secondary cache 161 which may (or may not) be nonvolatile. Generally, the terms "primary" and "secondary" or "first" and "second" refer generally to hierarchy of time and/or priority relative to commands received via the host interface 171. For example, current read/write requests from the host 159 may be processed first via the primary cache 163 (e.g., identified by the data's logical block address). This enables host commands to complete quickly should the requested data be stored in the primary cache 163. If there is a miss in the primary cache 163, the requested data may be searched for in the secondary cache 161. If not found in either, requested data may be processed via the main storage 165.

Some of the data stored in the primary cache 163 may either be copied or moved to the secondary cache 161 as new requests come in. The copying/movement from primary cache 163 to secondary cache 161 may also occur in response to other events, e.g., a background scan. Both copying and moving involve placing a copy of data associated with an LBA range in the secondary cache, and moving may further involve freeing up some the LBA range in the primary cache for other uses, e.g., storing newly cached data.

Figure 1B:
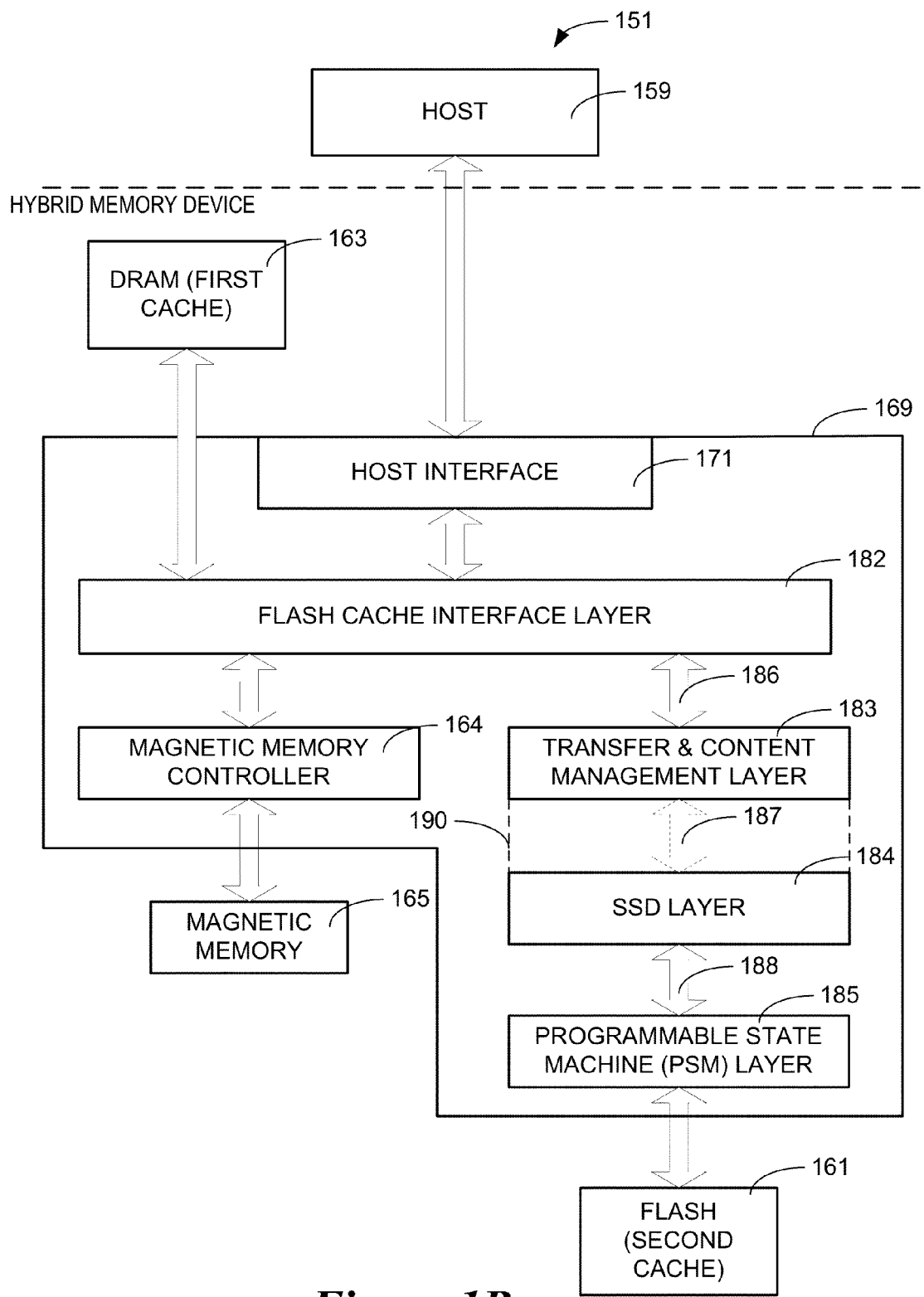
FIG. 1B is a block diagram of a hybrid memory system that includes a magnetic disk as a primary memory and a flash memory as a secondary memory, the hybrid memory system configured to manage memory access requests in accordance with some embodiments.

FIG. 1B illustrates a more detailed version of a system 151 that includes a host processor 159 coupled to a hybrid memory device (also referred to herein as a hybrid drive). The hybrid memory device may include a magnetic memory 165 which serves as the main memory, dynamic random access memory (DRAM) 163 arranged as a first cache, and flash memory 161 arranged as a second cache. The caches 163, 161 generally have faster access and retrieval times than the main memory 165, although generally with less storage capacity. In this configuration, the flash cache 161 acts as a second cache, being faster but smaller than the main memory 165. The second cache is of intermediate size and speed and may be coherent with data in the main memory 165. The DRAM 163 serves as the first cache, being faster but smaller than the flash cache 161. While there is some processing and data transfer overhead in using the one or more caches 163, 161, the faster media used by the cache may enhance overall performance of the apparatus hybrid memory device.

The host processor 159 communicates with the hybrid memory device (also referred to herein as hybrid drive) through a host interface 171. The host interface 171 is responsible for managing transfer of data from the first cache 163 to the host processor 159 As previously discussed, the main memory 165 includes a memory space that corresponds to a number of memory sectors, each sector addressable using a unique a logical block address (LBA). The sectors of the main memory 165 are directly accessible by the host 159 using the LBAs, and thus the corresponding LBAs of the main memory are referred to herein as host LBAs.

The host 159 sends memory access requests to the hybrid drive, for example, the host 159 may request that data be written to and/or read from the hybrid memory device. The host interface 171 is configured to transfer memory access requests from the host 159 to the hybrid memory device and to transfer data between the host 159 and the hybrid memory device.

The hybrid controller 169 illustrated in FIG. 1B includes hierarchy abstraction layers 182, 183, 184, 185 wherein each layer communicates to its nearest neighboring layer(s), e.g., through an application programming interface (API). For example, each layer 182, 183, 184, 185 may only communicate to its nearest neighboring layer(s) without communicating to other layers. As an example, the layer 183 may only communicate directly to layer 184 and layer 182, without communicating directly with the layer 185 or to the host interface 171. As an operation, such as a memory access request from the host 159, is being carried out, each layer is configured to pass control to the next lower layer as the operation is implemented.

The example illustrated in FIG. 1B includes four abstraction layers 182-185 which are described in terms applicable to the use of flash memory as a cache. It will be appreciated that these terms are not restrictive, and if other types of memory were used as the secondary memory, if desired, different terminology could be used to reflect the type of secondary memory. Nevertheless, the basic functions of the layers are similar, regardless of the type of memory used for primary and/or secondary memory, and/or the terminology used to describe the layers.

The layers illustrated in FIG. 1B include: the flash cache interface (FCI) layer 182; the flash cache control and transfer management (FCTM) layer 183; the solid state drive (SSD) layer 184; and the programmable state machine (PSM) layer 185. Requests may be passed using APIs represented by arrows 186, 187, 188 from a higher layer to the next lower layer, for example, requests from the FCI layer 182 are sent to FCTM layer 183, requests from the FCTM layer 183 are sent to the SSD layer 184, and requests from the SSD layer 184 are sent to the PSM layer 185 which interacts directly with the flash memory 161. The layered architecture of the hybrid controller 169 described herein allows for handling host memory access requests which can be serviced from either the magnetic memory 165 or one of the caches 163, 161 The layered structure used in conjunction with the flash cache 161 can be configured to achieve specified rates and response times for servicing memory access requests.

The FCI layer 182 implements processes to determine which data should be promoted to the flash cache 161 and/or the DRAM cache 163 based on various criteria to achieve optimal workload for the hybrid drive. The FCI layer 182 decides whether a host read request should be serviced from the primary memory or from one of the caches 163, 161. If the required read data exists entirely in the first cache 163, the first cache 163 is used as the source for the transfer. If the required data exists entirely in the second cache 161, the second cache 161 is used as the source for the transfer. In order to determine whether a host requested LBA range is fully present in the flash cache 161, a lookup request is issued to the lower layers. All other cases use the main store 165 as the source for a transfer.

In response to write requests, the FCI 182 is responsible for generating invalidate requests to the lower layers to indicate that the cached data is no longer current. In response to flash cache misses, the FCI 182 determines whether the data retrieved from the main store 165 into the first cache 163 needs to be promoted to the flash cache 161. In order to make this decision, a hotness tracking algorithm, e.g., using a Bloom Filter, may be used. If data is determined to be hot, a promotion request is issued to the lower layers. The FCI layer 182 may implement read look ahead and/or read on arrival optimizations that cause additional data to be fetched into the DRAM 163. The FCI 182 includes this data into the promotion request to the second cache 161 to enhance the likelihood of a cache hit in the second cache 161 due to locality in most typical workloads.

The flash content and transfer management (FCTM) layer 183 maintains a mapping, e.g., a fully associative mapping as discussed below, of the host LBAs to a memory space corresponding to the flash memory space arranged as LBAs which are referred to as solid state drive (SSD) LBAs. The FCTM layer 183 maintains a mapping of host LBAs to SSD LBAs using a hash table. The mapping is maintained in units of clusters. Host and SSD LBA spaces may be partitioned into equal sized clusters. In some implementations, a fully associative cache is maintained. In response to a lookup request, hash table operations are performed to determine whether the requested host LBA range is completely present in the flash cache 161. In response to read, promotion, and/or invalidate requests, the host LBAs are translated into SSD LBAs and corresponding requests are issued to the SSD layer. FCTM invalidates generate unmap requests (which may also be denoted trim requests) to the SSD layer. Requests are prioritized to reduce host response times by giving reads higher priority than writes (promotes). Overlap checks are performed to ensure data integrity due to out of order processing caused by the prioritization requests.

The SSD layer 184 can abstract the flash 161 as an SSD device. The SSD layer interacts with programmable state machine (PSM) layer 185 and performs tasks such as optimal scheduling of promotion requests among dies of the flash (referred to as die scheduling), wear leveling, garbage collection and so forth. The SSD layer 184 maps the SSD LBAs of the FCTM layer 183 to physical flash locations (die, block and page locations).

The PSM layer accepts requests such as to read, program, and erase flash locations. The PSM layer programs hardware controllers to generate the required signals to read from and write to the flash 161, for example.

Note that in some embodiments, as indicated the broken lies at elements 190 and 187, the functions of the FCTM layer 183 and the SSD layer may be combined into one layer 190 in which case the communication protocol 187 would be unnecessary. The combined abstraction layer 190 would include all the functions of the FCTM and the SSD layers.

In some cases, one or more of the layers 182-185 of the hybrid controller 169 may be implemented by circuitry and/or by one or more processors, e.g., such as reduced instruction set computer (RISC) processors available from ARM. In some cases each layer may be implemented by a separate processor. The processes discussed herein are implementable in hardware (interconnected electronic components that carry out logic operations) and/or by a processor implementing software instructions, and/or by any combination of hardware and software.

Figure 1C:
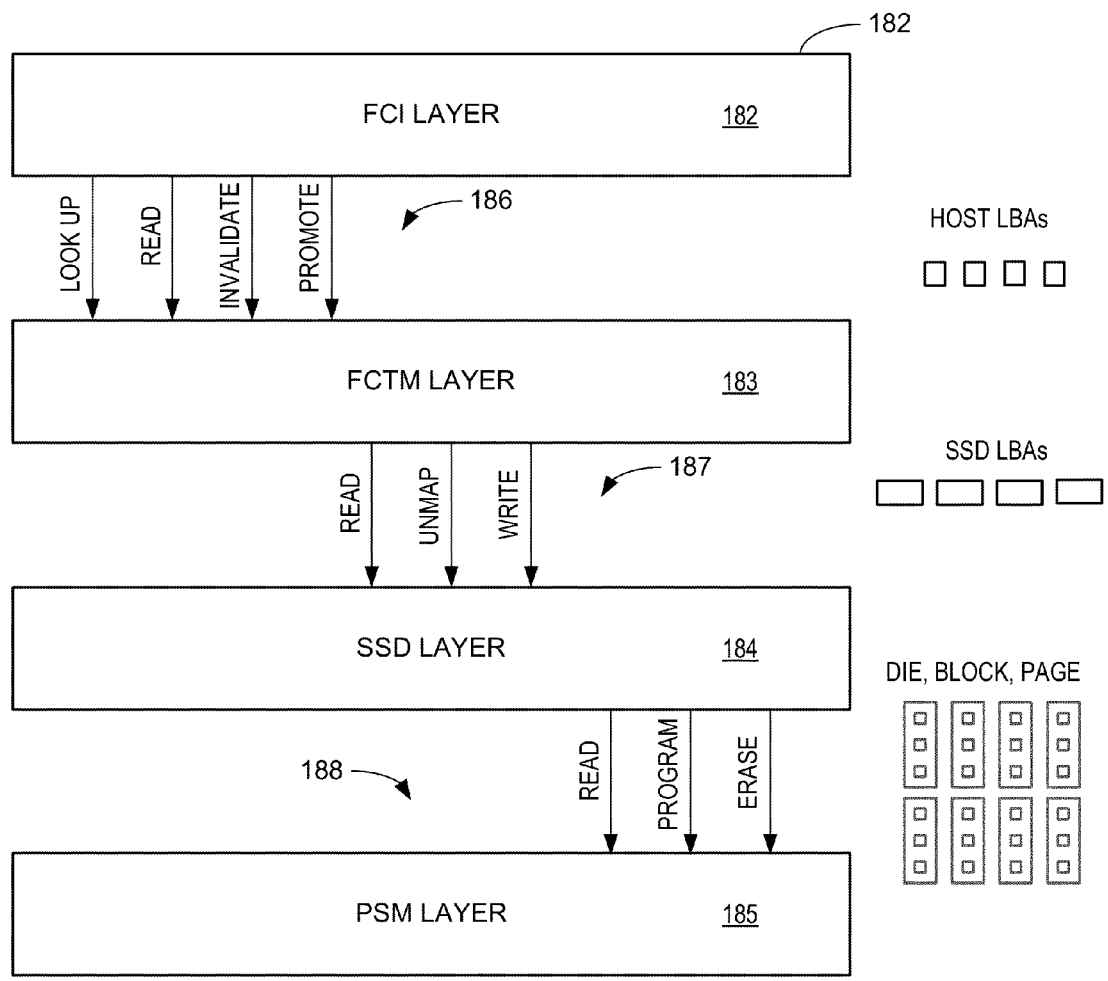
FIG. 1C a view of the FCI, FCTM, SSD, and PSM layers and the request sets for the FCI to FCTM and FCTM to SSD and SSD to PSM layer interactions according to some embodiments.

FIG. 1C is a view of the FCI, FCTM, SSD, and PSM layers 182-185. Each layer sends requests the next lower layer as indicated by requests sets 186, 187a, 188. The FCI layer sends requests to the FCTM layer that include a range of host LBAs. The set of requests that can be sent from the FCI layer to the FCTM layer include look up (verify that an address range is in the flash), read (read data in an address range from the flash), invalidate (mark an address range as invalid) and promote (promote (write) data in an address range to the flash). FCTM layer maps the host LBAs to SSD LBAs and sends requests to the SSD layer that include SSD LBAs. The set of requests that can be sent from the FCI layer to the FCTM layer include read (read and SSD LBA range from flash), write (write data in an SSD LBA range), and unmap (mark and SSD LBA range as no longer containing valid data). The SSD layer maps the SSD LBAs to flash die, block, and page and sends requests to the PSM layer that include the die, block, and page addresses. The set of requests that can be sent from the SSD layer to the PSM layer include read (read die, block, page addresses from flash), program (program die, block, and page addresses), and erase (erase data from die, block, and page addresses).

Figure 1D:
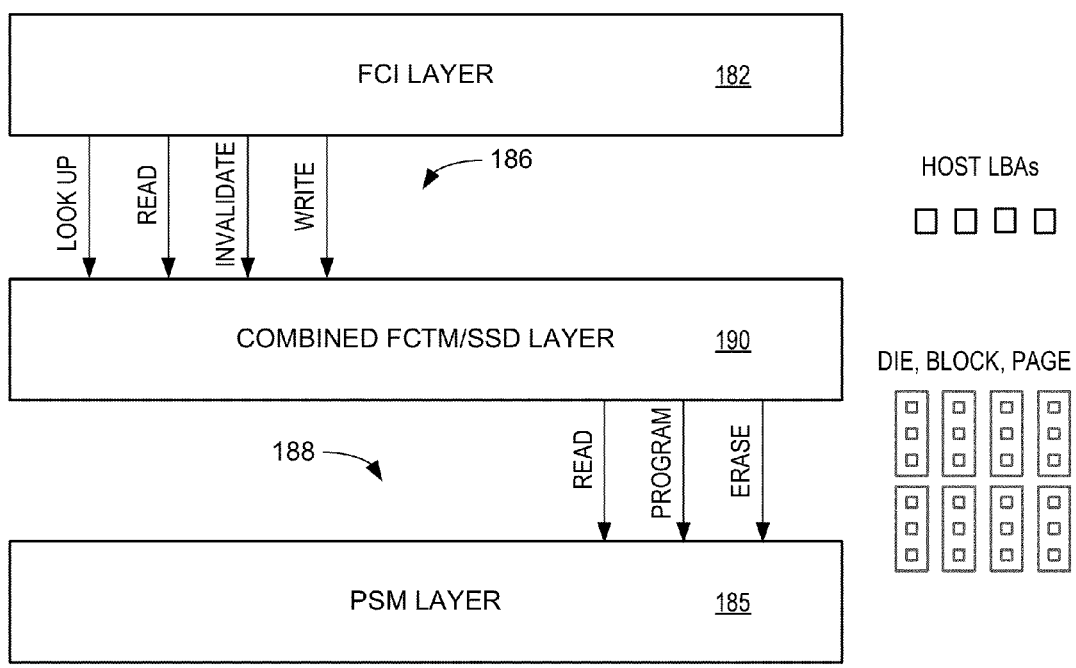
FIG. 1D is a view of FCI, combined FCTM/SSD, and PSM layers and the request sets for FCI to FCTM/SSD and FCTM/SSD to PSM layer interactions according to some embodiments.

FIG. 1D illustrates the scenario in which the functions of the FCTM and SSD layers are combined into one abstraction layer 190. In this hierarchy, the FCI layer 182 communicates with the combined layer 190 through request set 186 that specify host LBA ranges. The combined layer 190 communicates with the PSM layer 185 through request set 188 that specify die, block, and page addresses.

Some examples of the functionality of the FCI layer 182 and FCTM layer 183 are provided below.

Figure 1E:
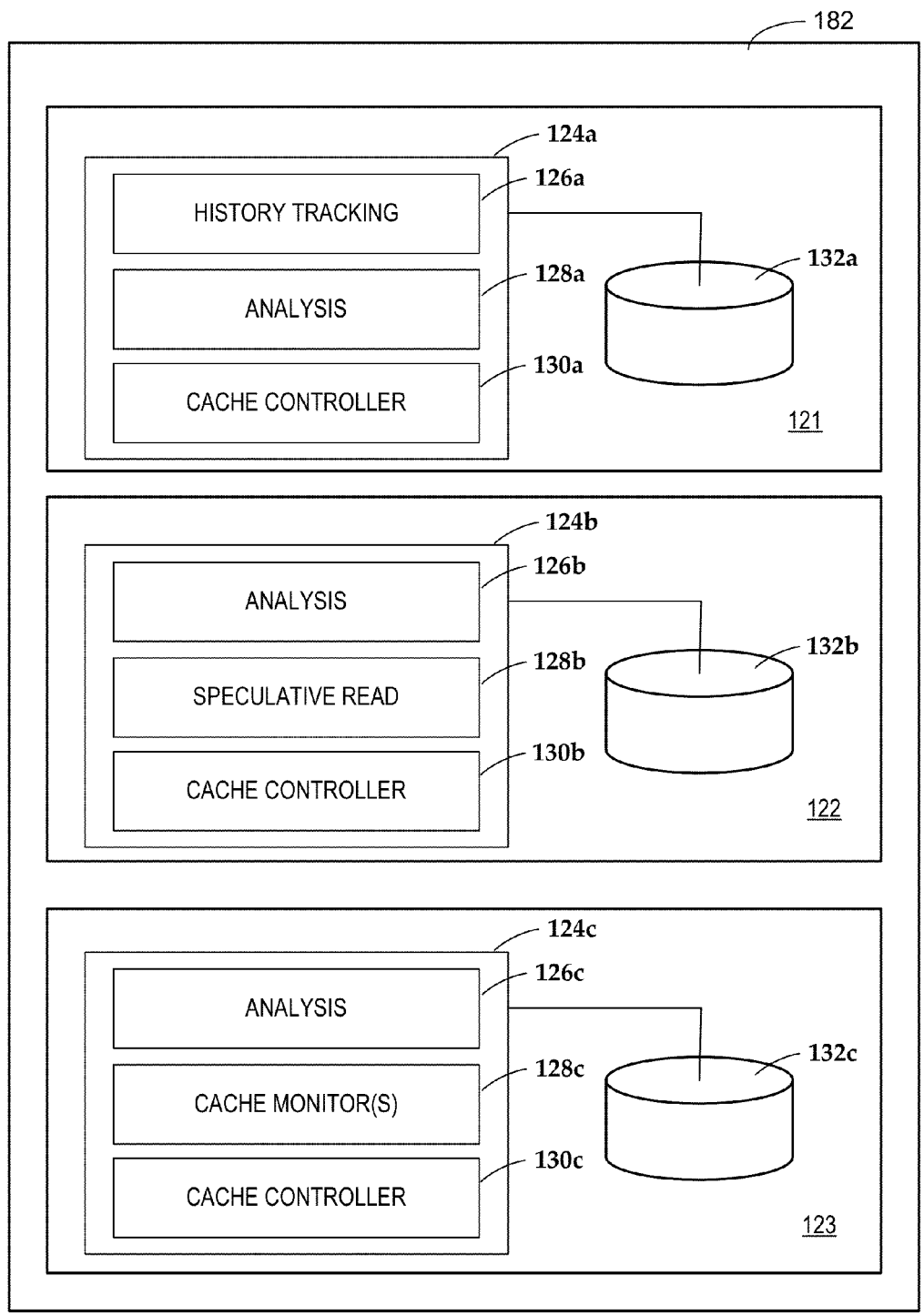
FIG. 1E is a block diagram that illustrates the functionality of the FCI layer in performing related to moving data in and out of the caches according to various embodiments.

FIG. 1E is a block diagram of the FCI layer 182 which may include components 121, 122, 123 that perform various functions related to moving data in and out of the caches 161, 163. These components 121-123 may include any combination of custom logic circuitry, general-purpose processors/controllers, firmware, and software. The components 121-123 may be used individually or in any combination.

Components 121-123 are arranged to implement functions that facilitate movement of data in and out of the caches 161, 163 based on certain metrics, e.g. importance metrics, and/or other situations. Component 121 is arranged to implement functions that facilitate movement of data in and out of the caches 161, 163 based on tracking the history of read operations. Component 122 is arranged to implement functions that facilitate movement of data in and out of the caches 161, 163 based on speculative read operations. Component 123 is arranged to implement functions that facilitate movement of data in and out of the caches 161, 163 based on certain criteria.

Component 121 includes a history tracking module 126*a* that tracks host operations affecting the data storage device, such as host read requests that are received over some period of time. An analysis module 128*a* is configured to determine one or more criteria associated with the host operations. The criteria may be at least indicative of future read requests of certain logical block addresses, such as data that is not yet requested but has a likelihood of being requested in the future. The analysis module 128*a* may be coupled to the history tracking module 126*a* to obtain this information. A caching module 130*a* is configured to cause data from the main storage 165 to be copied to the secondary cache 161 if a particular criterion meets a threshold. The caching module 130*a* may be coupled to at least the analysis module 128*a* to obtain the criterion, other components of the FCI layer 182, FCTM layer 183, and/or host interface 171 to cause these transfers of data to the cache 161. Any combination of the history data, criteria, and current thresholds can be stored in a database 132*a* that is coupled to any of the modules 124*a*, as well as being coupled to other components of the FCI layer 182.

One goal of the secondary cache design is to minimize access to the main storage for read operations that fall within particular access patterns. These patterns may identify some amount of data that is likely to be requested in the future, and which can be move to the secondary cache before it is requested. For example, some host data operations such as the reading of a commonly used file, may involve predictable data access patterns (e.g., sequential data reads over contiguous address ranges, repeated access to a particular range of addresses) and so may benefit from secondary caching. Other operations, such as benchmarking tests or updating random pages of virtual memory, may not benefit from secondary caching. For example, the overhead incurred in moving small blocks data in and out of the secondary cache may override any improvement in data transfer speed provided by the cache.

The embodiments described below may retrieve host-requested data from a secondary cache to avoid overhead in retrieving data from the main storage media. The data may be selected for storage into the secondary cache based on, among other things, a likelihood of being hit on a read request after a miss in the primary cache. As such, data in the secondary cache may be selected to avoid overlap with valid data on the primary cache. The data may also be selected so as to avoid data that can be predicted as conforming to a "raw" access pattern from the main store, e.g., 100% sequential or random reads. A 100% sequential read may be serviced nearly as efficiently from the main store, and/or may be the type of data that has low likelihood of being re-requested (e.g. streaming media). A 100% random read may also have low likelihood of LBAs being requested again, and so the overhead of caching large amounts of random LBAs may offset any benefit in the off-chance a previously requested LBA is requested again.

The embodiments described herein have features that may be configured for use under enterprise workloads. Computing resources of enterprise servers may be heavily utilized. For example, processors, disks, network interfaces, etc., of an enterprise server may be used at steady, relatively high activity levels for long periods of time. As this pertains to persistent data storage access, it has been found that for enterprise workloads, it may be better to cache read data than write data, and may also be better to cache speculative read data rather than requested read data.

One technique that may be employed to efficiently utilize the secondary cache is to determine a "cache importance metric" to be used as a criterion for whether data should be placed in the secondary cache. This may include data moved from the primary cache to the secondary cache and data moved directly from main storage to the secondary cache. The cache importance metric may use any combination of the following considerations: 1) frequency of recent host read requests for an LBA; 2) spatial distribution of recent host read LBA counts; 3) predicted disk access penalty for LBA cache miss; and 4) write frequency.

The first consideration noted above, frequency of requests, indicates regions in memory experiencing "hot," activity (e.g., recent, repeated accesses). Hot read activity can, by itself or in combination with other factors, indicate LBAs that may be more likely to be read again. Similarly, the second condition, spatial distribution, relates to how close in the LBA address space (e.g., "spatial locality") recent requests are grouped. Under some conditions, LBAs in or near recent active LBAs ranges may themselves be read in the future. The third condition, disk access penalty, relates to the characteristics of the architecture, such as particulars of the main data store. For example, if a frequently accessed range of LBAs is stored in physically diverse sectors on the main data store (e.g., belonging to a highly fragmented file), it may take longer to retrieve this than similarly accessed data that is stored in a contiguous range of physical sectors. Finally, the fourth consideration, write frequency, can identify data that is less likely to benefit from being in the secondary cache. For example, if the secondary cache only stores read data, the importance metric of an LBA may be reduced based on write activity targeted to the LBA.

Figure 2:
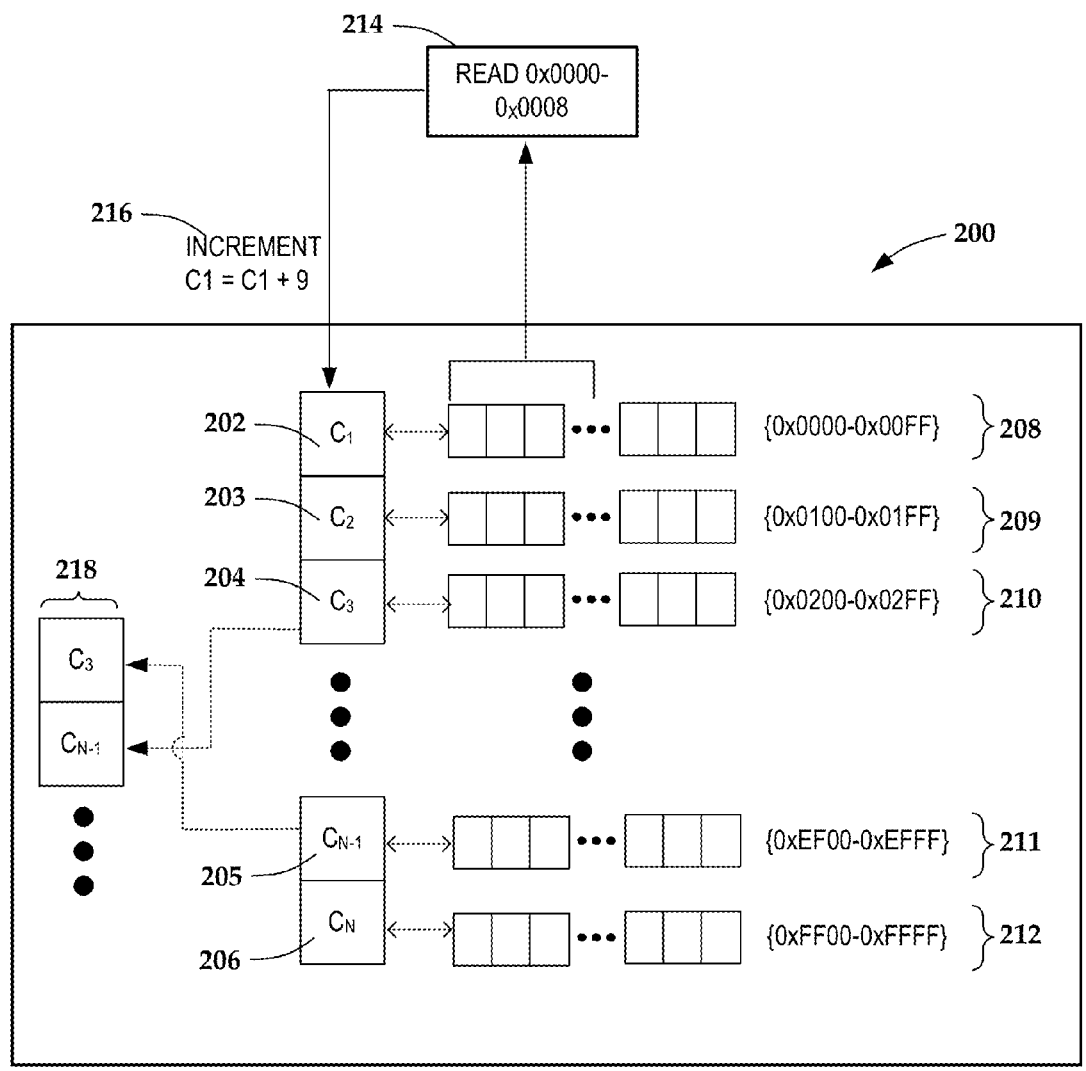
FIG. 2 is a block diagram illustrating a data structure for determining caching criteria for logical block address according to an example embodiment.

An example of determining at least the first and second considerations for particular LBA ranges is shown in the block diagram of FIG. 2. The block diagram illustrates aspects of what is referred to herein as a "zone table" 200. The zone table 200 includes data structures (e.g., table, list, map, set, array, etc.) usable to store a number of entries (e.g., entries 202-206). Each of the entries 202-206 is associated with a range of LBAs, e.g., ranges 208-212, respectively. The entries 202-206 store indicators (e.g., access operation counters) that indicate recent operations affecting the associated LBA ranges 208-212.

In this example, the entries 202-206 accumulate counts of host read requests targeted to the associated LBA ranges 208-212. For example, read request 214 affects a range of nine addresses within range 208, and so counter of entry 202 is incremented 216 by nine in response to the request 214 being fulfilled. The read request 214 may trigger incrementing 216 the count even if the requested LBAs are already stored in the secondary cache. For example, recent levels of activity on secondary cache data may be indicative that uncached neighboring LBAs (e.g., in an adjacent address range) might benefit from caching. Tracking continued activity for secondary cached ranges may also help determine whether those regions should remain in the cache. In the event some data needs to be ejected from the secondary cache, it may be preferable to eject cached data that has exhibited relatively lower levels of recent activity.

The size of the ranges 208-212 may be preconfigured before runtime or determined at runtime. The size of the ranges 208-212 may be set based on characteristics of the primary and/or secondary caches. For example, if the secondary cache organizes cached content into predetermined sized lines, it may be useful to match the size of the ranges 208-212 to the cache line size(s). In this way, cached lines may be treated as a unit in the zone table 200, being moved in and out of the secondary cache based on values of the counter entries 202-206.

Practical considerations may limit the choice of range sizes. For example, if too fine of a granularity is chosen, the zone table 200 might grow to be too large for the available memory. This a trade-off that may be considered when deciding whether to use a zone table 200 or a counting Bloom filter implementation as discussed below. When using a zone table 200, the zones may have relatively large-granularity (e.g., ~1 GB). Counting Bloom filters tend to provide high-granularity tracking using a relatively small amount of memory, while the zone table may perform better with medium-granularity tracking (e.g., on the order of the capacity of the secondary cache).

The caching importance metrics may be based on individual counter entries 202-205, and/or combinations of the counter entries 202-205. For example, activity that occurs on the boundary between two adjacent address ranges 208-212 may not indicate significant activity in either of the ranges compared to activity as a whole. However, if two adjacent ranges 208-212 are considered together in view of other adjacent ranges (e.g., sum of counters 202 and 203 compared to sum of counters 205-206) this may be enough to raise the cache importance metric of the adjacent ranges together as a unit.

A number of the zone table entries 202-206 with the highest counts (e.g., "hot" range of LBAs) may also be linked to a sorted list 218. The list 218 is sorted by access counts, so that "hotness" attributes can be determined quickly. A cache analysis module (e.g., module 128a shown in FIG. 1E) may be able to access this list 218 to assign cache importance metrics to the address ranges 208-212, possibly in combination with other data, such as write request activity targeted to the ranges. The cache importance metric can trigger moving data from the ranges 208-212 in or out of the secondary cache (e.g., via caching module 130a in FIG. 1E) if some threshold is met.

In response to some event, the entire zone table 200 may be decayed, e.g., by dividing all the counts in half. This avoids having the counters saturate their maximum values over time. This may also cause more recent activity to have a greater influence in the sorted list 218. The event that triggers the decay may include any combination of the passage of time, value of one more counter entries 202-206, the sum of the counter entries, etc. Assuming this decay is applied evenly, this should not affect the sorted list 218, because relative magnitude of the entries 202-206 should remain the same right after the entries are decayed. Some aspects of the entries 202-206 or list 218 may be stored elsewhere (e.g., database 132a in FIG. 1E) before the entries 202-206 are adjusted. This enables longer term historical activity to be tracked and analyzed.

The zone table 200 enables determining "hot" zones, e.g., those that are accessed more than most other zones. High spatial locality is detected by the presence of hot zones within particular ranges 208-212 that are not cooling significantly due to recently activity. For example, any of the ranges 208-212 may exhibit brief bursts of high activity over time, but those that sustain high activity over larger time spans (or at least more recently) may be more indicative of spatial locality of the recent activity. The restriction of the activity to a particular range 208-212 (or combination of ranges) provides clues about spatially concentrated activity, which may increase cache importance for those ranges.

The use of a table 200 is only one example of how caching priority metrics may be determined. An alternate embodiment uses counting Bloom filters to track usage, and is shown in the block diagram of FIG. 3, which may be used instead of or in addition to the table mapping shown in FIG. 2. Generally, a Bloom filter is a data structure used to determine whether an element is a member of a set. The conventional Bloom filter may utilize a bit array, all elements of which are initialized to zero. Adding an element to the set involves applying k-hash functions to the element which results in k-bits of the array being set to one. Testing whether an element is a member of the set involves applying the same hash functions to the element, and testing whether all the resulting k-bits are already set to one. If at least one of the bits are not set to one, then the tested element is not in the set. A Bloom filter will always predict correctly if an element is not in a set, however there is a probability of a false positive, i.e., predicting that an element is in the set when it has not been added. The odds of a false positive can be minimized to an acceptable level by selecting Bloom filter parameters, such as the size of the bit array, the number of hashing functions, and the type of hashing functions.

In a conventional Bloom filter, an element cannot be removed from the filter. This is because two or more elements may set the same bit to one, and so changing a bit back to zero risks unintentionally removing other elements from the filter. To resolve this, a counting Bloom filter (CBF) uses an array of counters instead of a bit array to store the hash results. Adding an element to a CBF involves incrementing the counters for the k-hash results instead of changing a bit from zero to one. Checking whether an element is in the CBF set is similar to a conventional Bloom filter, in that each element is checked for a non-zero value for the k-hash value results. Unlike a conventional Bloom filter, an element can be removed in a CBF by decrementing the appropriate counters.

Figure 3:
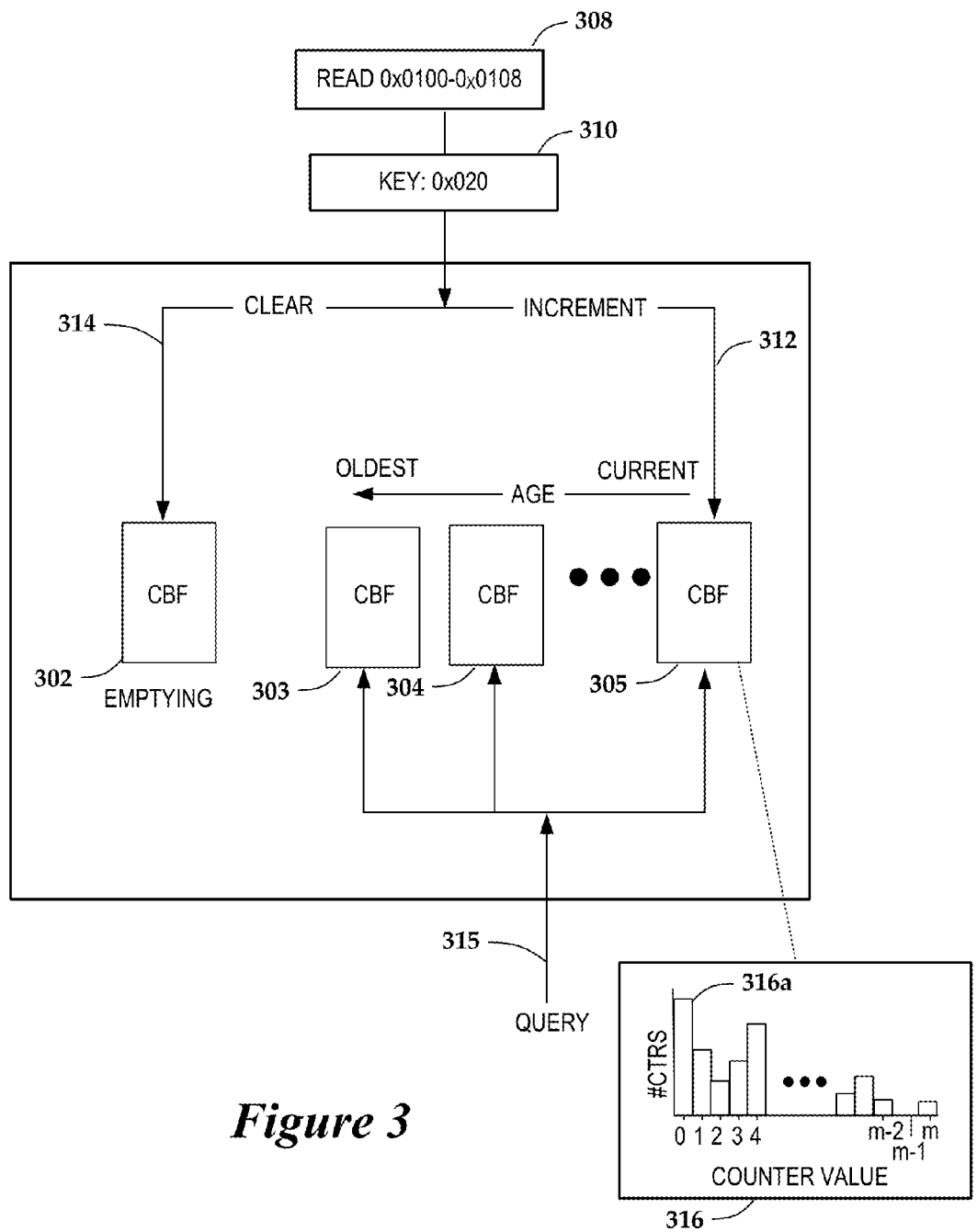
FIG. 3 is a block diagram illustrating a data structure for determining caching criteria for logical block address according to another example embodiment.

In FIG. 3, a collection of time ordered CBFs 302-305 are used to store keys 310 related to LBAs of incoming read requests 308. The key 310 may be an index of LBA ranges, such as an index associated with each of the ranges 208-212 shown in FIG. 2. The key 310 may be dynamically calculated, derived from a lookup, etc. For example, the key may be numeral ranging from value from zero to n−1 for n-LBA ranges. It will be appreciated that multiple keys 310 may be derived from a read request 308, such as where a request spans a range or ranges covered by two or more keys.

When first initialized, all CBFs 302-305 start off empty, and one is designated as the "current" CBF (e.g., CBF 305 in FIG. 3). The new key 310 is added to the current CBF 305 by incrementing 312 each of the counters of the CBF 305 according to the results of the hash values applied on the key 310. This incrementing 312 occurs so long as none of the incremented counters in the CBF 305 are at a maximum value. If so, then the CBF 305 may be move out of the current position, as described below.

When the current CBF 305 reaches a predefined fullness threshold (which may include a counter being at maximum, a total of the counters reaching a threshold, etc.), an empty CBF then becomes current. The fullness threshold may be defined as a maximum number of non-zero counts (e.g. 50% of CBF entries). Whenever the last remaining empty CBF is assigned as current, the oldest non-empty CBF is designated "emptying" (e.g., CBF 302 in FIG. 3). As each key is added by incrementing 312 the current CBF 305, the equivalent (or greater) number of unprocessed counters is cleared 314, if not already clear, in the emptying CBF 302.

A CBF is considered to be "active" if it is not empty and not emptying, e.g., CBFs 303-305 are active in this example. A key 310 is considered to be a member of the host read history if at least one active CBF 303-305 has a non-zero value for all of its hashed counters. A key 310 may also be used to query 315 the active CBFs 303-305, e.g., to see if an LBA or LBA range have exhibited recent activity.

As keys are added to the current CBF 305, a distribution 316 of hashed entry counts for that CBF may be updated. The hash entry distribution 316 tracks the number of hashed entry counters (vertical axis) in the current CBF with a specific count value (horizontal axis). The maximum value m on the horizontal axis may represent the maximum counter value, or some other threshold beyond which the CBF may be retired (e.g., 50% of maximum). The hash entry distribution 316 may be used to determine when the percentage of non-zero counts in the current CBF has exceeded the fullness threshold. Because the hash entry distribution 316 tracks the number of current CBF counts with a value of zero (value 316A), the number of non-zero counts is the total number of counts minus the number of zero counts 316A in the current CBF.

The hash entry distribution 316 may also be used to estimate spatial locality of host reads. When spatial locality is low, then the keys 310 added to the host read history are not repeated very often, and the corresponding hashed entries are evenly distributed. This may be expressed as a percentage (TP %) of non-zero count values that are less than a threshold (LCV). Exact definitions of TP and LCV can be tuned to the specific application. For example, low spatial locality may be defined if 95% of all non-zero hashed counts in the current CBF are less than three (TP %=95% and LCV=3).

The hash entry distribution 316 can give a first-order approximation of whether or not the most recent host reads have low spatial locality. An additional enhancement may be provided by looking not only at the current distribution, but at a distribution history that allows spatial locality trends to be spotted. The distribution history may be updated as each new key is added to the current CBF 305, and captures a partial snapshot of the hash entry distribution 316 at those times. The distribution history need not track a complete distribution of all count values over time, only those that are needed for the spatial locality computation. For example, only the total non-zero counts and the total non-zero counts <LCV may be tracked. A similar tracking of history may be performed with the sorted list 218 shown in FIG. 2.

Figure 4:
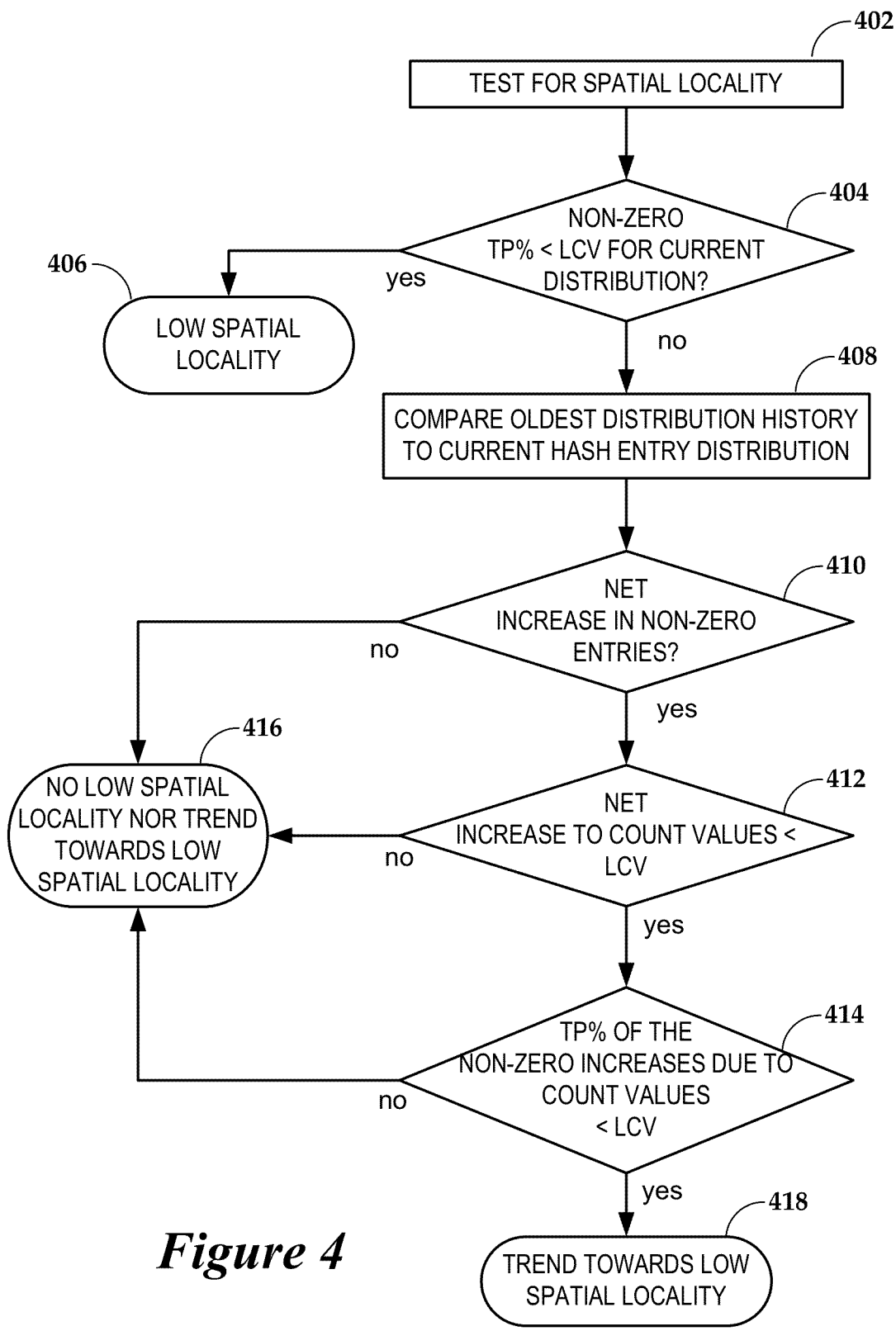
FIG. 4 is a flowchart illustrating a procedure to determine spatial locality using hash entry distribution history according to an example embodiment.

In FIG. 4, a flowchart illustrates an example of how spatial locality may be tested using hash entry distribution history according to an example embodiment. An event triggers a test 402 for low spatial locality, e.g., indicative that there is no closeness between LBA values associated with recent host operations. The test 402 can be triggered, for example, as a criterion for calculating a cache importance metric related to a range of LBAs. The cache importance metric may be evaluated on a regular schedule, in response to host data requests, in response to or preparation for a caching operation, etc.

The test 402 involves determining 404 whether the current hash entry distribution indicates that TP % non-zero count values are <LCV. If this determination 404 is true, then the output 406 of the procedure is low spatial locality. Otherwise, the oldest distribution history entry (or any combination of older histories) is compared 408 to the current hash entry distribution. Using this comparison, three determinations 410-412 are made.

The first determination 410 is whether there been additions causing a net increase in the number of non-zero entries. The second determination 411 is whether those net increases been to count values <LCV. The third determination 412 is whether TP % of the net increases to non-zero counts have been to count values <LCV. If the result of all three determinations 410-412 is "yes," then the output 418 of the procedure is a trend towards low spatial locality. If the result of any of the three determinations 410-412 is "no," there the output 416 of the procedure is that there is not low spatial locality, nor a trend toward it.

Figure 5A:
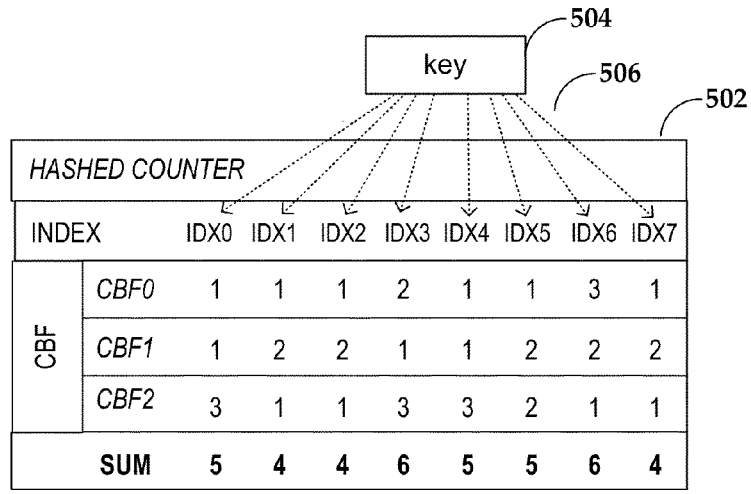
FIG. 5A is a table illustrating the calculation of counting Bloom filter sums according to an example embodiment.

The CBF arrangement shown in FIG. 3 may also be used to determine recent levels of activity, or "hotness." Hotness lookups can be performed on all active CBFs 303-305. The corresponding hashed counter values from all active CBFs 303-305 are summed to form the overall sequence of counter values for that key. For example, FIG. 5A shows a table 502 with CBF results for a particular key 504 according to an example embodiment. This example shows a row for each of three CBFs, numbered CBF0-CBF2. Each column in the table represents an index to a Bloom filter counter of the three CBFs. Each index is generated for eight hash functions 506 applied to the key 504. For example, if the CBF has 128 counters, each with an index from 0-127, the indices IDX0-IDX7 in table 502 may include 8, 27, 49, 55, 102, 112, 115, 120, each determined by performing the respective hash functions 506 on the key 504.

The bottom row in table 502 represents the sum of counters across each CBF for this key. In this example, all CBFs 0-2 are given the same weight, however in some implementations the most current active CBFs may be given a weight value that is higher than less recent active CBFs. In one variation, if any hash counter value for a given key is zero, then all counts for that CBF are set to zero. This is because a zero in any of the counters in rows 0-2 indicates the key has not been inserted into the CBF. For each key added, the minimum of the summed count values from all active CBFs is defined as the estimated repeat count (ERC) for that key. As keys are added, the ERC over all keys is tracked. In this example, ERC=4 for key 504, because that is the minimum count sum across all CBFs in the table 502 (lowest value of the SUM row in table 502). An alternate procedure for obtaining ERC may involve summing just the minimum value in each row of table 502. This alternate approach would yield ERC=3 for key 504, because the minimum value for each row is one.

The ERC derived as above may be used to determine read hotness. For example, three levels of hotness may be defined: 1. Cold (not present in CBFs); 2. Tepid (present in CBFs, but infrequently requested); and 3. Hot (present in CBFs, and frequently requested). Any combination of absolute and relative metrics may be used to determine this metric. For example, a key may be "cold" when ERC=0, and "hot" when ERC>$ERC_h$, $ERC_h$ being a predefined threshold that is tuned for the implementation. The key is "tepid" if 0>ERC≥$ERC_h$. In another example, the key may be considered "hot" when it falls within the top Nth-percentile of non-zero hash entry values up to the maximum ERC. Again, N is tuned for a particular implementation, and the key is "tepid" if above zero but below this percentile.

Figure 5B:
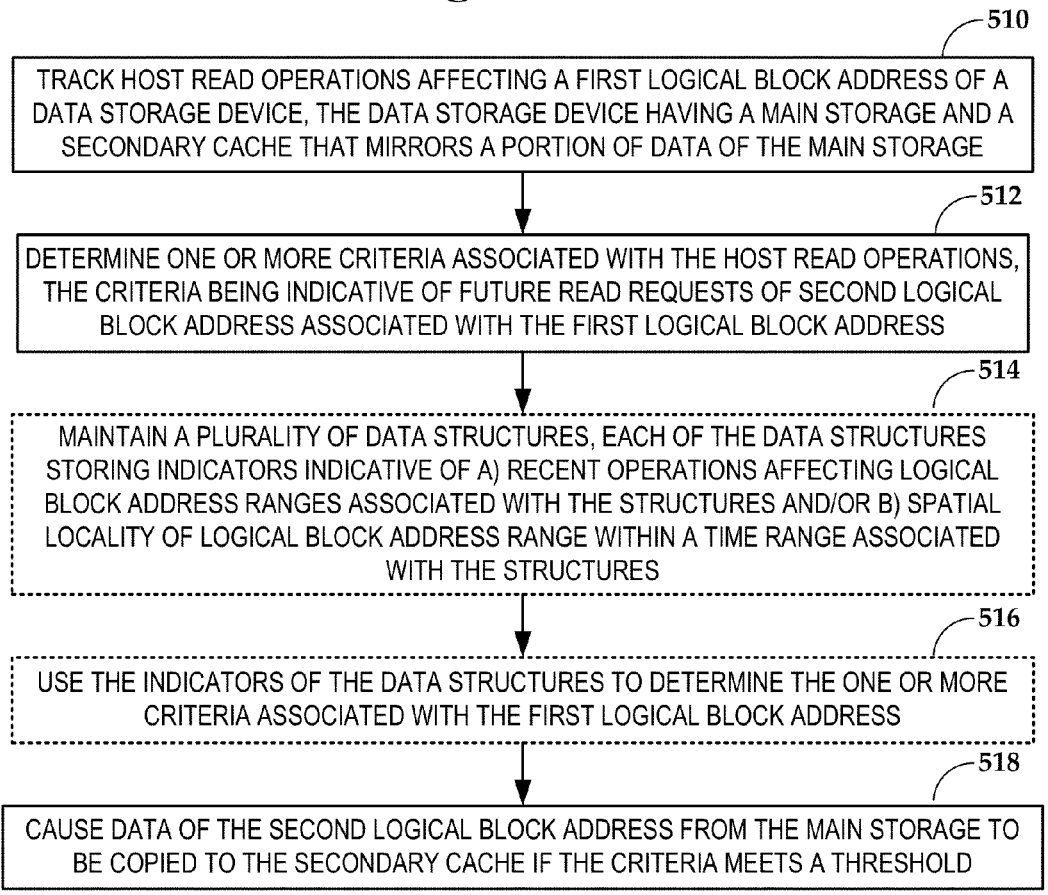
FIG. 5B is a flowchart of a procedure according to another example embodiment.

In reference now to FIG. 5B, a flowchart illustrates a procedure according to an example embodiment. The procedure involves tracking 510 host read operations affecting a first logical block address of a data storage device. The data storage device has a main storage and a secondary cache that mirrors a portion of data of the main storage. One or more criteria associated with the host read operations are determined 512.

The criteria determined at 512 is indicative of future read requests of second logical block address associated with the first logical block address. This criteria may be used to cache the second address in a secondary cache if the criteria meets a threshold. The criteria may be indicative of a recent proximity in time of the host read operations and/or a closeness of address values of the host read operations. In one arrangement, the secondary cache stores read-only data. In such a case, an importance of the criteria is reduced based on write activity associated with the first logical block address.

In another example, the procedure may optionally involve maintaining 514 a plurality of data structures storing indicators. Each of the data structures may store indicators of one or more of A) recent operations affecting LBAs associated with the structures (e.g., zone table as shown in FIGS. 2A and/or B) spatial locality of LBAs within a time range associated with the data structures (e.g., CBFs shown in FIG. 3). The indicator(s) determined at 514 may optionally be used to determine 516 the criteria associated with the first logical block address. Finally, data of at least the second logical block address from the main storage is copied 518 to the secondary cache if the criteria meets a threshold.

Referring back to FIG. 1E, component 122 includes an analysis module 126b that can be arranged to track history of address ranges, and may assign an importance metric to the address ranges that influence whether the ranges should be targeted for the primary cache 163 and/or secondary cache 161. Examples of determining cache importance metrics have been described above. The importance metrics may also be used to determine the importance of both newly requested data and currently cached blocks of data. Metrics of cached data can be compared to the same metric applied to a block of unrequested, speculative read data that is being considered for caching. If the importance metric of the speculative data meets or exceeds that of the cached data, the speculative data can be loaded from the main storage 165 and cached, which may cause eviction of the currently cached data from at least one of the caches 161, 163.

A speculative read module 128b may define ranges of speculative data to be pulled from the main storage 165 for purposes of fulfilling speculative (e.g., predicted or anticipated) host read requests. For example, it may be more efficient to place speculative data in the secondary cache 161 that fills out an entire line of the cache, even if not all data placed in the cache 161 has been requested. Due to certain conditions (e.g., a latency incurred in later retrieving the data) it may be beneficial to speculatively read data proximate to host requested data on the disk. The speculative read data might otherwise be passed over when reading the host-requested data, and then have to be re-loaded from the main storage 165 if later requested, resulting in seek delays and other latencies. The speculative data may include data that is before the requested block or after the host-requested data. The speculative data may be placed in one or both caches 161, 163 when fulfilling the immediate request, in the anticipation that the unrequested, speculative data may be the subject of a later request.

The speculative read module 128b may select LBA ranges of speculative data based upon available rotational latency. In cooperation with the analysis module 126b, the LBA ranges may also be selected based on any combination of: overall spatial locality of the read workload; the specific cache importance of the host-requested and/or neighboring LBAs; and the relative cache importance of any LBAs that might be evicted from the secondary cache should data be selected for caching. If the LBA ranges meet some combination of these criteria, a range of data is moved into at least one of the caches 161, 163 from the main storage 165.

A caching module 130b is configured to cause data from the main storage 165 to be copied to the primary cache 163 and/or secondary cache 161. The caching module 130b may be coupled to at least the speculative read module 128b to determine ranges of data being cached to determine priority of data during transfer from the main storage 165 to the cache. In conventional arrangements, reading of speculative data may be interrupted to fulfill another host request. In contrast, the caching module 130b of this arrangement may be instructed not to interrupt reading of identified ranges of speculative data in response to another host request, at least until a minimum LBA range has been read and cached. Speculative read metadata, such as the identification of a speculative range addresses and a minimum range size, may be provided to the caching module 130b from the speculative read module 128b. The caching module 130b may also be coupled to the main storage 165, other components of the FCI layer 182, FCTM layer 183, host interface 171 to cause transfers of data to the caches 161, 163. Any combination of the criteria and speculative read metadata can be stored in a database 132b that is coupled to any of the modules 124b.

Figure 6A:
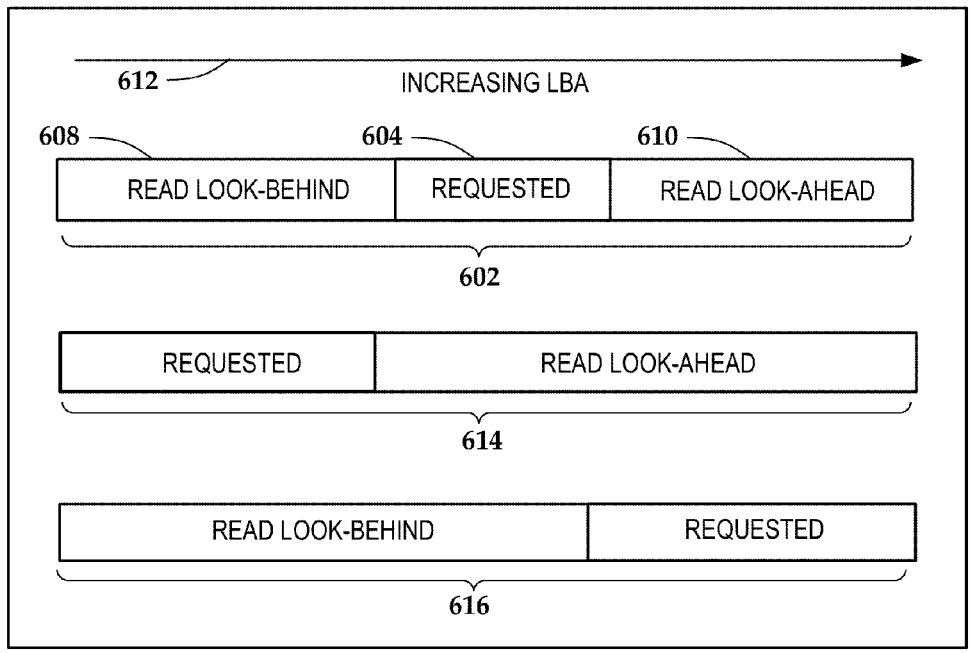
FIG. 6A is a block diagram illustrating examples of speculative read data according to example embodiments.

In reference now to FIG. 6A, a block diagram illustrates speculative read data according to example embodiments. Data 602 represents a contiguous range of LBAs, at least part 604 of which is the subject of a read request. The requested data 604 may be associated with a host read request, and/or may also be associated with other requests.

The requested data 604 may be retrieved from a main storage for placement into a primary, e.g., volatile cache, with the intention that the data 604 may also be sent to a secondary, e.g., non-volatile cache.

In order to improve system efficiency when retrieving the requested data 604, a range 602 of LBAs is defined that encompasses the requested data as well as data that are not requested. This range 602 is referred to herein as a speculative read LBA range. When reading data requested data 604, one or both of additional ranges 608, 610 are identified for speculative reading. Range 608 includes addresses located before the requested LBAs of request 604, and so is referred to as read look-behind data. Range 610 includes addresses located after the requested LBAs of request 604, and so is referred to as read look-ahead data. The relative order of LBAs in FIG. 6A is indicated by line 612, and this may also correspond to relative orders of physical addresses, e.g., disk sectors. While range 602 includes both read look-behind data 608 and read look-ahead data 610, the concepts may apply to one or the other in combination with request data, as shown in speculative read ranges 614 and 616.

The attempt to read the full extent of range 602 may be optional, e.g., the reading of at least speculative ranges 608, 610 may be interrupted/truncated if a new read/write request is received. Alternatively, the range 602 may be defined as a minimum range that is not interruptible in until at least the LBAs within range 602 are read. A hard drive controller may be able to adjust seek delays in order to obtain speculative data 608, 610 without incurring significant penalties. For example, if the drive is currently reading speculative data and a new request is received, the device can calculate a delay time that allows the head to seek to the new position just in time to access the new track. This seek delay may allow reading additional read ahead data without introducing additional latency in accessing the new track. In the present embodiments, this delay may be extended long enough to fill up the speculative range. If the request to read range 602 is defined as non-interruptible, the entire range 602 will be read even if the additional delay introduces some additional latency in processing new requests. In either case, whatever amount of the data 602 is obtained is placed in one or more of the caches. In the arrangement shown in FIG. 1E, the data 602 would be placed in the primary cache 163.

Even though the obtained data of range 602 may be placed in a primary cache, the extents of range 602 (e.g., starting LBA, size of data) may be defined based on characteristics of the secondary cache. For example, the size of range 602 may correspond to a cache line size of the secondary cache, or multiples thereof. Similarly, a start LBA of the range 602 may be evenly divisible by the cache line size. Where the secondary cache is implemented as an SSD, the cache lines may be defined as a predetermined number of pages of the SSD. In such a case, secondary cache line sizes may ultimately be based on page sizes of the SSD.

The range 602 may also be defined based on characteristics of the main storage. For example, on magnetic disk drives, a commonly used, minimum physically-addressable unit of data is the sector. Therefore, the range 602 may also be defined to consider sectors sizes as well as (or instead of) mapping to whole lines of secondary cache. For example, a maximum speculative read latency for the system may be defined, so that a maximum number of read-behind or read-ahead sectors (e.g., the number of sectors in one disk rotation) can be speculatively read without substantially impacting average seek delay times. As a result, the data selected for storage as shown in the range 602 may also depend on particular physical characteristics of the main storage.

Figure 6B:
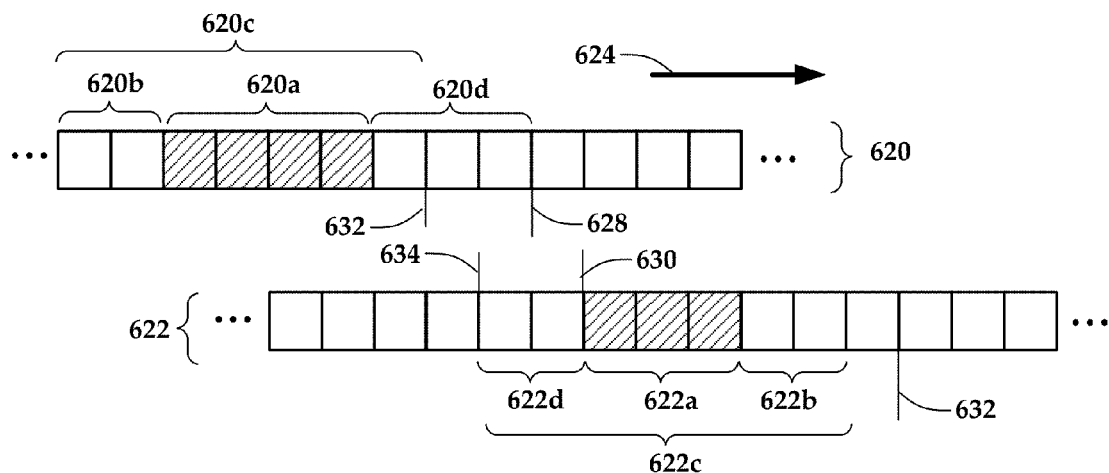
FIG. 6B is a block diagram illustrating how a speculative read algorithm may be tailored for a secondary cache according to an example embodiment.

It will be appreciated that a storage device may already employ some form of read look-ahead and read look-behind capability. In such a case, however, the decisions which drive selection and retrieval of speculative data may not take into account the characteristics of a cache, particularly a secondary cache. An example of how a speculative read algorithm may be tailored for a secondary cache is shown in FIG. 6B. The blocks in FIG. 6B represent sectors within tracks 620, 622 of a hard drive magnetic media. The read head (e.g., contained in a hard drive slider) reads in a direction indicated by arrow 624. Because the slider is usually stationary within a track relative to the media, the media would be moving in a direction opposite to arrow 624.

In this example, the read head is located on track 620 to read requested sectors that are indicated by shaded region 620A. The next read request is indicated by shaded blocks 622A of track 622. In order to fulfill this next request, the read head will need to seek from track 620 to 622, and for purposes of clarity in the drawings, it will be assumed that the seek will occur in the space of one block. How and when the sensor seeks from track 620 to track 622 after reading requested data 620A may vary depending on priorities used by speculative read algorithms, as well as other features that may consume rotational latency.

In some hard drives, for example, the algorithms for speculative reading may favor read-ahead data over read-behind data. In such a system, data following 620A would be read up until the seek departure time indicated by point 628, where it would then be able to seek to point 630 in time to read data at 622A. Thus the read-ahead data 620D following request 620A would take precedence over read-behind data 622D before 622A.

Consider a similar scenario as above, but with an algorithm that favors filling out secondary cache lines without regards to whether the data is read-behind or read-ahead. In that case, assume the size of regions 620C and 622C shown in FIG. 6B corresponds to a secondary cache line size of the system, and that the beginning of block 620B has an LBA suitable as a first LBA of a cache line, should the secondary cache have such restrictions. Also, region 620B has been already been read in ahead of region 620A. As a result, the read head only needs to read to point 632 to fill out a cache line, and reading up to point 628 will not provide enough read-ahead data to fill out another cache line. As a result, the system may choose to use an earlier seek departure time at point 632 and be able to obtain read-behind speculative data starting at point 634. This may provide a higher probability that enough speculative data proximate request 622A can be used to fill out a secondary cache line, such as where the reading of speculative data may be interrupted by another request.

For example, assume that another request will require the read head to seek away from track 620 at point 632. If the drive had been configured to optimize read ahead data so that reading of data 622A had begun at point 630 instead of point 634, then there would not be enough data between points 630 and 632 to fill out a secondary cache line. Maximizing read-behind data 622D minimizes the amount of read-ahead data 622B needed to fill out the cache line, which will lower the probability that another request could interrupt the read-ahead data 622B.

The read-behind or read-ahead operations shown in FIG. 6B may be triggered by the cache importance criteria at or near the requested LBA range, or an overall assessment of spatial locality. The desired amounts of speculative read may be specified in order to align backward to the nearest boundary corresponding to the secondary cache line size. Even if the speculative data is first placed into a primary cache, this selection of particular speculative ranges can improve hit rates of the secondary cache. This is because LBA ranges that fill an entire line are the first (or only) ones to be promoted to secondary cache. This may place more emphasis on read-behind data than in current storage devices. This is because the endpoint of read-ahead segments may be opportunistic (e.g., more subject to interruption than read-behind, in cases where the read-ahead is not specified as non-interruptible). Also, the secondary cache policy may truncate the read-ahead ranges at the cache line boundary when being copied to the secondary cache, thus causing some read-ahead data to be discarded anyway.

Figure 7:
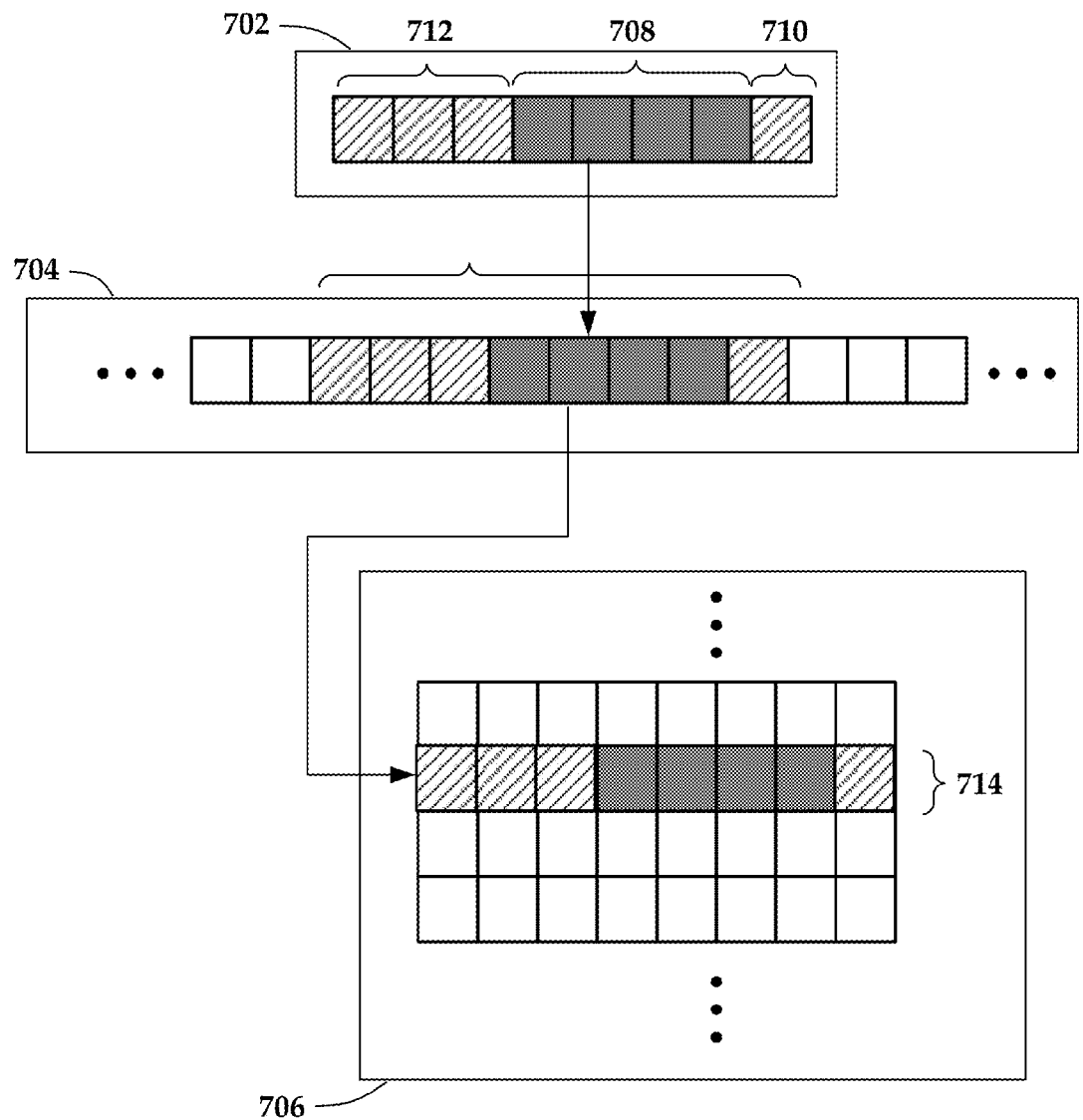
FIG. 7 is a block diagram illustrating caching of speculative read data according to an example embodiment.

In reference now to FIG. 7, a block diagram illustrates an example of filling a secondary cache with speculative data according to an example embodiment. A block of data 708 is retrieved from a main storage 702, e.g., in response to an initial host read request for data that has not previously been cached. From the main storage 702, data flows to a primary, e.g., volatile cache 704, and then to a secondary, e.g., non-volatile cache 706. Subsequent read requests for the data 708 will first attempt to find the data in the primary cache 704, and then the secondary cache. If the request misses in both caches 704, 706, the data 708 are retrieved from the main storage 702.

When reading a block of data 708 from the main storage 702, the storage device may perform speculative reading, e.g., it may read non-requested user data blocks 710, 712 following or preceding the requested data, and place the data blocks 710, 712 in a buffer in anticipation of a future read request.

Using criteria described in greater detail below, a storage device may mark one or both of blocks 710, 712 as speculative ranges. Speculative ranges may have priority for retrieval from main storage (e.g., another read/write request will not interrupt loading of the speculative data) so that one or both blocks 710, 712 get loaded into one or both of the caches 704, 706 together with the requested data 708. The data 708, 710, 712 may be first loaded into the primary cache 704, then later moved to the secondary cache 706. Alternatively, the data 708, 710, 712 may be moved into both caches 704, 706 at the same time, or directly into the secondary cache 706 without first being placed in the primary cache 704.

The total size of one or both speculative LBAs 710, 712 and requested data 708 may be selected to make caching operations more efficient. In the illustrated examples, the total size of blocks 708, 710, 712 is selected to be the same as cache lines (e.g., line 714) of the secondary cache 706. As such, when the blocks 708, 710, 712 are determined to be speculative candidates, the blocks 708, 710, 712 are loaded into the secondary cache 706, either directly or via the primary cache 704. It will be appreciated that alternate configurations may be tuned for cache-line sizes of the primary cache 704. In such a case, the speculative candidate blocks 708, 710, 712 are loaded into the primary cache 704, and selection of address ranges for movement to the secondary cache 706 may depend on other factors rather than secondary cache line-size.

A device according to the embodiments described herein may extend the speculative reading algorithm of a conventional HDD by one or more speculative read operations. The speculative read operations be based on host read history locality determination, and target speculative ranges may be selected to align with secondary cache line size and starting address conventions. The speculative feature may ensure that read data is provided in the primary cache so that the secondary cache can efficiently utilize the data should it be a candidate for a fill operation.

Figure 8:
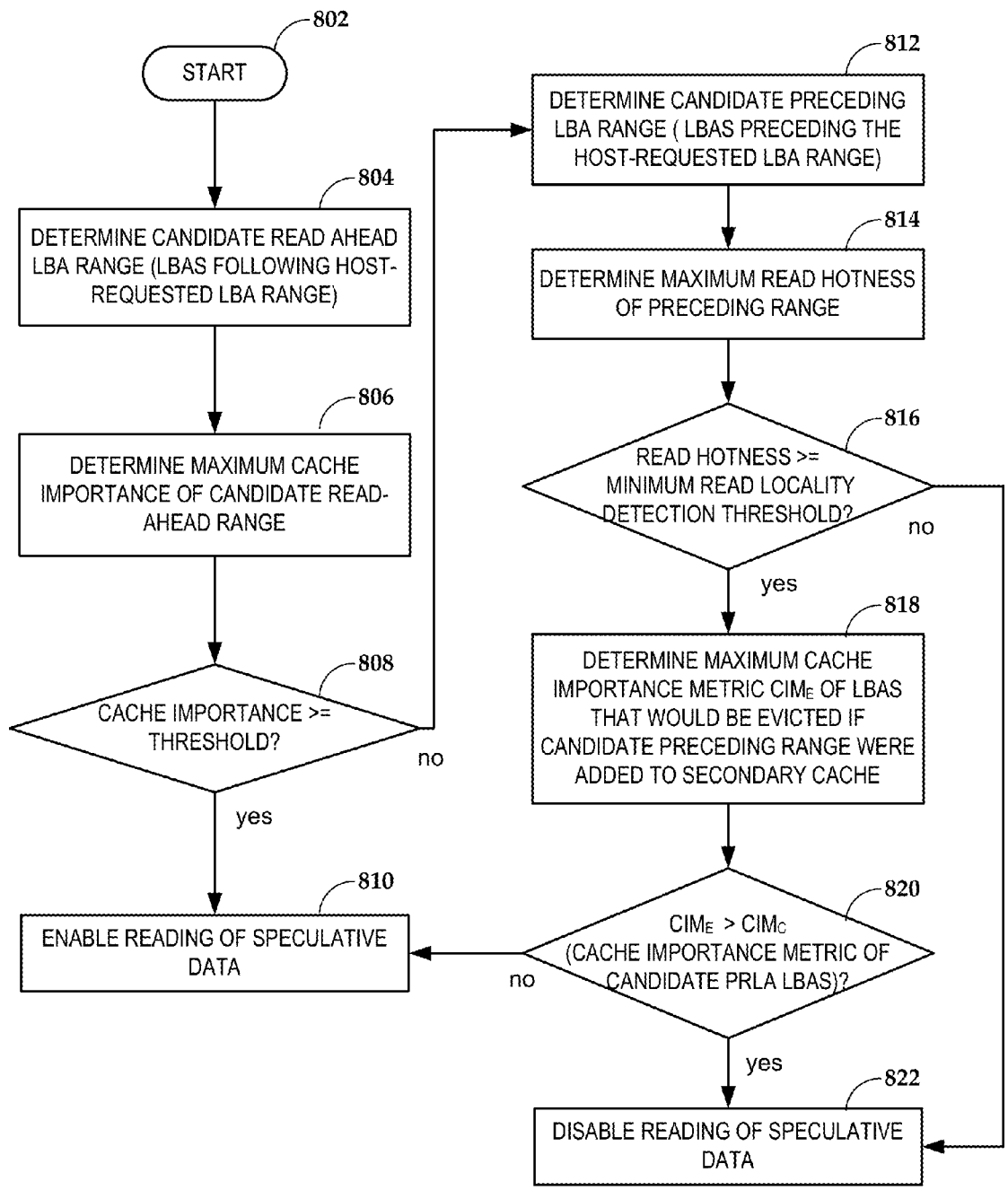
FIG. 8 is a flowchart illustrating a procedure to determine promoting of speculative data according to an example embodiment.

In some embodiments, a speculative read operation may attempt to read a specified minimum number of LBAs beyond the requested range in LBA space. In reference now to FIG. 8, a flowchart illustrates a more detailed example of how speculative LBAs may be selected. The procedure starts 802 in response to some data request event, such as a host read request for a target LBA range. A candidate speculative read-ahead range is determined 804. This range is a number of LBAs following the host-requested range that will be targeted for read-ahead if certain criteria are met.

The speculative read-ahead LBAs may be chosen to optimize overall performance for enterprise-class workloads, and may account for the secondary cache line size and filling speed, as well as the disk data rate and potential access time penalties incurred by invoking speculative reads. After the candidate speculative range is determined 804, a maximum cache importance of the candidate range is determined 806. This determination 806 may involve deriving a cache importance metric as previously described above.

The cache importance metric may be found by looking at spatial locality of recent requests (e.g., LBA ranges experiencing higher than average activity) and levels of activity associated with those requests (e.g., read "hotness" of the LBA ranges). The cache importance may be generic or specific to one of the primary or secondary cache. For example, the primary cache may have differing sets of priorities relative to LBA ranges than the secondary cache, e.g., due to the expected time that data is expected to be retained in the respective caches. In particular, where data ranges are selected to comply with cache line characteristics of the secondary cache, the cache metric importance may also be calculated with respect to the secondary cache as well.

The metric found at 806 is compared to a threshold value at 808. If the metric meets the threshold, reading of the candidate speculative LBA range is enabled 810. In some embodiments, enabling 810 the speculative read may also ensure retrieval of the speculative data is not aborted prior to reading the minimum range if a new read request is received. In other embodiments, the enabling 810 may just result in a best effort to read in the range, but will allow pre-emption of the speculative read for some requests so as to minimize latency in fulfilling the requests.

If comparison at 808 determines the cache importance metric does not meet the threshold, a speculative range of preceding LBAs is determined 812. In this example, the read hotness of the preceding range is determined, and compared 816 to a threshold. As described elsewhere herein, read hotness may refer to activity levels of recent read requests within the preceding LBAs. The spatial locality of the recent read requests may optionally be considered at 814, e.g., high levels of activity proximate to preceding LBAs. If the read hotness of the preceding LBA range does not meet the threshold, then speculative read is disabled 822 for the range. This disabling 822 may involve going to a fallback strategy for speculative reading, e.g., maximizing read-ahead data regardless of cache importance or size, temporarily disabling speculative reading, etc.

If the read hotness of the preceding LBA range meets the threshold, then a determination 818 is made regarding the cache importance metric ($CIM_E$) of LBAs that would be evicted from the secondary cache if the candidate preceding range was added to the cache. This metric $CIM_E$ is compared to the cache importance metric of the candidate range, $CIM_C$. This latter metric $CIM_C$ may have been previously determined at 814, as read hotness may be one component of the cache importance metric. If it is determined at 820 that $CIM_E > CIM_C$, then speculative reading is disabled 822 for the preceding LBA range; otherwise it is enabled 810. It should be noted that determination 820 will always return "no/false" if no data would be evicted from the secondary cache in response to adding the speculative data.

It should be noted that the determination at 820 may be performed even if the speculative data is not intended to be placed directly in the secondary, e.g., non-volatile cache and evict the cached data. For example, the speculative data may be placed in the primary, e.g., volatile cache. This or another event may trigger evicting data from the primary cache, and a determination is made as to what should be evicted. The evicted data may either be moved to the secondary cache, causing the above noted secondary cache eviction, or deleted from the primary cache. The latter situation may occur, for example, where low priority read/write cache data is considered for eviction from the primary cache. If the secondary cache is used for read-only data, then the read/write cache data would not be targeted for secondary caching, and would just be cleared from the primary cache.

Figure 9:
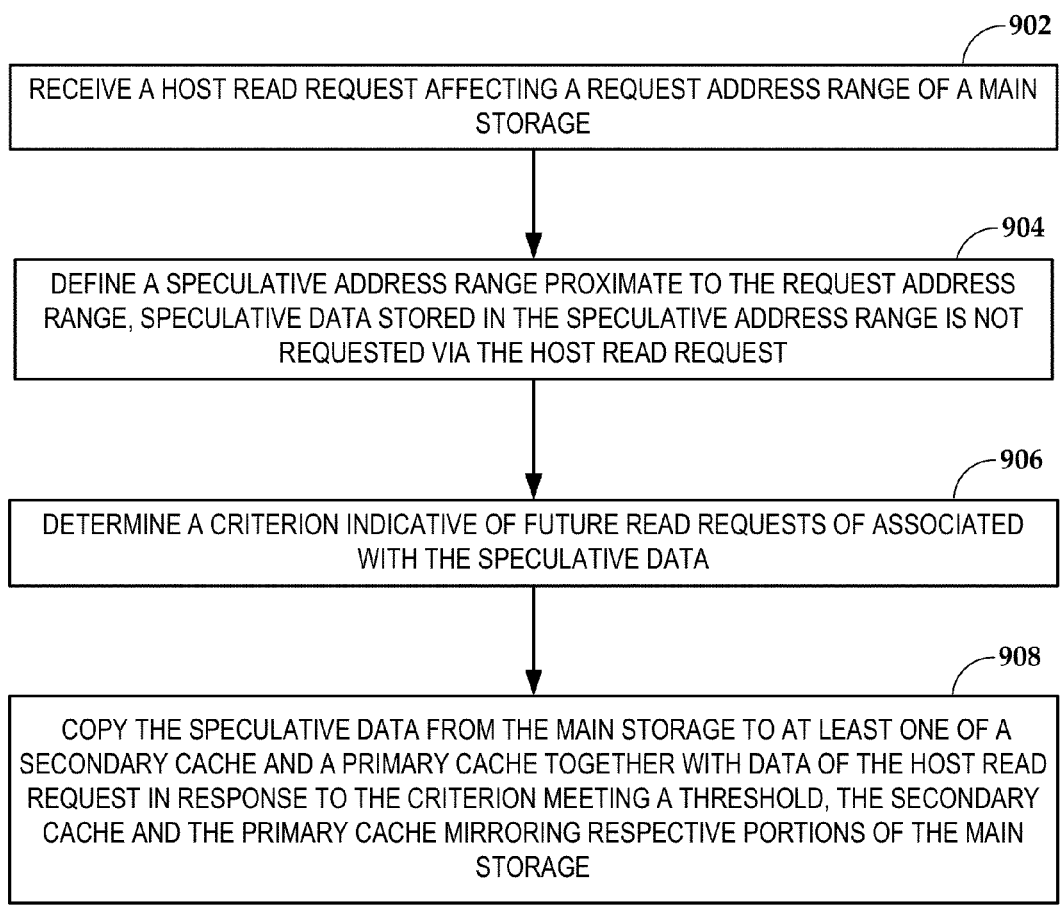
FIGS. 9-10 are flowcharts of procedures according to other example embodiments.

In reference now to FIG. 9, a flowchart illustrates a procedure according to an example embodiment. A host read request affecting a request address range (e.g., LBA range) of a main storage is received 902. In response to the read request, a speculative address range proximate to the request address range is defined 904. Speculative data stored in the speculative address range is not requested via the host read request. The speculative address range may be selected based on a cache line size of at least one of the secondary cache and the primary cache.

A criterion indicative of future read requests of associated with the speculative data is determined 906. For example, the speculative address range may located before and/or after the request address range, and the criterion may include a cache importance metric of the secondary cache regarding the speculative data. In either of these cases, the criteria may further include comparing a cache importance metric of the speculative data to a cache importance metric of cached data that would be evicted from the secondary cache in response the copying of the speculative data from the main storage to at least one of the secondary cache and the primary cache.

The speculative data is copied 908 from the main storage to at least one of a secondary cache and a primary cache together with data of the host read request in response to the criteria meeting a threshold. The secondary cache and the primary cache mirror respective portions of the main storage. The copying of the speculative data may involve not interrupting the copy operation in response to another host request being received, at least until the speculative address range has been copied.

The main storage may include a magnetic disk drive. In such a case copying 908 the speculative data from the main storage to the secondary cache may involve adjusting a seek departure time of the magnetic disk drive to read the speculative data. For example to read speculative data addresses before the host requested data, the seek may occur early (e.g., interrupting/truncating an in-progress, low priority operation such as other speculative reads) so that the preceding data can be retrieved. If the speculative data addresses are located after the host requested data, a seek for subsequent requests can be delayed until the speculative address range is copied to one or more caches.

Figure 10:
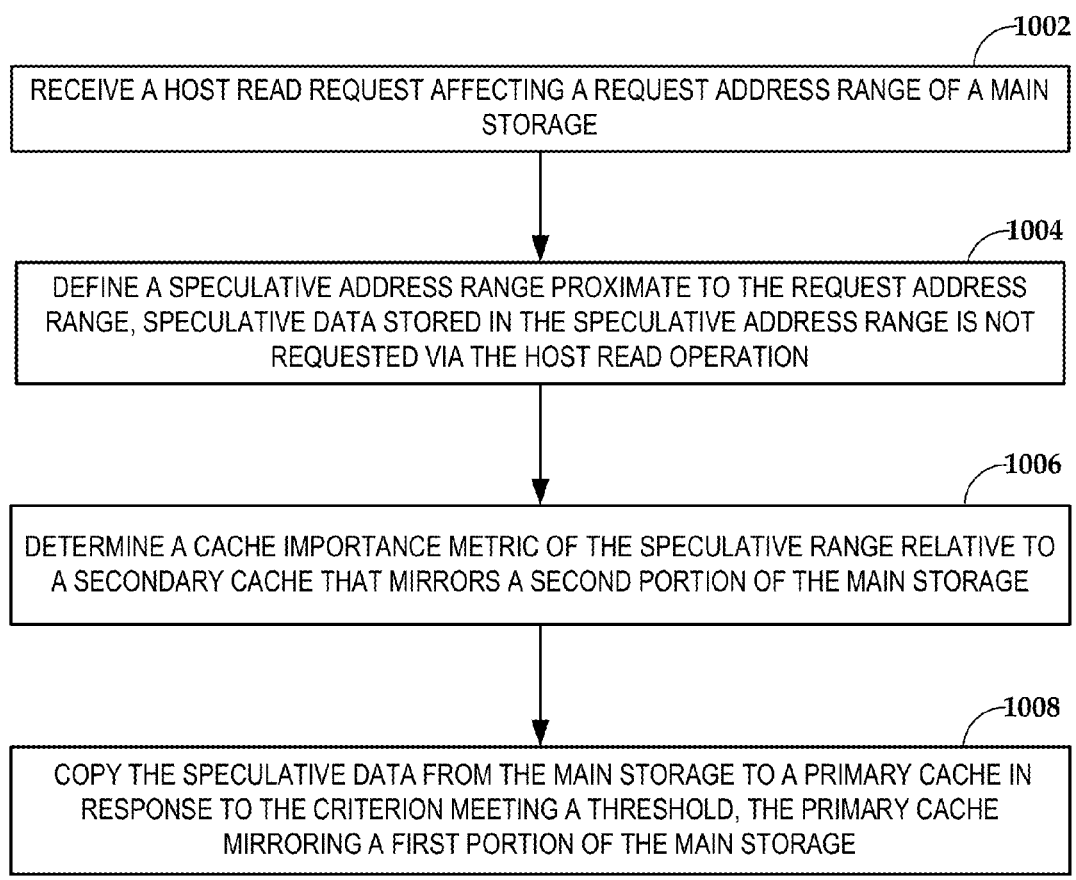

In reference now to FIG. 10, a flowchart illustrates a procedure according to another example embodiment. A host read request is received 1002 affecting a request address range of a main storage. A speculative address range proximate to the request address range is defined 1004. Speculative data stored in the speculative address range is not requested via the host read request. The speculative address range may be selected based on at least one of a size and an allowable starting address of cache lines of the secondary cache. The speculative address range may include a first range preceding the request address range and a second range following the request address range.

A cache importance metric of the speculative range is determined 1006. The metric is relative to a secondary cache that mirrors a second portion of the main storage. The speculative data is copied 1008 from the main storage to a primary cache in response to the criterion meeting a threshold, the primary cache mirroring a first portion of the main storage.

Referring back to FIG. 1E, the analysis controller module 126c of component 123 may track history of address ranges, and may assign an importance metric to the address ranges that influence whether the ranges should be targeted for the primary cache 163 and/or secondary cache 161.

The importance metrics may also be used to determine the importance of both newly requested data and currently cached blocks of data. Metrics of cached data can be compared to the same metric applied to a block of unrequested, speculative read data that is being considered for caching. If the importance metric of the speculative data meets or exceeds that of the cached data, the speculative data can be loaded from the main storage 165 and cached, which may cause eviction of the currently cached data from at least one of the caches 163, 161 or movement therebetween.

The analysis controller module 126c may also define optimum ranges of speculative data to be pulled from the main storage 165 into at least one of the caches 161, 163 for purposes of fulfilling host read requests. Due to certain conditions (e.g., a latency incurred in later retrieving the data) it may be beneficial to speculatively read data that has not been requested but is proximate to host requested data on the disk. Examples of how speculative cache ranges may be determined are described in the "Cache Range Selection" reference, which has been incorporated by reference.

The size of the speculative range may depend on characteristics of the caches 161, 163 and expected use conditions of the storage apparatus. For example, it may be more efficient to place speculative data in the caches 161, 163 that fills out an entire line of the secondary cache 161. The speculative data may include data that is before the requested block (read look-behind) or after the host-requested data (read look-ahead). The speculative data may be placed in one or both caches 161, 163 when fulfilling the immediate request, in the anticipation that the unrequested, speculative data may be the subject of a later request.

One or more cache monitors 128c may track operations affecting both the primary and secondary caches, 163, 161 and cause cache controller module 130c (discussed further below) to perform certain actions to cached data based on system policies. Generally, the cache monitor 128c may track conditions used by the cache controller module 130c to evict data from one of the caches 163, 161 or move data between caches 161, 163. Where the caches 161, 163 are configured to be independent, e.g., not storing the same mirrored data of the main storage 165, then moving data may involve copying data associated with an LBA range to the one cache and removing data of the LBA range from the other cache. There may be a single cache monitor 128c that monitors both primary and secondary caches 163, 161, or the functionality may be separately provided individual monitors associated with each of the caches 163, 161.

The cache controller module 130c is configured to cause data from the main storage 165 to be copied to the cache 163 and/or cache 161. The cache controller 130c may control both primary and secondary caches 163, 161, or the functionality may be separately provided by individual controller modules associated with each cache 163, 161. The cache controller module 130c may be coupled to FCTM layer 183 to cause transfers of data to the cache 161. Any combination of the criteria and speculative read metadata can be stored in a database 132c. The database 132c may be coupled to any of the modules 124c.

Figure 11:
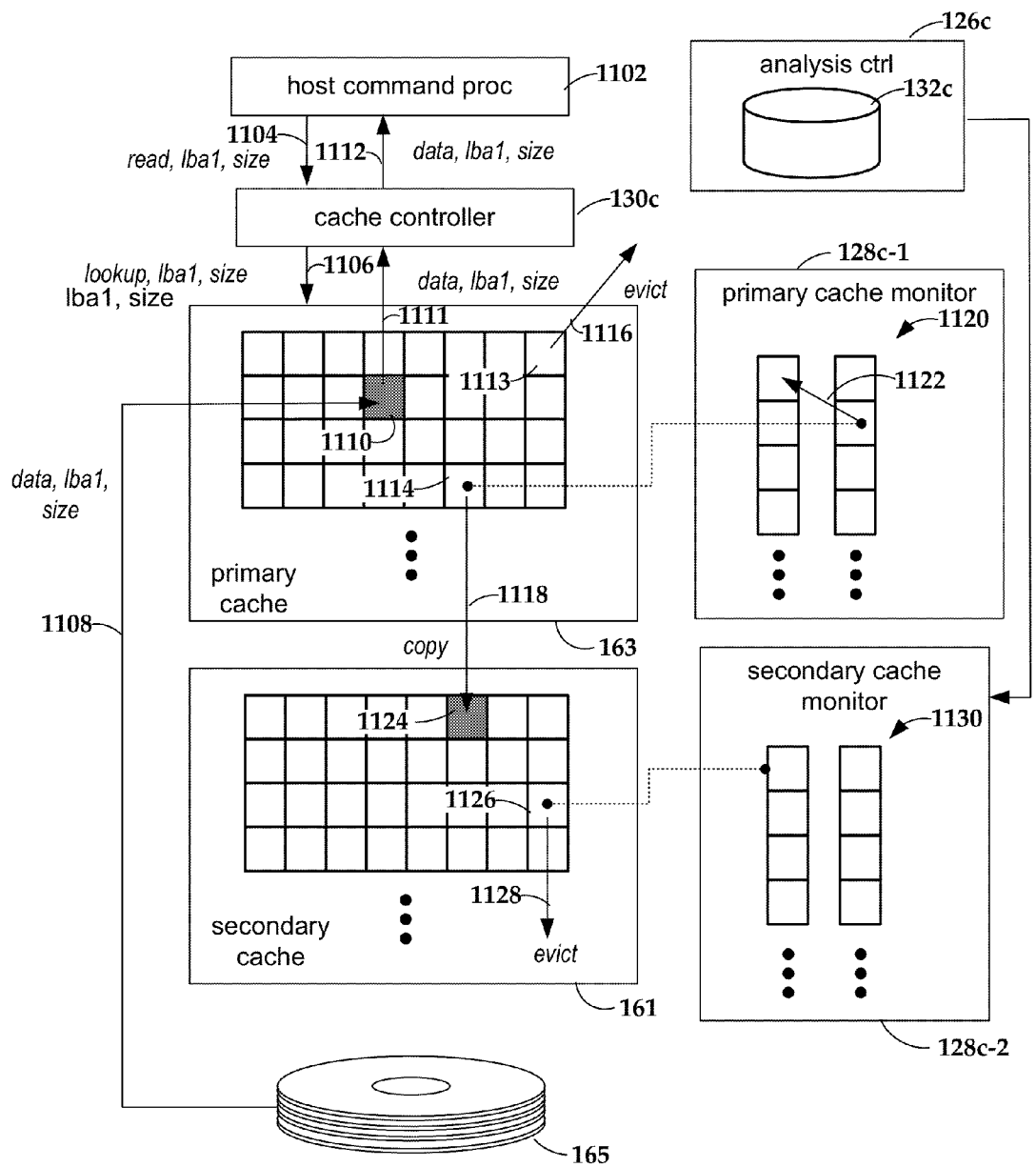
FIG. 11 is a block diagram illustrating examples of cache monitoring and control according to example embodiments.

In reference now to FIG. 11, a block diagram illustrates an example of cache monitoring and control using various modules shown in FIG. 1E. A host command processor 1102 processes commands received via a host interface (e.g., host interface 171 in FIG. 1B). The command processor 1102 may queue, de-queue, sort, prioritize, and otherwise process commands that cause data to be written to and read from a storage device. Example command 1104 is a host request for data, at starting address LBA1 and length=SIZE. This command 1104 is first directed to the cache controller 130c, which will perform a lookup 1106 in the primary cache 163 and, if needed, the secondary cache 161. This may be performed using a single lookup 1106, or may involve a second lookup request (not shown) directed to the secondary cache 161.

In this example, it may be assumed that the lookup 1106 results in a cache miss in both the primary cache 163 and the secondary cache 161. In response to the cache miss, the data corresponding to LBA1 is retrieved 1108 from the main storage 165 and placed in the primary cache 163 at location 1110. The data is also returned 1111, 1112 to the host command processor 1102 for communication to the host. While path 1111 indicates the data is read from location 1110 of the primary cache 163, it may be returned directly to the controller 130c from the main storage 165 before, during or after being placed in the cache 163. Subsequent requests for LBA1 will return 1111, 1112 the data directly from the primary cache 163, until such time that the data is evicted.

In order to make room for addition 1108 of the data to location 1110 of the primary cache 163, a corresponding amount of data from another cache location 1113 may need to be evicted 1116 from the primary cache 163. The selection of the location 1113 for eviction is based on data maintained by a cache monitor 128c of the primary cache 163. It should be noted that the policy for eviction from the primary cache 163 may be separate and independent from the policy for copying data from the primary cache 163 to the secondary cache 161. For example, although data being copied to the primary cache 163 may trigger copying of data from primary to secondary caches 163, 161, this is not necessarily done to free up space in the primary cache. This event may be a convenient trigger to evaluate data for the secondary cache, and may also be in response to other conditions discussed below, such as high spatial locality of host read history.

In this example, the primary cache monitor maintains sorted lists 1120 of metadata related to priority of segments within the primary cache 163. In this disclosure, the term "list" is used generically, and may be include using any data collection structure known in the art, e.g., array, linked list, set, map, binary tree, etc. Each cache segment identified in the cache priority lists 1120 may correspond to a fixed-size data unit of the cache 163 (e.g., integer number of cache lines) or may be variable sized data units (e.g., corresponding to a contiguous ranges of LBAs, where the range of each segment may be different sizes). For purposes of this illustration, each block of data in the primary cache 163 corresponds to a variable length segment, a segment generally referring to a range of LBAs that are acted on together (e.g., contiguous range).

The primary cache monitor 1128c-1 may use the lists 1120 as part of a multi-level priority scheme. One level of priority is based on the usage type of the data (e.g., write, read, promoted). Another level of priority is based on the order of access to the data (e.g., least recently used, most recently used). The result of this assignment of priority is the set of lists 1120, one list for each usage type, where each list is sorted from most recently used (MRU) to least recently used (LRU). Finding an eviction candidate involves first locating a non-empty list with the lowest retention priority, and then selecting the LRU element from that list.

1The usage-type lists can be used to efficiently filter candidate data based on read usage. For example, a usage type of "promoted" is given lower retention priority in the primary cache 163. Usage types of "read" and "write" have the next higher orders of priority, in that order. When a read segment (e.g., segment 1114) is copied 1118 to cluster 1124 of the secondary cache 161, the primary cache entry in lists 1120 related to segment 1114 may be lowered in retention priority by moving it from a "read" list to a "promoted" list, as indicated by arrow 1122. This may only be done if all of the cluster-aligned data from the entry 1114 has been copied to the secondary cache 161. Otherwise, the entry remains on the "read" list of the primary cache 163 but may be marked "do not promote" to prevent repeated selection.

Besides usage type, the cache monitor 128c-1 may maintain other attributes of primary cache entries related to promotion of primary cache segments to the secondary cache 161. This metadata may be stored in one or more of the lists 1120. These attributes may include, "reserved for promotion," "promoted to flash cache," "prohibit promotion reservation," etc. These attributes may be used in determining whether to evict a segment from primary cache 163, as well as controlling whether the segment is copied to the secondary cache 161.

The analysis controller 126c may be used to determine a cache importance metric of segments such as described herein. This metric may take on a value within a numerical range (e.g., 1-10) and the metric may be adjusted over time. For example, some data may have this importance metric determined at the time the data was requested, e.g., in cases where the metric triggered the obtaining of speculative data from the primary storage along with the requested data. In other cases, this metric may be determined later, e.g., when determining whether to copy non-speculative data to the secondary cache.

The cache importance metric, along with other cache metadata noted above, may govern the selection of a segment such as 1114 for copying to the secondary cache. For example, as long as a primary cache segment is marked with "promoted to flash cache" or "prohibit promotion reservation" attributes, it will not be considered for copying to the secondary cache. Also, a logical address range of the primary cache segments may govern whether or not they are eligible for copying to the secondary cache. For example, segments may have to satisfy size and alignment conditions of the secondary cache in order for its LBA range to be eligible for copying.

The copying 1114 of data in segment 1114 to the secondary cache 161 may trigger an eviction 1128 of a cluster of data from the secondary cache 161. For purposes of this discussion, the term "cluster" will be used to annotate ranges of data within the secondary cache 161. Similar to a segment of the primary cache 163, a cluster generally refers to a range of LBAs within the secondary cache 161 that are acted on together. As with the primary cache 163, it is assumed in this example that the secondary cache 161 has at least one cluster 1124 ready to receive the data, although another cluster 1126 may need to be evicted 1128, either immediately or some time thereafter, in order to facilitate insertion into cluster 1124. A secondary cache monitor 128c-2 may maintain a separate list 1130 for purposes of determining priorities of the secondary cache 161.

The secondary cache priority list 1130 may maintain a set of metrics targeted to clusters within the secondary cache 161. These metrics may at least include the last access time, and may be maintained in response to events such recent host interface activity. Elements of the list 1130 may make reference to fixed or variable sized clusters of the secondary cache 161, and a single insertion may include multiple evictions 228 from the secondary cache 161. The secondary cache monitor 128c-2 may also access cache importance metrics data from analysis controller 126c and/or database 132c, e.g., using one or more LBAs as an index.

It should be noted that in this example, the secondary cache 161 is assumed to be read-only, and so eviction 1128 is shown as the only option. However, if the secondary cache 161 is configured to store both read and write data, then another option (not shown) may be to sync the data with the main storage 165 before clearing the cluster 1124 for other uses. Similarly, if the primary cache 163 stores read/write data, then eviction 1116 may also involve synchronizing the cached data with the main storage 165.

Figure 12:
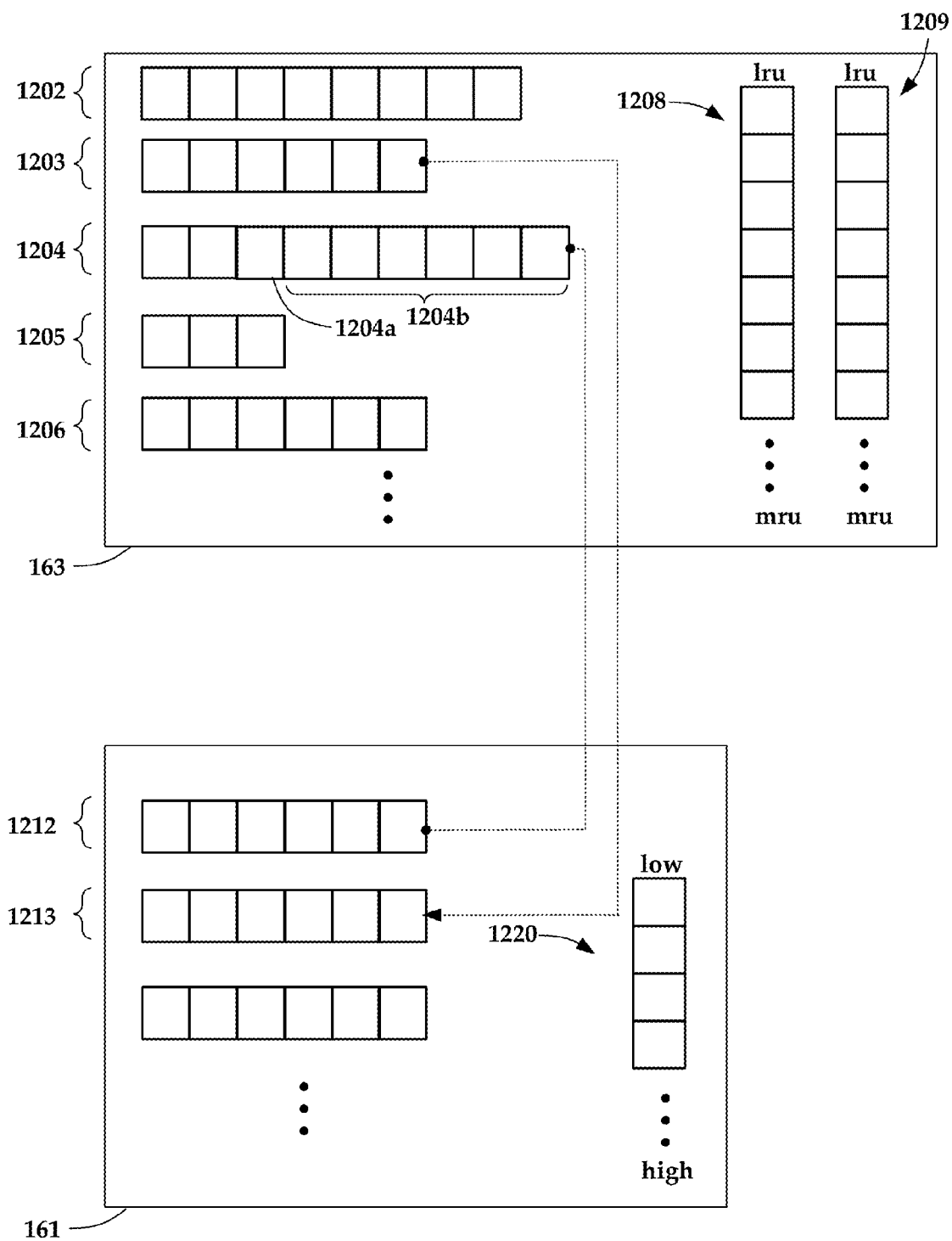
FIG. 12 is a block diagram illustrating further aspects of moving/copying data from a primary cache to a secondary cache according to example embodiments.

In reference now to FIG. 12, a block diagram illustrates an example of how segments are selected and retained for primary cache 163. The primary cache 163 distinguishes read data from write data. Read data may be distinguished from write data by assigning a cache use identifier to primary cache segments. For example, segments 1202-1206 are identified as read data that are available for movement to the secondary cache 161. In this example, each block within the segments 1202-1206 represents a unit of data, e.g., n1-LBAs, where n1 is the same for all segments 1202-1206. The blocks with the segments 1202-1206 are also linked together, e.g., a contiguous range of LBAs within each segment 1202-1206. The primary cache 163 may also have write data, and it is assumed in this example that the secondary cache is populated only with read data from segments in the primary cache.

The process of searching for new read data to copy into secondary cache may be initiated when new valid read data is added to the primary cache 163. This search may also be dependent of the host read history spatial locality being high, which can be determined via the analysis controller module 126c and/or database 132c. Generally, spatial locality refers to grouping of a relatively large number of requests over a relatively small range of LBAs and over a particular time range. High spatial locality of requests may be indicative that data in or near that range may be read or re-read at some point in the future. The likelihood of some of the data being requested near-term may not be high enough to justify storage in the primary cache 163, but might be sufficient to move the data to the larger secondary cache 161.

A retention priority is used to guide the selection of segments 1202-1206 that have eligible data for the secondary cache 161. The retention priority of the segments 1202-1206 in the primary cache will be lowered when all possible data from that segment 1202-1206 have been copied into secondary cache. For example, segment 1203 is shown having all data copied to segment 1213 in the secondary cache 161, and so segment 1203 will have a low (or zero) retention priority. In such a case, a reference to the segment 1203 may be maintained in a sorted list, and a low retention priority relative to other segments causes segment 1203 to be at the top of the list for removal.

Read data that is not yet copied to the secondary cache 161 is given higher retention priority, while read data that has been copied to secondary cache is given lower retention priority. A primary cache segment may include some portions that have been copied, and others that have not been. Other retention priority relates to the last access time of LBAs within the segment.

One way to manage retention priority is to store a reference to eligible segments on one or more lists 308-309. For example, the lists 308-309 may have a collection of elements each referencing segments 302-306. Additional data may also be stored with the list elements, such as access time, cache priority, etc. Lists 308 and 309 are ordered from least-recently-used (LRU) to most-recently-used (MRU), based on cache use of at least part of the segment. These lists 308-309 may be combined into a single list (e.g., sorted on primary and secondary fields, use a combined sorting value), or be used to collectively to define a retention priority. When an eviction is necessary, the lists 308-309 may be consulted in order of retention priority, the lowest priority elements being at the top of the lists 308-309.

The elements placed in the lists 1208-1209 may be limited to read segments (e.g., using cache use identifier noted above) that are not yet copied to the secondary cache 161. This can provide boundaries on the search for candidate segments to move to the secondary cache 161. In order to qualify for selection, the segment may need to satisfy any or all of the following criteria: (a) not already be reserved for copying to secondary cache (b) not prohibited from being copied to secondary cache; (c) not already copied to secondary cache, (d) overlap with the range of LBAs that may be copied into secondary cache, and (e) contain at least one full cluster within its LBA range (for implementations in which the secondary cache is organized into fixed sized clusters); (f) contain data supplied by a read look-ahead or read look-behind operation, or have a maximum cache importance that is greater than or equal to that of any LBA predicted to be evicted from the secondary cache if qualifying segment data were copied into secondary cache. The last criteria relates to additional speculative reading that may have been performed expressly for the purpose of promoting to secondary cache. In that case, a cache importance eviction test may have already been performed at the time the speculative reading was being determined, and the data would already have been marked "promotion recommended".

Criterion (a) above refers to a segment being reserved but not yet having been copied to the secondary cache 161. For example, segments already included in the lists 1208-1209 that have not yet been copied over would not need to be further considered for addition to the list(s). If an when such segment is copied to the secondary cache 161, it would be removed from list(s) 1208-209, and while still resident in the secondary cache 161, would not later be added in to the list(s) 1208-209 due to criteria (c). Criterion (b) refers to situations where the number of LBAs to copy into the secondary cache 161 from a single segment has a maximum value that may be smaller than some segments. When that is the case, the range of data to copy is selected in a way that gives priority to the lowest non-requested LBAs in the segment. The lowest non-requested LBA is maintained within the segment by the primary cache. When such a segment is returned to primary cache, it remains on the list of read segments (rather than being moved to the list of segments already copied to secondary cache) and is marked as prohibited from copying to secondary cache.

For example, a high-water mark may be maintained of the last requested LBA within each read segment of the primary cache 163. When a limit is imposed on the amount of data that may be copied into secondary cache from a single segment, the data selected from that segment is chosen to give higher priority to non-requested LBAs over requested LBAs, and highest priority to the lowest non-requested LBAs. Using segment 1204 as an example, LBAs from the beginning (leftmost end) of the segment 1204 up to and including block 1204A have been requested. Further, as shown with cache line 1212 in the secondary cache, the cluster size of the secondary cache 161 is six blocks. As a result, region 1204B is given priority for copying into the secondary cache 161 over any other region of segment 1204. If the segment 1204 extended beyond the end of region 1204B (e.g., there was another range of LBAs to the right of 1204B) then 1204B would be given priority over that other range.

There may be a maximum LBA range that is permitted to be copied into secondary cache. Criterion (d) enforces that some part of the segment is within the allowable range. The LBA range to be copied from the segment may be truncated if necessary.

Criterion (e) relates to selecting data for the secondary cache 161 that satisfies an address criterion of the secondary cache. For example, eligible segments may include those that satisfy a minimum size, e.g., fully filling out one or more cache lines. Also, a secondary cache cluster may define both alignment and size constraints of the LBA ranges that may be copied into secondary cache 161, assuming that it is organized into fixed size cache lines. For example, if the cluster size is 30 LBAs, then any LBA range to be copied into secondary cache should have a starting LBA and number of LBAs that are each multiples of 30. Using $LBA_S$ and $LBA_F$ as respective start and final addresses of the segment, the addresses in this example may have to satisfy the following (where "%" represents the integer modulus operator): $LBA_S \% 30=0$ and $(LBA_F-LBA_S+1) \% 30=0$. After selecting a segment, its LBA range may further be adjusted to comply with the cluster alignment/size requirements. For example, the start LBA is rounded up to the nearest cluster boundary if not already aligned, and the end LBA is rounded down to the nearest cluster boundary−1, if not already so aligned. If that is not possible, then the segment may be disqualified.

Criterion (f) relates to an algorithm for filling the primary cache 163 with speculative data, as discussed in the "Cache Range Selection" reference. Speculative data generally refers to data that is adjacent to data of an existing host access operation (e.g., sectors preceding and following read-requested sectors) that are not currently requested but are read anyway. By loading speculative data into the cache, latency of future requests for speculatively cached data can be greatly reduced.

When determining candidates for copying to the secondary cache, a secondary cache eviction test may be performed if it was not already performed during the setup of speculative reading. The test involves comparing the maximum cache importance of the next 'n' clusters to be evicted from the secondary cache 161 to the maximum cache importance of the candidate data to be added. The 'n' value is the maximum size of data that can be added to secondary cache 161 at a time, but may also be matched to the size of the candidate data to be added. Because the secondary cache eviction test may already be performed during set up of speculative reading, it will be marked as "promotion recommended." In such a case, there is no need to do an eviction test again when evaluating that data for promotion into the secondary cache The controller for the caches 163, 161 should be able to service cache hits and invalidations on a primary cache segment while copying that segment's data into the secondary cache 161. Once a segment is selected for copy, it may be reserved for the duration of the copy operation into the secondary cache 161. During this time, the segment can be used to serve cache hits from the primary cache 163 and won't be evicted. If a host issues an invalidate request for that segment, the segment will be disabled for further cache hits, but will otherwise remain intact until the copy into secondary cache completes, at which time the remaining processing for the invalidation can be performed.

A qualifying segment that successfully copies all of its cluster-aligned data into secondary cache 161 will be removed from the list of read segments (e.g., lists 1208, 1209) and may be added to a list (not shown) of segments already copied to secondary cache 161. Otherwise, the segment remains on the list(s) 1208, 1209 of available read segments. If criteria (d), (e), or (f) above are not met, the segment is not eligible to be copied to the secondary cache, although at some later time it might be, e.g., if secondary cache priorities are changed.

Figure 13:
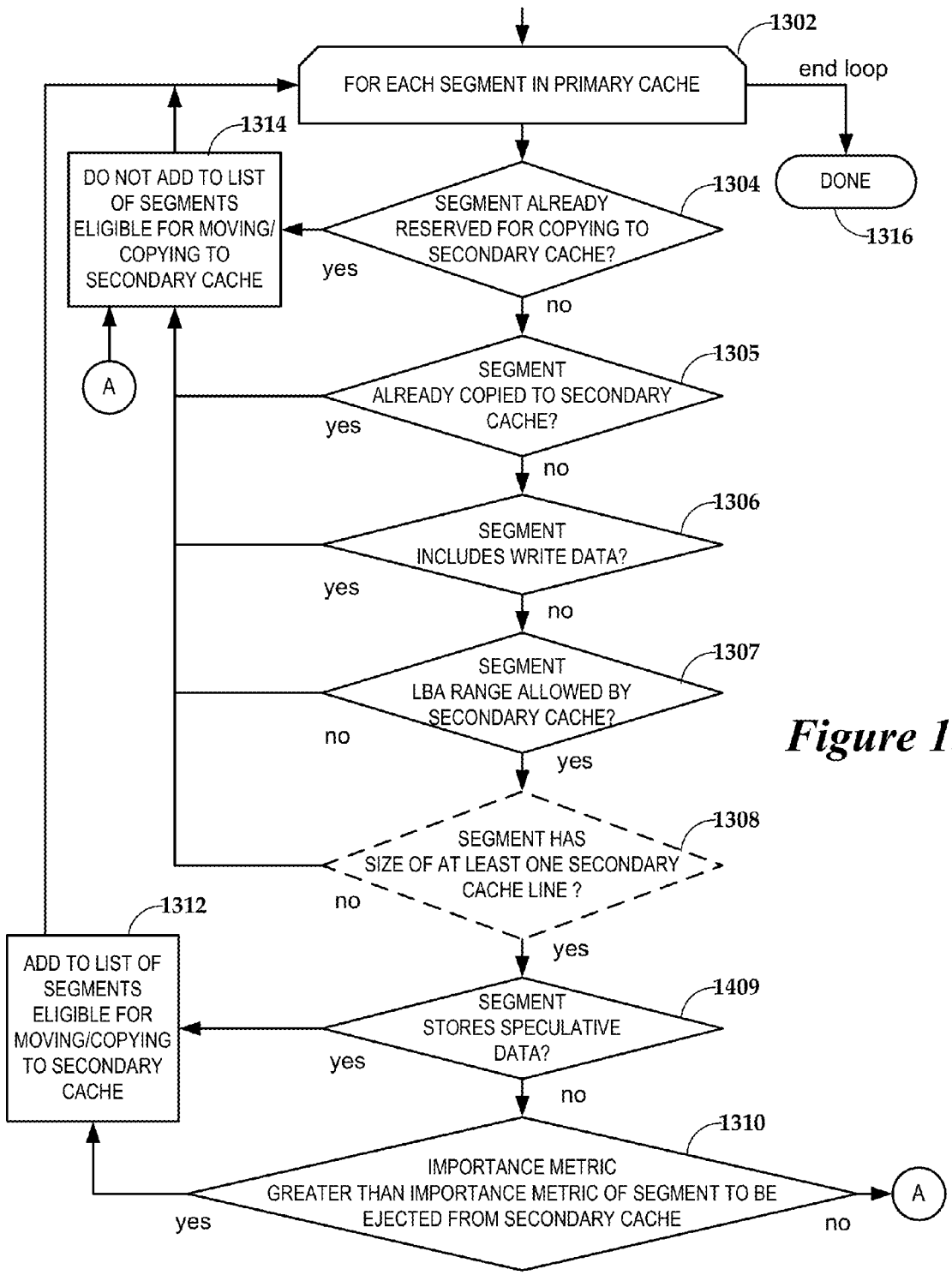
FIG. 13 is a flowchart illustrating a procedure to segments eligible for copying to a secondary cache according to an example embodiment.

In reference now to FIG. 13, a flowchart illustrates a procedure for selecting primary cache segments available for copying to a secondary cache according to an example embodiment. The procedure iterates through all the currently used segments as indicated by loop entry point 1302. Alternatively, the loop 1302 may iterate just through eligible segments with a "read" usage type, which excludes data of "promoted" or "write" usage types. Decision blocks 1304-1308 represent criteria (a)-(e) described above. Note that decision block 1308 is indicated as optional, based on whether the system is designed to ensure data is selected to fully fill out secondary cache lines. Decision blocks 1309-1310 relate to criterion (f) above.

Note that if loop 1302 only iterates through eligible "read" usage type segments, then the check at 1305 may not be needed. However, the check at block 1306 may still be used. For example, in some cases "write" data is characterized during idle time, and/or "write" data can be re-characterized as read data via segment merging or other events. In such a case, a segment marked as a "read" usage may still have unverified write data. In such a case, the segment would be disqualified for copying to secondary cache.

If the respective decision blocks 1304-1310 have the indicated outcomes ("yes" or "no", as appropriate), the selected segment is added 1312 to a list of segments eligible for copying to the secondary cache, otherwise the selected segment is not added 1314. This repeats for each segment until exiting the loop at 1316. It should be noted that the order of decision blocks 1304-310 is shown for purposes of example, and can be arranged in any order. For example, the decision blocks 1304-1310 that most often leads to finishing loop via 1314 would be placed first to reduce processing time in the loop 1302. After the procedure is completed, the list is updated with primary segments eligible for copy to the secondary cache. This list may be sorted, e.g., based on last access time, primary cache priority, etc. For example, by starting a search with the lowest priority entries and proceeding toward the higher priority entries lowers the probability of losing eligible data to eviction before it gets copied to secondary cache. Segments corresponding to elements at the end of the list (lowest primary cache priority) will be copied to the secondary cache under the appropriate conditions.

Figure 14A:
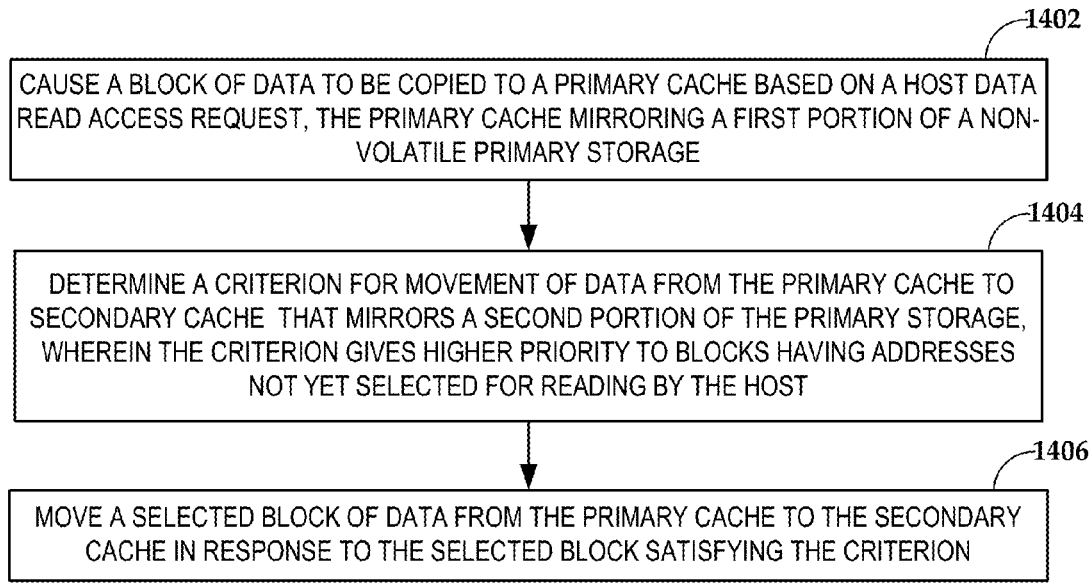
FIGS. 14A-14B are flowcharts of procedures according to example embodiments.

In reference now to FIG. 14A, a flowchart illustrates a procedure according to an example embodiment. The process involves causing 1402 a block of data to be copied in a primary cache based on a host data read access request. The primary cache mirrors a first portion of a non-volatile main storage. The procedure further involves determining 1404 a criterion for movement of data from the primary cache to a secondary cache that mirrors a second portion of the main storage. The criterion gives higher priority to blocks having addresses not yet selected for reading by the host. The criterion may also optionally give higher priority to the blocks having the longest elapsed time since last host access. The criterion may optionally prevent the movement of the data based on whether an address range of the blocks overlaps with a range of addresses already copied or reserved for copying to the secondary cache, and/or the data not satisfying a minimum size associated with a cache line of the secondary cache.

In response to the block of data being copied to the primary cache, a selected segment of data is moved 1406 from the primary cache to the secondary cache and in response to the selected segment satisfying the criterion. Moving the selected segment of data from the primary cache to the secondary cache may cause a cluster of the secondary cache to be evicted. In such a case, determining the criterion may optionally involve determining whether the selected segment has an equal or higher priority than the evicted cluster. In another arrangement, the secondary cache may be used for storing read data only. In such a case, the criterion may optionally prevent the movement of the data based the segment containing write data.

Figure 14B:
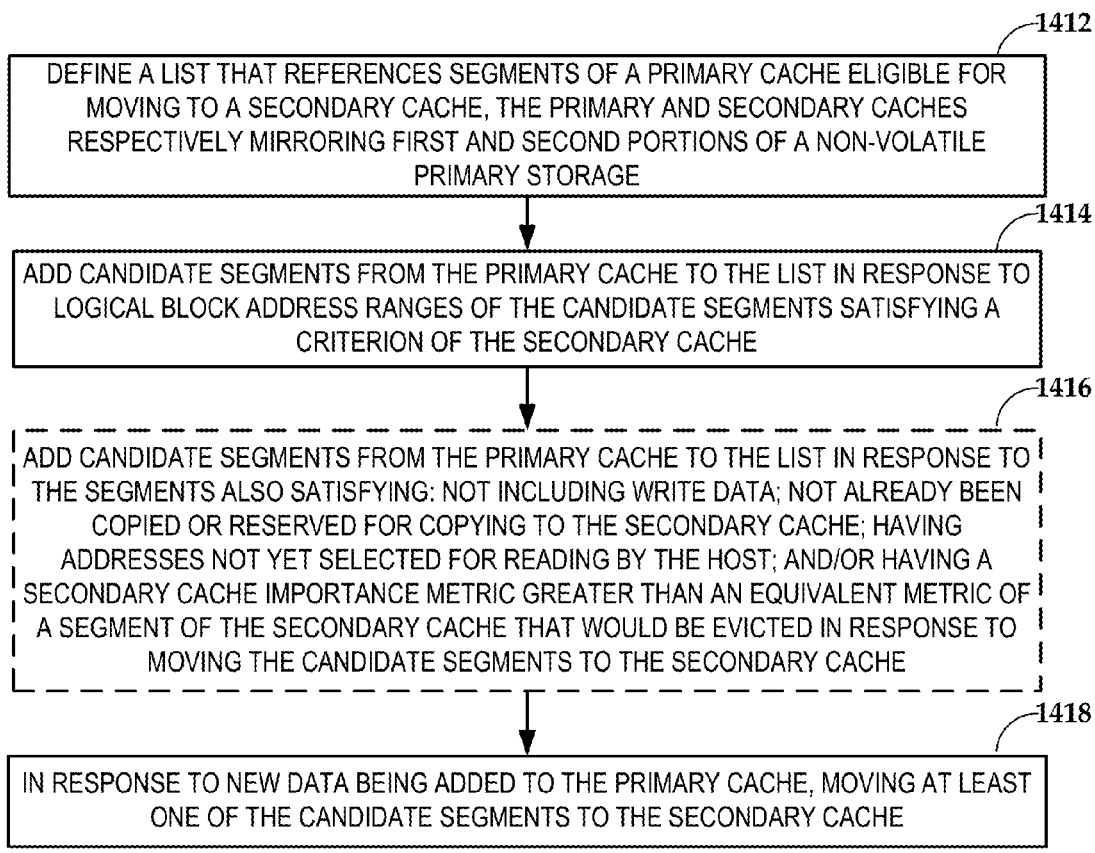

In reference now to FIG. 14B, a flowchart illustrates a procedure according to another example embodiment. The procedure involves defining 1412 a list that references segments of a primary cache eligible for moving to a secondary cache. The primary and secondary caches respectively mirror first and second portions of a non-volatile main storage. The list may include any data structure that stores a collection of data objects, in this example a reference to segments of the primary cache.

Candidate segments from the primary cache are added 1414 to the list in response to logical block address ranges of the candidate segments satisfying an address criterion of the secondary cache. The address criterion of the secondary cache may include a cache line size of the secondary cache. In such a case, the candidate segments satisfy the criterion if a size of the candidate segments is greater than or equal to the cache line size. The candidate range may also need to meet alignment requirements relating to the line size of the secondary cache. For example, the address criterion may also include an allowable starting logical block address of a cache line of the secondary cache. In that case, the candidate segments satisfy the criterion if a logical block address of the candidate segments satisfies the allowable starting logical block address. In an arrangement where the secondary cache stores read data only, the candidate segments may be added to the list further based on the candidate segments not including write data.

In optional block 1416, additional conditions may be used to add candidate segments from the primary cache. Those conditions may include candidate segments not including write data, not having already been copied or reserved for copying to the secondary cache, having addresses not yet selected for reading by the host, and/or having a secondary cache importance metric greater than an equivalent metric of a segment of the secondary cache that would be evicted in response to moving the candidate segments to the secondary cache.

In response to new data being added to the primary cache, at least one of the candidate segments is moved 1418 to the secondary cache. In one arrangement, the list is optionally sorted based on a primary cache priority of the candidate segments. In response to this sorting, candidate segments having a lower cache priority are selected for moving to the secondary cache ahead of candidate segments with a higher cache priority.

Now, referring back to FIG. 1B, some embodiments described above relate to priority schemes carried out by the FCI layer 182 to prioritize how data is written to the primary 163 and/or secondary 161 caches. Additional information regarding the functionality of the FCI layer is provided in the following concurrently filed U.S. patent application Ser. Nos. 13/542,990, 13/543,036, and 13/543,123 which are incorporated herein by reference.

Figure 15:
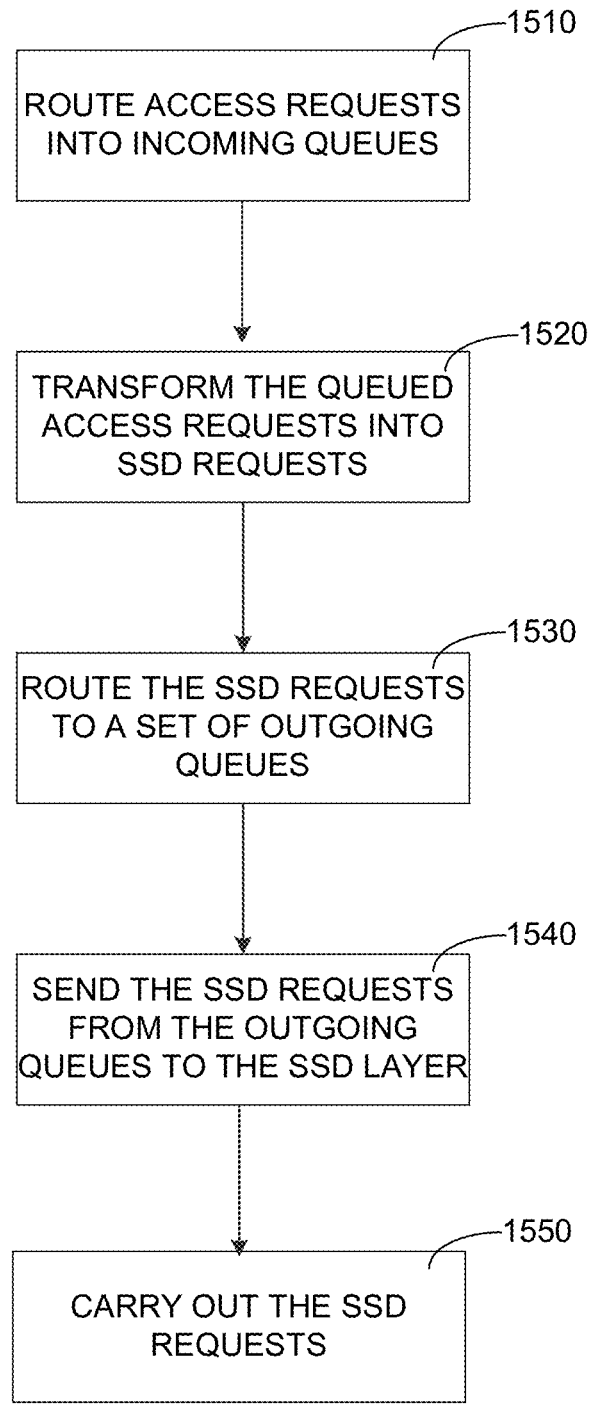
FIG. 15 is flow diagram illustrating a process of managing memory access requests in accordance with some embodiments.

Some embodiments described herein involve processes implemented in the FCTM layer 183 to manage memory access requests (to store or retrieve information to/from the secondary cache 161, etc.) received from the FCI layer 182 and sent to the SSD layer 184. The memory access requests may involve reading the flash memory (second cache), writing to the flash memory, and so forth. In various embodiments, management and implementation of the memory access requests is accomplished in the FCTM layer using a set of incoming queues and a set of outgoing queues. FIG. 15 is a flow diagram that illustrates a process of managing memory access requests in the FCTM layer. Memory access requests are received by the FCTM layer from the FCI layer and SSD memory access requests are sent to the SSD layer by the FCTM layer. Memory access requests (sometimes referred to herein as incoming memory access requests, or as incoming requests because these requests are incoming from the perspective of the FCTM layer) are received by the FCTM layer from the FCI layer. The incoming requests are routed 1510 into a set of incoming queues. The memory access requests queued in the incoming queues are transformed 1520 into SSD requests (sometimes referred to herein as outgoing memory access requests, or outgoing requests because these requests are outgoing from the perspective of the FCTM layer). The outgoing requests are routed 1530 to a set of outgoing queues. The outgoing requests in the outgoing queues are sent 1540 to the SSD layer which carries out 1550 the SSD requests to perform the operations specified in the SSD requests.

Figure 16A:
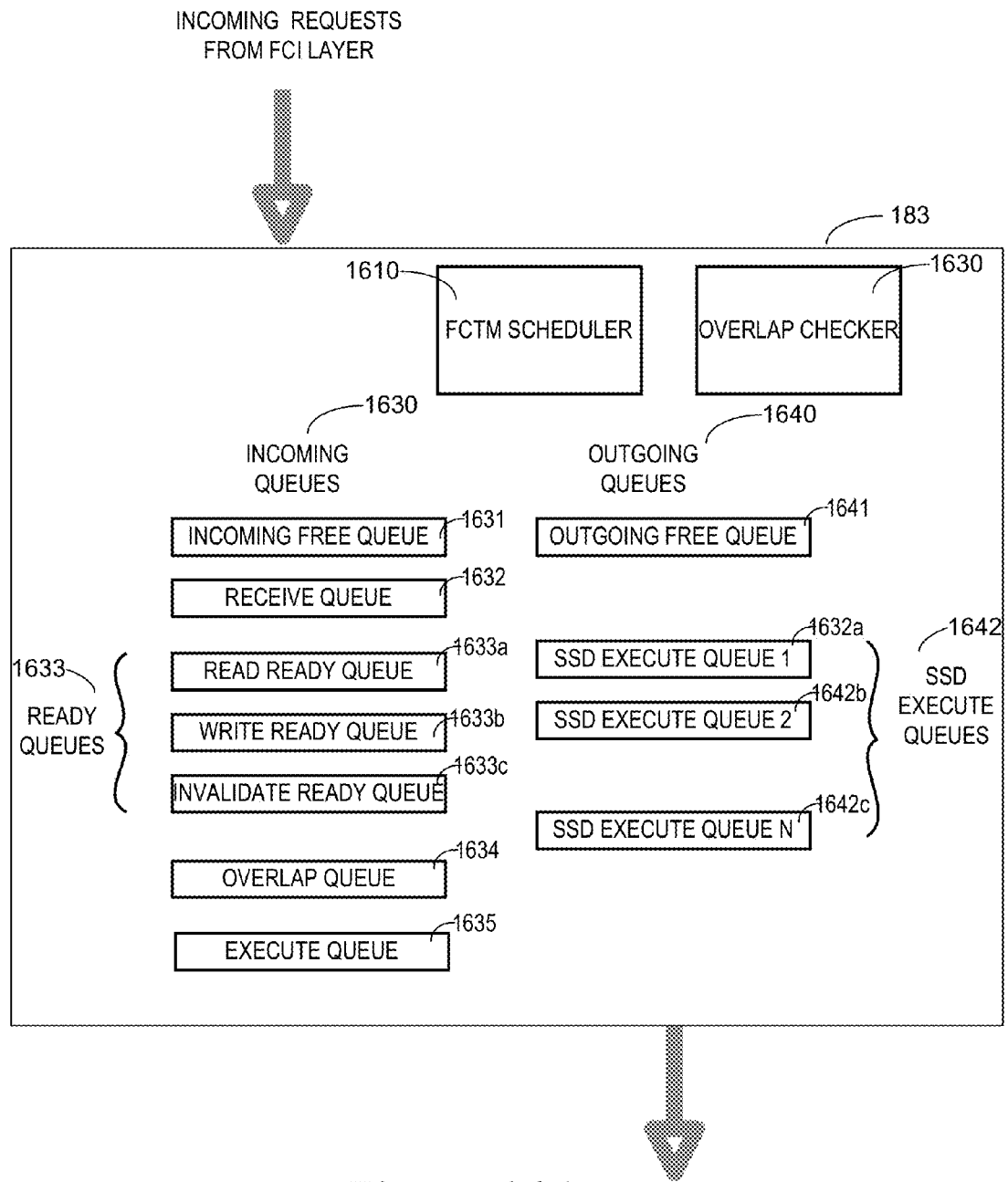
FIG. 16A illustrates the organization of various components of the a hybrid controller in accordance with some embodiments.
Figure 16B:
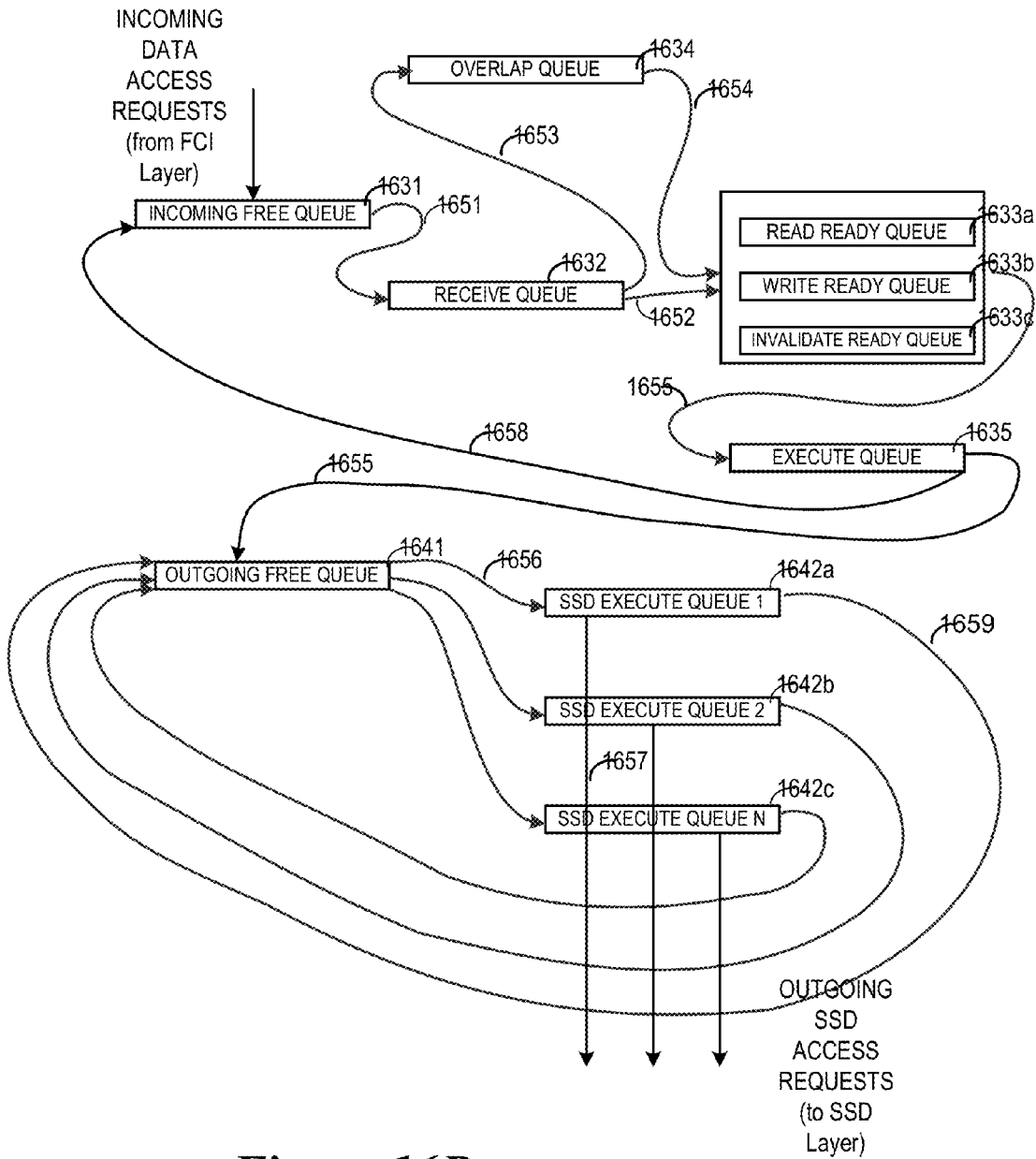
FIG. 16B diagrammatically illustrates the flow of memory access requests in various queues of the hybrid controller in accordance with various embodiments.

FIG. 16A illustrates the organization of various components of the FCTM layer 183, and FIG. 16B diagrammatically illustrates the flow of memory access requests/SSD requests among the queues. As depicted in FIG. 16A, the FCTM layer 183 includes a FCTM scheduler 1610 which is responsible for various operations of the FCTM layer 183 such as routing incoming memory access requests and/or outgoing requests among the various queues 1630-1642 of the FCTM layer 183. The FCTM layer 183 also includes an overlap checker 1620 configured to determine if there is an overlap between the memory access requests. An overlap may occur if there is an overlap in the host LBA ranges of two memory access requests.

The overall structure of the incoming queues 1630 and the outgoing queues 1640 is illustrated in FIG. 16A. The incoming queues 1630 include an incoming free queue 1631 of nodes which are used to control the flow of memory access requests into the receive queue 1632. Generally, the FCTM scheduler 1610 routes incoming memory access requests from the FCI layer into the receive queue 1632 only if a node is available in the incoming free queue 1631. In other words, the number of nodes in the incoming free queue 1631 represent the capacity of the FCTM layer 183 at any particular time to process incoming memory access requests.

As illustrated in FIG. 16B, if a node is available in the incoming free queue 1631, that node becomes "occupied" by an incoming memory access request when the memory access request is routed 1651 into the receive queue 1632. When a node is occupied by a memory access request, information about the memory access request is stored in the node. For example, the node may store information about the type of memory access request, the host LBAs involved in the memory access request, information about the progress of the memory access request, such as how much data has been transferred in conjunction with the memory access request, how much work to complete the memory access request is pending and so forth. If a node is not available in the incoming free queue 1631, then the FCTM layer does not have the capacity to process the incoming memory access request and an error message is generated.

The FCTM layer can process a number of types of memory access requests received from the FCI layer. FIGS. 16A and 16B, illustrate the process for three types of memory access requests—read requests, promotion requests, and invalidate requests. As explained in more detail herein, read requests are requests from the FCI layer to read host LBAs from the flash, promotion requests are requests to promote (write) host LBAs into the flash, and invalidate requests are requests to mark certain host LBAs in the flash as invalid (not containing valid data). In the illustrated example of FIGS. 16A and 16B, the FCTM layer 183 includes a separate ready queue 1633a, 1633b, 1633c for each type of request. However, in some implementations, at least some of the queues may be shared queues between different types of requests. Memory access requests are moved 1652 to the appropriate ready queue 1633a, 1633b, 1633c when they do not have any overlaps with other requests in the execute or ready queues and they are waiting to be routed to the execute queue to begin execution. A memory access request remains in the ready queue until there is at least one SSD resource available to execute the request. In illustrated example, SSD nodes that are available in the outgoing free queue represent SSD resources, thus if there is at least one available SSD node, the memory access request can be moved to the execute queue. The incoming memory access requests are transformed into a number of outgoing SSD requests which transferred to the SSD execute queues 1642a-b as outgoing nodes in the outgoing free become available.

Each read request, promotion request, and invalidate request has associated with it a particular address range (host LBA range). The FCTM layer 183 may transform one incoming memory access request (e.g., read request, promotion request, invalidate request) from the FCI layer into one or multiple SSD requests which the FCTM layer 183 issues to the SSD layer. Requests issued by the FCI layer 182 and received by the FCTM layer 183 are referred to herein as memory access requests or incoming FCI requests, or incoming memory access requests. Requests issued by the FCTM layer 183 to the SSD layer 184 are referred to herein as SSD requests, outgoing SSD requests, or as outgoing memory access requests. The FCTM layer 183 transforms each incoming memory access request that has an associated host LBA range into one or multiple outgoing memory access requests that each have an associated SSD LBA range or cluster of SSD LBAs. For example, the FCTM layer 183 implements an incoming a read request by generating one or more SSD requests that include an SSD LBA range. The FCTM layer 183 implements an incoming promotion request by generating one or more outgoing SSD requests that include a cluster of SSD LBAs; the FCTM layer 183 implements an incoming invalidate request by generating one or more outgoing SSD requests that include a cluster of SSD LBAs.

As previously discussed, the FCTM layer 183 includes an overlap checker 1620 which operates in conjunction with an overlap queue 1634. As best illustrated in FIG. 16B, requests in the receive queue 1632 may be routed 1653 into the overlap queue 1634 when an overlap in memory access requests is identified by the overlap checker 1620. An overlap may occur if there is an overlap in the address range (e.g., host LBA range) of two memory access requests. For example, an overlap can occur if a read request and a promotion request have overlapping address ranges. In this example, assuming the promotion request is received in the FCTM layer before the read request, the promotion request may be completed before the read request is moved to the read ready queue to avoid overlap conflicts. During the time that the promotion request is in the promotion ready queue 1633b or the execute queue 1635, the read request remains in the overlap queue 1634. Appropriate management of overlapped memory access requests avoids erroneous data being read from or written to the flash memory 161. After the overlap has been cleared, the memory access request is routed 1654 into the appropriate ready queue 1633a-c.

If the FCTM layer 183 has at least one resource (an SSD node) available, the memory access request is transferred 1655 from a ready queue 1633a-c to the execute queue 1635. Execution of a memory access request in the execute queue 1635 involves transforming the memory access request in the execution queue 1635 into a number of SSD requests that provide instructions to the SSD layer 184 to carry out the memory access request. A memory access request from the FCI layer includes a host LBA range and this host LBA range is transformed to an SSD LBA range by the FCTM layer. In some implementations, the FCTM internally keeps track of the host LBA range in terms of clusters (groups) of n host LBAs (referred to as host LBA clusters) and keeps track of the SSD LBA range in terms clusters of n SSD LBAs. Transformation of contiguous clusters of host LBAs may or may not be transformed into contiguous clusters of SSD LBAs. After the SSD request is transferred to the SSD layer, the SSD layer may convert the SSD LBA range included in the SSD request to flash address (die, block and page). For execution of a memory access request to begin, the outgoing free queue 1641 must have available at least one available node, otherwise an error message is generated. Different types of memory access requests may be transformed into different numbers of SSD requests which is associated with the amount of work required by the type memory access request. For example, an invalidate request may occupy a first number of nodes, e.g., only one node, whereas a read or promotion request may occupy a larger number of nodes.

In some cases, when a particular memory access request in the execute queue 1635 is transformed into a number of SSD requests, one, e.g., only one, of the SSD execute queues 1642a-c will include all the SSD requests associated with the incoming memory access request in the execute queue 1635. Each of the SSD requests represents outstanding work to the SSD layer. As nodes become available in the outgoing free queue 1641 to execute a memory access request in the execute queue 1635, those available outgoing nodes become "occupied" 1655 by the SSD requests associated with the memory access request which is being executed. The SSD requests associated with the memory access request being executed are transferred 1656 to an SSD execute queue 1642a-c. The memory access request being executed may remain in the execute queue 1635 (occupying a node from the incoming free queue) until execution of the memory access request by the FCTM layer is complete. Execution of a memory access request in the FCTM layer may be deemed to be complete when the responsibility for processing the memory access request is transferred from the FCTM layer 183 to the SSD layer 184. This occurs after all the SSD requests associated with a memory access request are issued to the SSD layer. For example, responsibility may be transferred when the last SSD request associated with a memory access request is successfully transferred 1657 to the SSD layer or when the last SSD request associated with the memory access request has been successfully completed by the SSD layer and acknowledgement of the successful completion of the SSD request has been received by the FCTM layer.

When execution of a memory access request is complete, the node from the incoming free queue that was previously occupied by the incoming memory access request in the execute queue 1635 is returned to the incoming free queue 1631. The previously occupied node becomes available again for being occupied by subsequent memory access requests. Each of the nodes in the SSD execute queue associated with the memory access request being executed are returned 1659 to the outgoing free queue 1641 as the SSD requests occupying these nodes are completed. The previously occupied SSD nodes become available again to be occupied by subsequent SSD requests. In some cases, an error occurs when one or more SSD requests are transferred to the SSD layer. When an error occurs in the processing of SSD requests associated with a memory access request, the node used to process the incoming memory access request may be returned to the incoming free queue, and the SSD nodes used to process the outgoing SSD requests may be returned to the outgoing free queue. In other words, the processing of the incoming memory access request is cancelled and not completed when an error occurs.

In some implementations, incoming memory access requests from the FCI layer to the FCTM layer is restricted meaning that during a time that the FCTM layer is processing a memory access request then the FCI layer is barred from issuing another memory access request to the FCTM layer. Implementations that restrict additional incoming memory access requests from the FCI layer protects the FCTM layer from excessive combinations of possible events affecting the FCTM layer and enhances the thread safety of the layer. In some implementations the code, e.g., all of the code, that manages the queues is executed on a single thread and none of the data structures of the FCTM layer, e.g., the queues can be used are manipulated by external entities, e.g., other layers of the hybrid controller.

A priority scheme may be used for transferring the incoming and/or outgoing memory access requests between queues. In some cases, the priority scheme may be multi-tiered, wherein a first level of priority is implemented by the FCTM scheduler to select incoming memory access requests from the ready queue and a second level of priority is implemented by the FCTM scheduler when assigning SSD nodes from the outgoing free queue.

A priority scheme, e.g., first level priority, may be used to select requests from the ready queues for transfer to the execute queue. According to one priority scheme, requests that require the least resources and/or are faster to execute may be selected for execution before requests that require more resources and/or are slower to execute. For example, invalidate requests present in the invalidate ready queue may be selected for execution before read or promotion requests in the read ready queue or promotion ready queue, respectively, because invalidate requests are the faster to execute. In general, invalidate requests execute faster than either read or promotion requests and read requests execute faster than promotion requests, thus the priority scheme may follow this order. For example, the invalidate requests may not require input/output (I/O) transferred via the PSM layer to the flash and may be executed by updating metadata in the FCTM layer and performing an unmap in the SSD layer, which also only involves the updating of metadata in the SSD layer. Requests that do not require I/O to the flash typically take the least amount of time to execute. Despite not requiring I/O to the flash, the FCTM scheduler may use an SSD node to keep track of and regulate the flow of invalidate requests.

Figure 17:
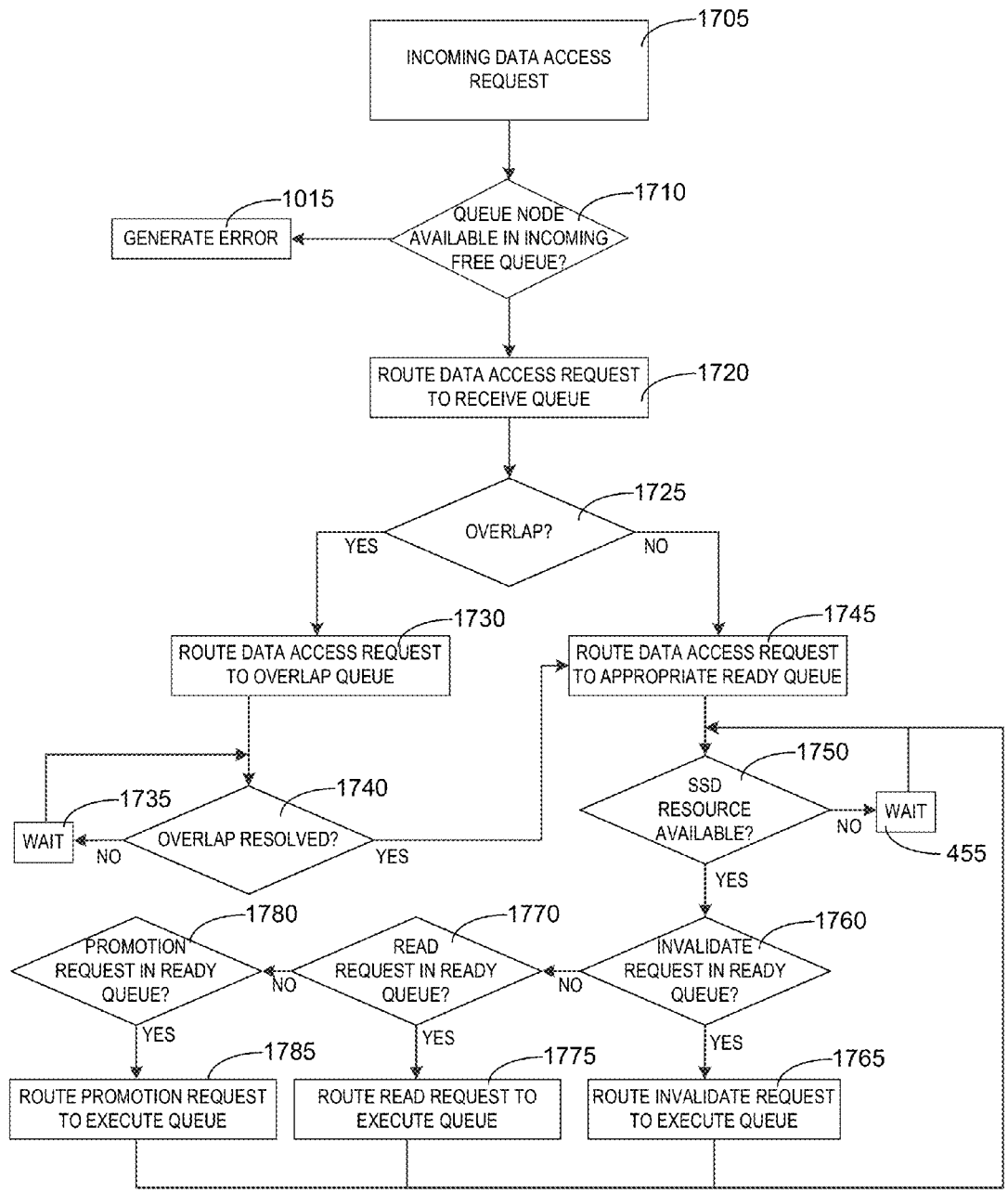
FIG. 17 is a flow diagram that illustrates a priority scheme that may be implemented to route memory access requests according to some embodiments.

The flow diagram of FIG. 17 conceptually illustrates an overview of one priority scheme that may be implemented by the FCTM scheduler for routing memory access requests from the ready queues to the execute queue. As previously discussed, for each incoming memory access request 1705, the FCTM scheduler routes the memory access request to the receive queue 1720 if there is a node available in the incoming free queue 1710. If there are no nodes available 1710 in the incoming free queue, the FCTM scheduler generates an error response which is sent to the FCI layer.

The FCTM overlap checker determines 1725 if the address range (host LBA range) of the memory access request that is routed to the receive queue overlaps with the address range of other memory access requests. If an overlap is not detected 1725, the memory access request is routed 1745 to the appropriate ready queue. If an overlap is detected 1725, the memory access request is routed 1730 to the overlap queue. Data access requests routed to the overlap queue wait there until the overlap is resolved. If the overlap is resolved 1740, the previously overlapped memory access request is routed 1745 to the appropriate ready queue.

Data access requests wait 1755 in the ready queue until at least one SSD node in the outgoing free queue is available 450 for execution of the memory access request. Once an SSD node is available 1750, the priority scheme for routing memory access requests to the execute queue is implemented. If there is 1760 an invalidate request in the ready queue the invalidate request is routed to the execute queue 1765 and the process returns to the implementation of the priority scheme at step 1750. According to the priority scheme, if multiple invalidate requests are present in the invalidate ready queue, these invalidate requests would be processed until the invalidate ready queue is empty. If the invalidate ready queue is empty and there is 1770 a read request in the read ready queue, the read request is routed 1775 to the execute queue and the process returns to the implementation of the priority scheme at step 1750. If there are 1760, 1770 no invalidate requests or read requests in their respective ready queues and there is 1780 a promotion request in the promotion ready queue, the promotion request is routed 1785 to the execute queue and the process returns to the implementation of the priority scheme at step 1750.

In some scenarios, a priority scheme may be pre-emptive—involving pre-empting requests in the execute queue with requests in the ready queue. In some implementations such a pre-emption takes place if the request in the ready queue would take less time/resources for execution than the request in the execute queue. In one example, invalidate requests in the ready queue preempt promotion requests in the execute queue. Execution of the invalidate requests may cause a delay in the completion of the execution of the promotion request, however, this delay may be minimal because the invalidate requests can be executed very quickly if there is no I/O to the flash.

Figure 18A:
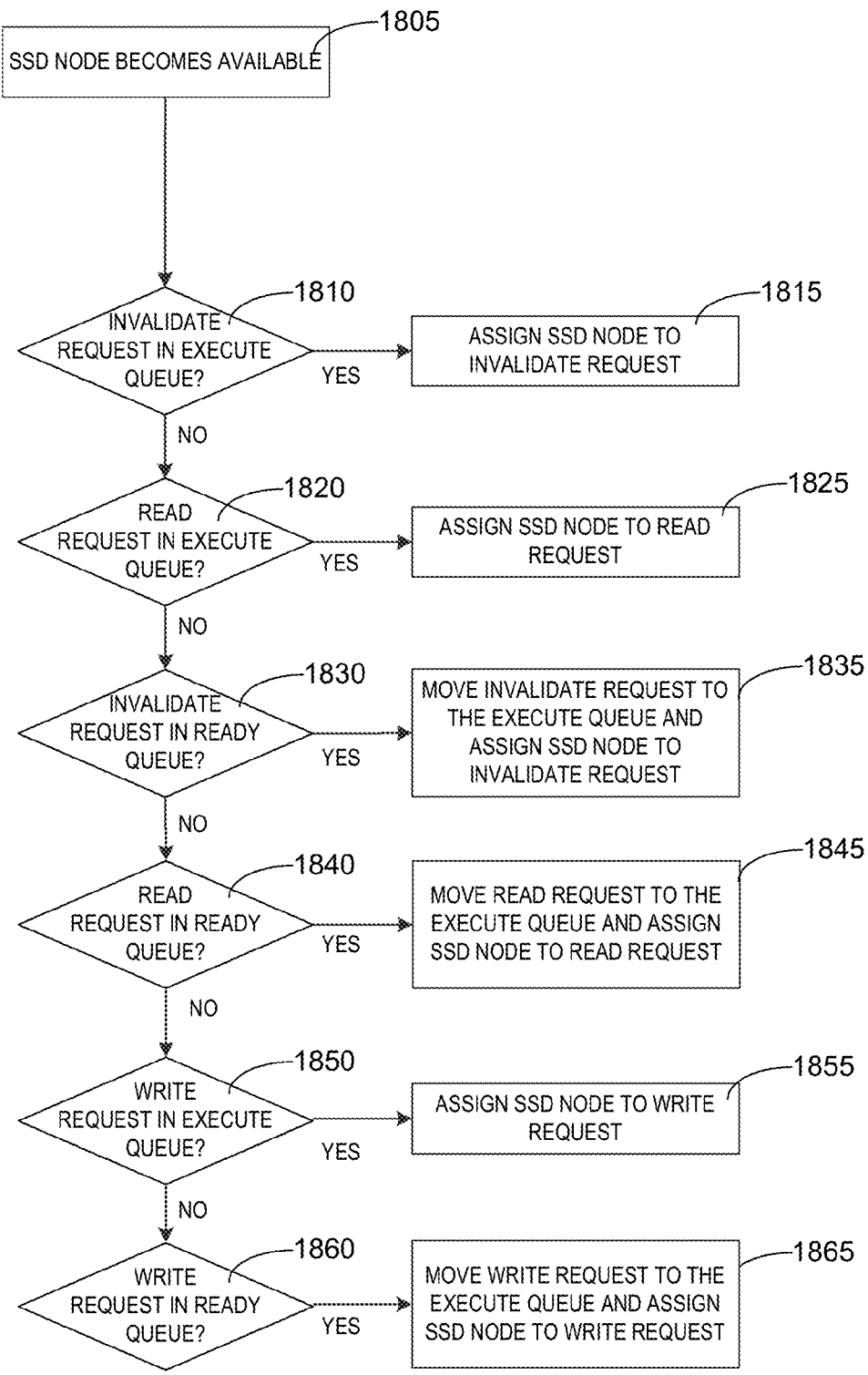
FIGS. 18A and 18B are flow diagrams that illustrate various priority schemes for managing memory access requests in accordance with various embodiments.

One possible implementation of a pre-emptive priority scheme is conceptually illustrated by the flow diagram of FIG. 18A. Such a priority scheme may be implemented alone or as a second level of priority in conjunction with another priority scheme, e.g., the priority scheme discussed in connection with FIG. 17. After the work associated with an SSD request occupying an SSD node is completed, the SSD node is returned to the outgoing free queue and becomes available 505 again. A priority scheme is implemented that determines the memory access request to which this available SSD node is next assigned. According to the priority scheme of FIG. 18A, if 1810 there is an invalidate request in the execute queue, the SSD node is assigned 1815 to the invalidate request. If 1820 there is a read request in the execute queue, the SSD node is assigned 1825 to the read request. If 1830 there is an invalidate request in the ready queue, the invalidate request is moved to the execute queue and the SSD node is assigned 1835 to the invalidate request. If 1840 there is a read request in the ready queue, the read request is moved to the execute queue and the SSD node is assigned 1845 to the read request. If 1850 there is a promotion request in the execute queue, the SSD node is assigned 555 to the promotion request. If 1860 there is a promotion request in the ready queue, the promotion request is moved to the execute queue and the SSD node is assigned 535 to the promotion request. The priority scheme illustrated in FIG. 18A provides for an optimal ordering in the execution of requests to achieve minimal host request latency.

Note that the priority scheme illustrated in FIG. 18A may mean that a request in the execute queue may be pre-empted by a request for which execution has not yet started. The preempting request may be in the ready queue and, if so, the pre-empting request would be moved to the execute queue and the available SSD node would be assigned to it. Thus, the pre-empting request may delay the execution of a request in the execute queue that is currently being executed.

Figure 18B:
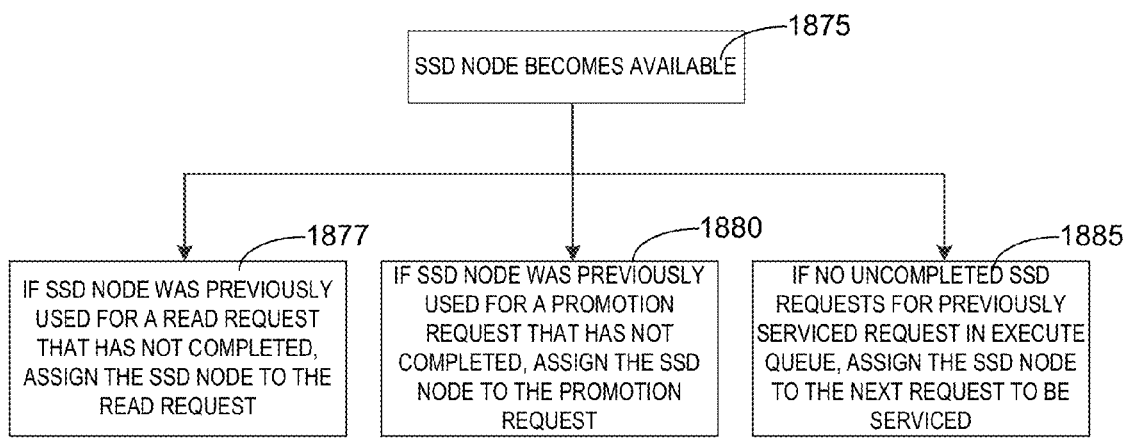

FIG. 18B illustrates another priority scheme that may be used to select requests for assigning available SSD nodes. The priority scheme illustrated in FIG. 18B may be used as a second level priority scheme in conjunction with the priority scheme of FIG. 17. As previously discussed, the SSD nodes are used for SSD requests that implement an incoming memory access request. More than one SSD request may be needed for a single memory access request in the execute queue. If an SSD request occupying an SSD node completes, the node becomes available 1875 to service another SSD request. According to the priority scheme of FIG. 18B, the SSD nodes that become available and have been used to service SSD requests for a particular memory access request in the incoming execute queue would be used to service the next SSD requests for the same memory access request in the execute queue until that memory access request is complete. For example, if the SSD node that has become available was previously used by an SSD request generated in conjunction with a read request in the incoming execute queue that has not yet completed, then the SSD node is assigned 1877 to the next SSD request that services the read request in the execute queue. If the SSD node that has become available was previously used by an SSD request generated in conjunction with a promotion request in the execute queue that has not yet completed, then the SSD node is assigned 1880 to the next SSD request that services the promotion request in the execute queue. If the SSD node was used in conjunction with a memory access request that has completed, the SSD node is assigned 1885 to an SSD request associated with the next memory access request to be serviced.

Figure 19:
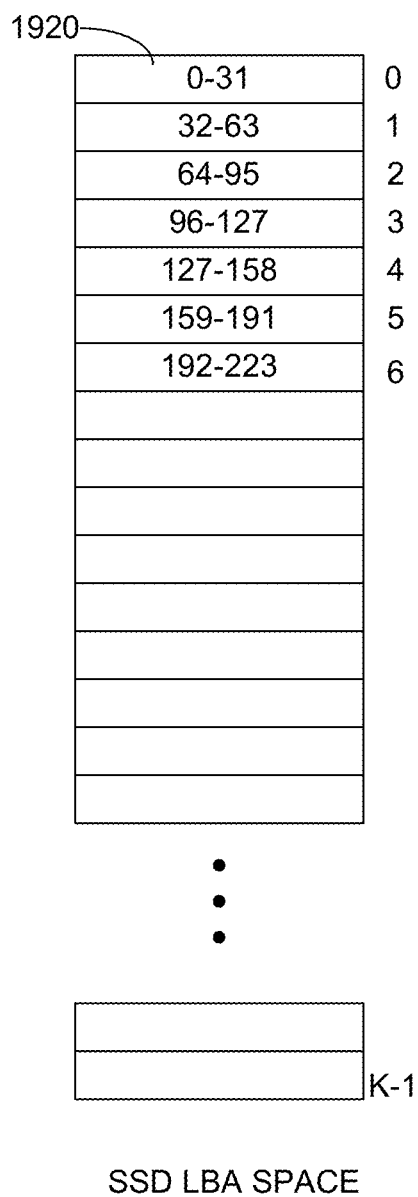
FIG. 19 illustrates the secondary memory space arranged as clusters of LBAs in accordance with some embodiments.

FIG. 19 conceptually illustrates the SSD LBA memory space 1920. As shown in FIG. 19, the SSD LBA space 1920 is partitioned into K clusters, each cluster comprising n sectors or LBAs (each sector is identified by a logical block address (LBA)), each sector comprising I bits of data. In the illustrated example of FIG. 19, n=32, although, in general, the number of clusters, K, and the number of sectors per cluster, n, may be any nonzero number.

Figure 20:
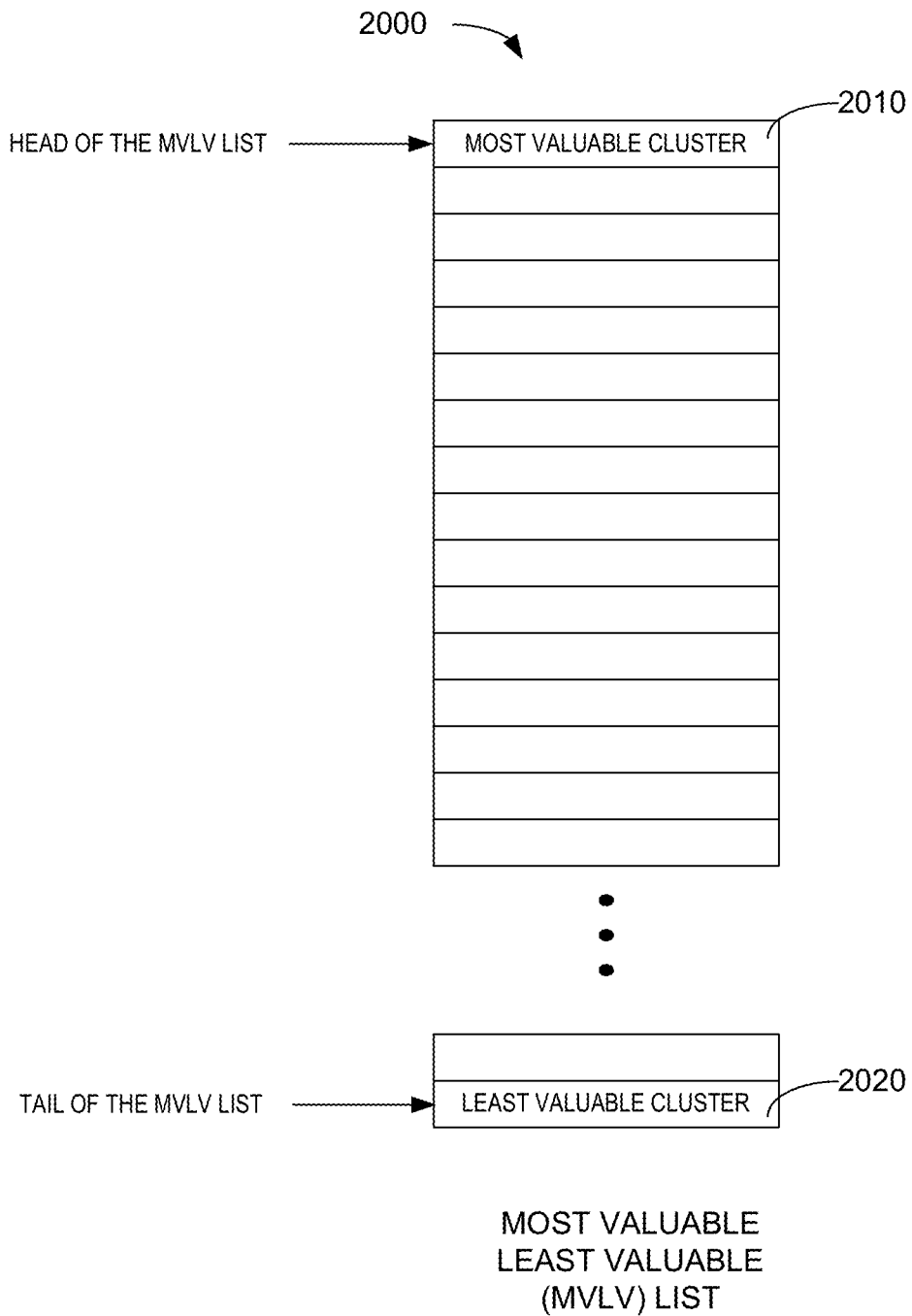
FIG. 20 illustrates a most valuable least valuable list that may be maintained by the hybrid controller of some embodiments.

In some scenarios, the flash memory may be full when a promotion request is executed. If so, the FCTM may cause some data stored in flash to be evicted. To implement evictions, as illustrated in FIG. 20, the FCTM layer maintains least recently used LRU or a most valuable least valuable (MVLV) list of clusters 2000 which ranks the value of the clusters according to some criteria, which may be based on one or a number of factors such as which of the clusters was most/least recently used and/or which of the clusters is most frequently/least frequently used, for example. One end of the MVLV list 2010 is referred to herein as the head, which is the position of the currently most valuable cluster, and the opposite end 2020 of the MVLV is referred to as the tail, which is the position of the currently least valuable cluster. If the flash memory is full and a promotion request is executed, the cluster at the tail 2020 of the MVLV list is selected for eviction. In some implementations, when a cluster is read or written, that cluster becomes the most valuable cluster, because it was most recently used, and is moved to the head of the MVLV list 2010.

The FCTM layer maintains list, e.g., linked list, of free SSD LBA clusters (denoted the free list) and/or maintains a list, e.g., linked list, of in-use SSD clusters (denoted the use list). The free list includes SSD clusters that are available for use. The use list includes SSD clusters that contain valid data and are not available to accept new data. In some cases one or more SSD clusters may be in a detached state during which the SSD clusters are not in either the use state or the free state. These SSD clusters do not appear in either of the free list or the use list. An SSD cluster may be in a detached state, for example, during the time that the clusters are involved in execution of a request, e.g., during the time that data is written to the clusters.

Figure 21:
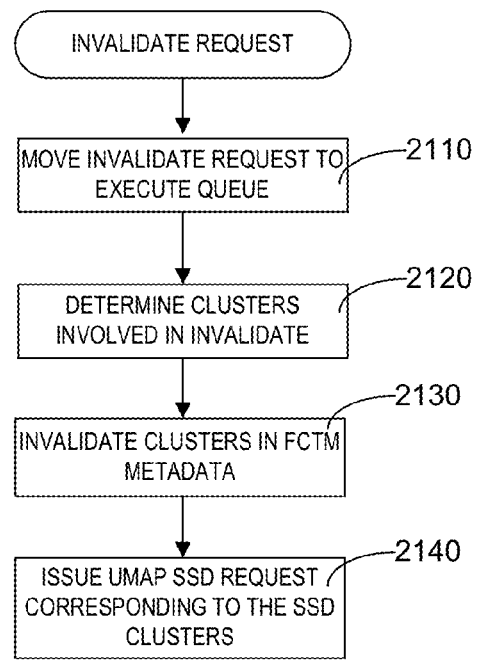
FIGS. 21, 22, and 23 are flow diagrams that illustrate implementation of invalidate, read, and promotion requests, respectively.
Figure 22:
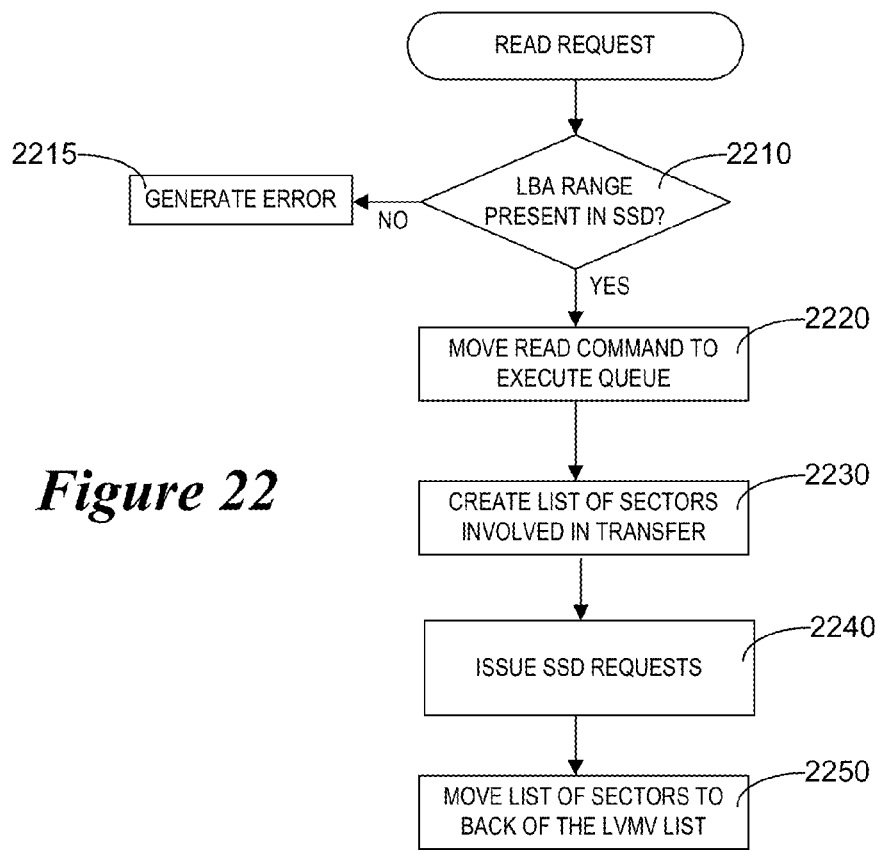
Figure 23:
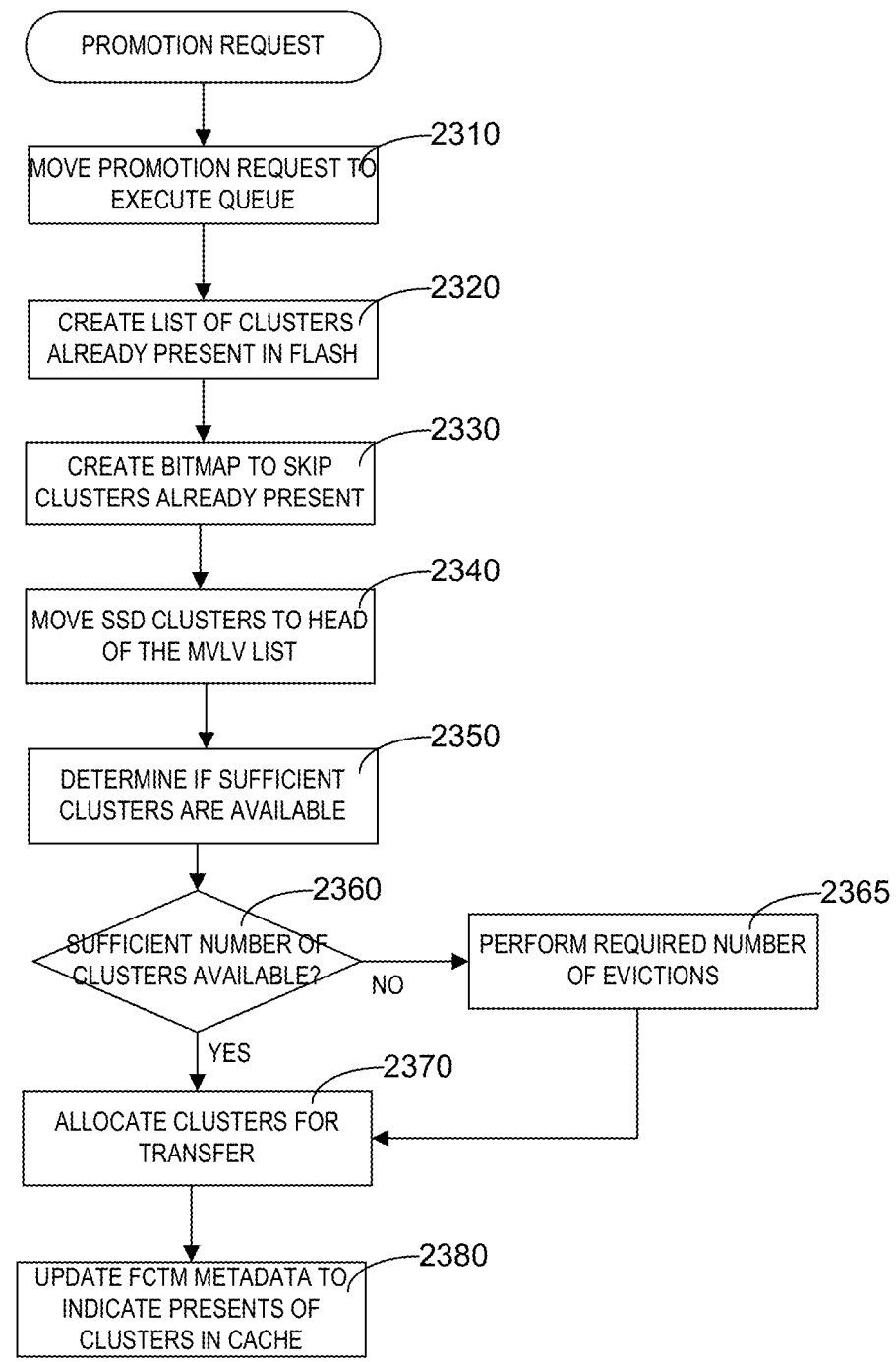

The flow diagrams of FIGS. 21, 22, and 23 conceptually illustrate some steps involved in the execution of invalidate, read, and promotion requests, respectively, performed by the FCTM layer. As previously discussed, each incoming memory access request includes a command portion and a host LBA range. The command portion identifies the type of request and the host LBA range indicates the host LBAs involved in the request. In addition, a promotion request is associated with the data to be written to the LBA range specified in the promotion request.

An invalidate request issued by the FCI layer identifies a cluster aligned range of host LBAs to be invalidated. A cluster aligned LBA range means that the start of the LBA range and the end of the LBA range are not arbitrary, but are multiples of n, which is the number of sectors per cluster. Referring to the flow diagram of FIG. 21, the invalidate request is transferred 2110 to the execute queue. The FCTM layer maps the cluster aligned LBA range of the incoming memory access request to the SSD LBA clusters and determines 2120 the SSD LBA clusters involved in the invalidate request. The SSD clusters are invalidated 2130 (marked as containing invalid data) in the FCTM metadata. An SSD request sent by the FCTM layer to the SSD layer comprises 2140 an unmap request for the corresponding flash memory clusters. The invalidated SSD LBA clusters can be moved to the free cluster list maintained by the FCTM layer in its metadata. Note that implementation of an invalidate request does not require any work performed by the flash A read request involves reading data corresponding to an arbitrary range of LBAs from the flash memory. The host LBA range of a read request from the FCI is not necessarily cluster aligned. There may be an upper bound on the number of LBAs that can be included in the read request. In the example illustrated in FIG. 22, the FCTM layer initially performs a check to determine if 2210 the range of host LBAs specified by the read request is fully present in the flash. If the range of host LBAs is not fully present, the read request is rejected and an error response to the FCI layer is generated 2215. The error response notifies the FCI layer to obtain the data requested from the primary memory, e.g., the magnetic disk. If the range of LBAs specified by the read request is fully present in the flash memory, then the read request is moved 2220 to the execute queue. The FCTM maps the host LBA range to the SSD LBAs. A list of SSD LBAs in the read request is created 2230. The FCTM layer issues 2240 one or more SSD requests to the SSD layer that specify the SSD LBAs to be read. The list of SSD LBA clusters that include the SSD LBAs of the read request may be made most valuable, e.g. moved 2250 to the head of the MVLV list.

As shown in FIG. 23, a promotion request involves writing a cluster aligned range of host LBAs to the flash memory. There may be an upper bound imposed on the number of LBAs that can be included in one promotion request. The promotion request is moved to the execute queue 2310. A list of the SSD LBA clusters corresponding to the cluster aligned host LBA range specified in the promotion request that are already present in the flash is created 2320. The clusters already present in the flash are denoted overlapped clusters. A bitmap is created 2330 to skip over the SSD LBA clusters that are already present in the flash. The process of determining the clusters already present in the flash and creating the bitmap mask facilitates conservative use of the flash memory space by maintaining a single copy of any host LBA in the flash. The overlapped SSD LBA clusters and the non-overlapped SSD LBA clusters are made most valuable by moving 2340 these clusters to the head of the MVLV list. The FCTM determines 2350 if there are a sufficient number of clusters available to store the clusters to be written into the flash. The clusters to be written to the flash are the clusters implicated by the promotion request that are not already present in the flash. If there are 2360 a sufficient number of clusters available, then clusters for storing the data are allocated 2370 and the SSD LBA clusters to be stored are transferred via the SSD layer to the flash. The metadata of the FCTM layer, i.e., the use list, is updated 2380 to indicate that these clusters are in use. If a sufficient number of clusters is not available 2360 (the SSD LBA space is saturated), then the FCTM layer will perform evictions 2365 to free up a sufficient number of clusters.

Eviction overlap may lead to data errors. Eviction overlap can occur when the address range being evicted overlaps with the address range of an outstanding command that is in the ready queue or the execute queue. The FCTM scheduler described in various embodiments discussed herein is arranged to operate so that eviction overlap is avoided.

If the flash memory is not saturated, i.e., there is a sufficient free space in the flash for promotion without evictions being performed, non-overlapping requests from the FCI layer can execute in any order. For an unsaturated flash, only overlapped requests are placed in the overlap queue. If the flash is saturated, evictions must take place in order to make room for promotion requests to be implemented.

Figure 24:
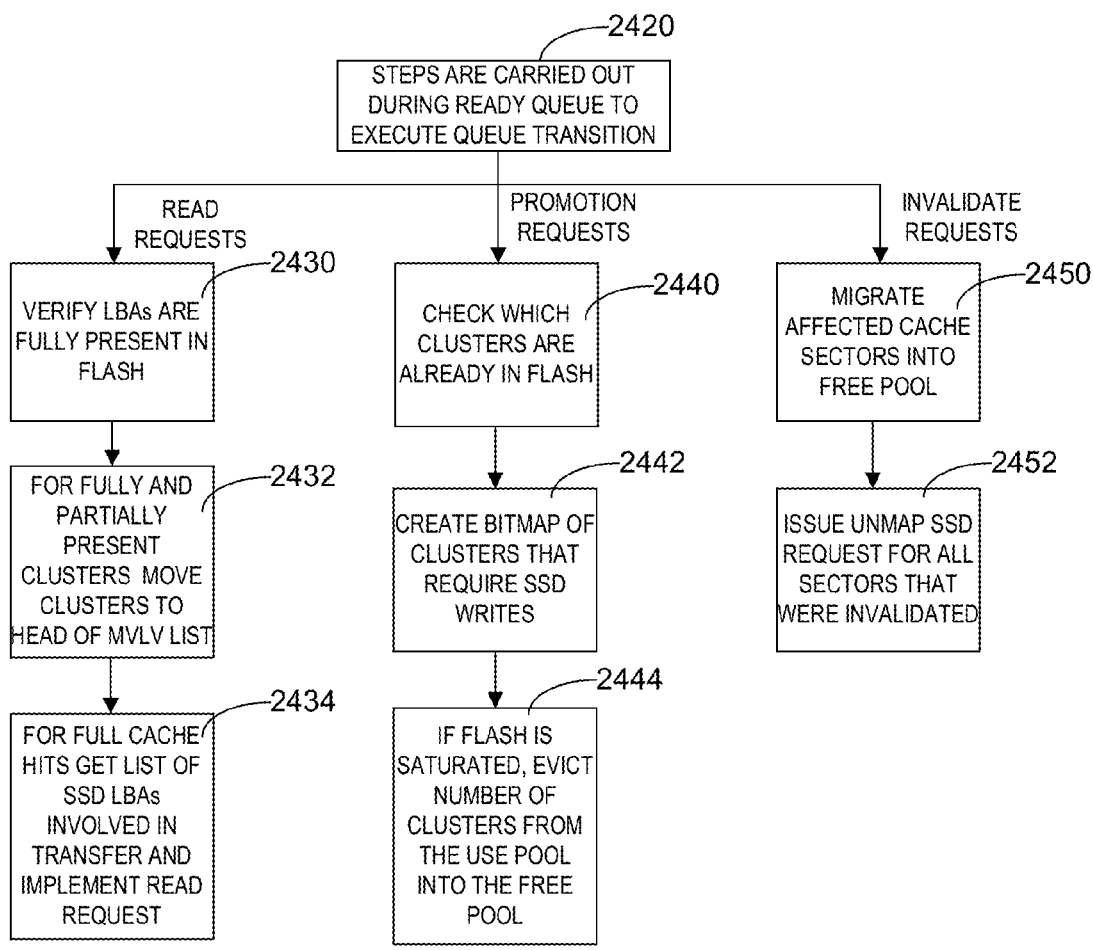
FIG. 24 illustrates processes that are carried out for various memory access requests during the ready queue to execute queue transition according to various embodiments.

As illustrated in FIG. 24, certain steps 2420 are carried out during the ready queue to execute transition for read, promotion, and invalidate requests. These steps may be implemented as atomic operations that are completed without interruption. Performing these steps atomically (without interruption) ensures that no other requests remove these SSD LBA clusters from the SSD LBA space before the request has executed. For example, if an invalidate request is received while a read request is executing, the invalidate request will move to the overlap queue so that the invalidate request does not interfere with the execution of the read request. If the invalidate request were serviced during execution of the read request, there is a possibility that the invalidate request would invalidate some LBAs involved in the read request.

For read requests, during the ready queue to execute queue transition, the FCTM scheduler verifies if the LBA range in specified in the request is 2430 fully present in the flash. If the range is not fully present, the read request is not executed and an error response is generated. The SSD clusters that correspond to the host LBA range of the read request (whether or not fully present) are made most valuable by moving 2432 these clusters to the head of the MVLV list. If the SSD clusters that correspond to the host LBA range of the read request are fully present in the flash, the FCTM scheduler creates 2434 a list the SSD clusters and implements the read request, as previously discussed.

For promotion requests, during the ready queue to execute queue transition, the FCTM scheduler checks 2440 to determine which SSD LBA clusters are already present in the flash and creates 2442 a bitmap of the overlapped SSD LBA clusters already present in the flash. The bitmap is used to skip writing the overlapped clusters to the flash. If the flash is saturated, the required number of clusters may be evicted 2444 to make room for the new clusters to be written as part of the promotion request.

For invalidate requests implemented, during the ready queue to execute queue transition, the FCTM scheduler migrates 2450 the SSD LBA clusters being invalidated into the free list of SSD clusters. The FCTM scheduler issues 2452 an unmap SSD request for the invalidated clusters.

Figure 25:
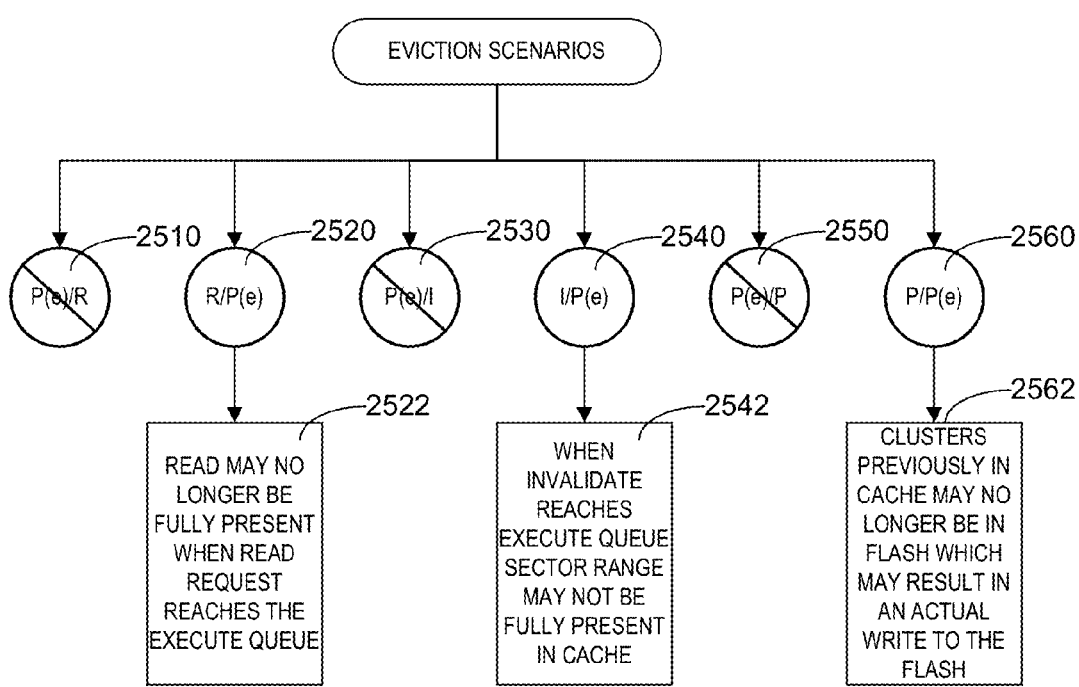
FIG. 25 conceptually illustrates various eviction scenarios according to some embodiments.

Note that evictions can occur in response to promotion requests. To analyze the potential for eviction overlap, the following scenarios are considered as illustrated in FIG. 25.

1. P(e)/R—a read request, R, precedes a promotion request with eviction, P(e) 2510. Eviction overlap in this situation is not possible because during the read requests' transition from the ready queue to the execute queue, the SSD clusters involved in the read request were moved to the head of the MVLV list. The SSD clusters of the read request will not be selected for eviction during the promotion operation with eviction because the clusters evicted prior to the promotion will be selected from the tail of the MVLV list.

2. R/P(e)—a read request follows a promotion request with eviction 2520. The host LBA range of the read request may no longer be fully present in the flash when the read request is executed 2522. If this occurs, the read request will be handled accordingly, e.g., by sending an error message to the FCI layer.

3. P(e)/I—an invalidate request, I, precedes a promotion request with eviction 2530. Eviction overlap in this situation is not possible because invalidate requests are completed synchronously and never remain in the execute queue. The same call chain that places an invalidate request in the execute queue also moves the node occupied by the invalidate request from the execute queue back to the free queue.

4. I/P(e)—an invalidate request follows a promotion request with eviction 2540. When the invalidate request reaches the execute queue, the cluster range may not be 2542 fully present in the flash. In this scenario, only clusters present in the flash will be invalidated.

5. P(e)/P—a promotion request, e.g., without eviction, P, precedes a promotion request with eviction 2550. Eviction overlap in this is not possible because when the preceding promotion request, P, is being executed the sectors being written to are detached (temporarily removed) from the use list and the free list and thus will not be evicted. The sectors written by the preceding promotion request, P, are moved to the head of the MVLV list after they are written.

6. P/P(e)—a promotion request, e.g., without eviction, follows a promotion request with eviction 2560. When the following promotion request, P, reaches the execute queue, there is a possibility that clusters specified in its SSD LBA cluster range may no longer be present in the flash, if these clusters were evicted by the preceding P(e) request. If the clusters are no longer present 2560, this may result in these clusters being written to the flash.

Figure 26:
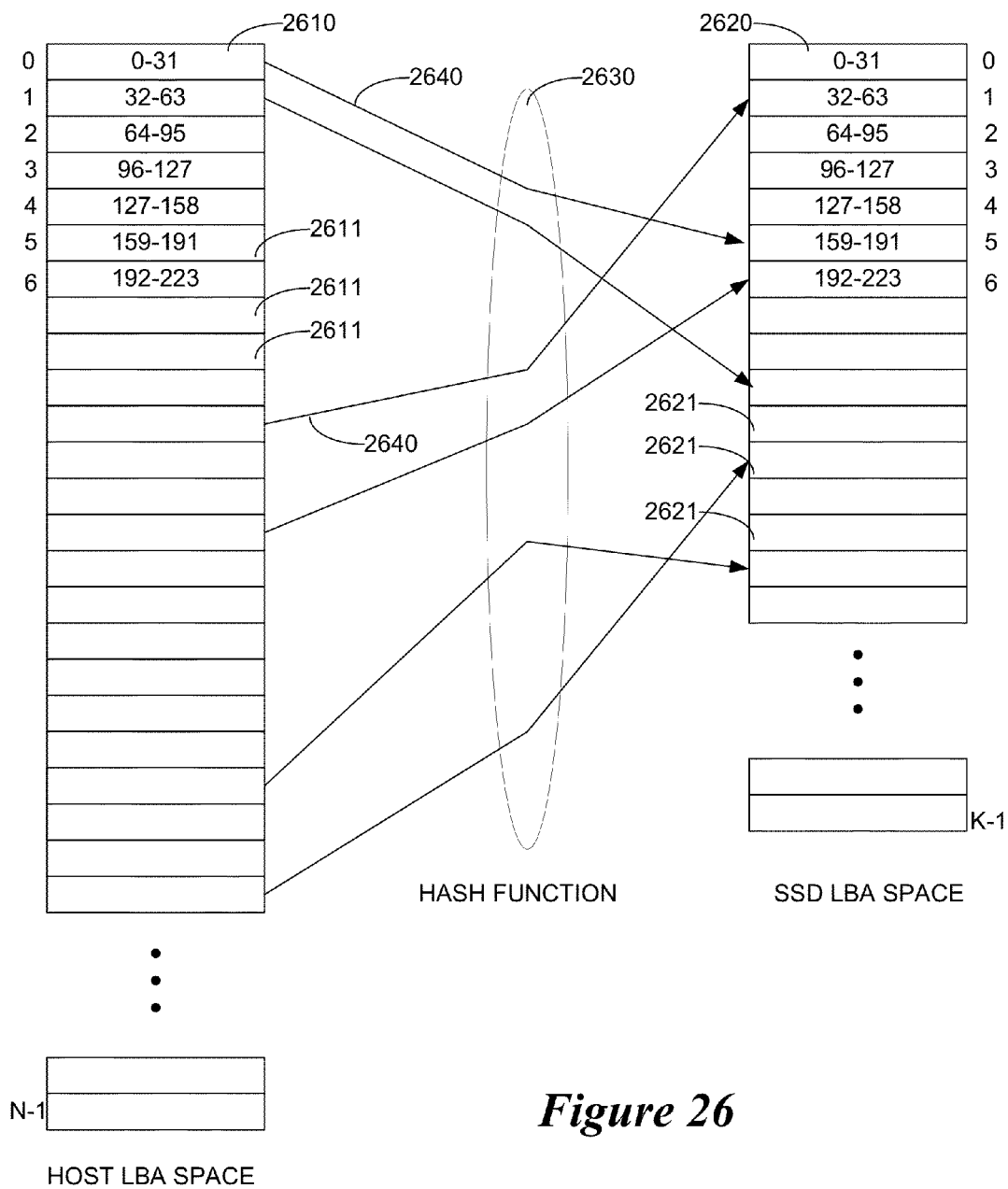
FIG. 26 illustrates a fully associative cache structure according to some embodiments.

The mapping of the host LBA clusters to the SSD clusters by the FCTM layer is fully associative meaning that any host LBA cluster can be mapped to any of the SSD LBA clusters, so long as there is room in the cache. FIG. 26 diagrammatically depicts mapping of the host LBA space 2610 to the SSD LBA space 2620. In the FCTM layer, the host LBA space is clustered into clusters of host LBAs and the SSD LBA space is clustered into clusters of SSD LBAs. In the host LBA space 2610 each cluster 2611 of host LBAs is uniquely identified by a number between 0 and N−1 and each cluster 2611 includes n contiguous sectors. In the SSD LBA space 2620, each SSD cluster 2621 is uniquely identified by a number between 0 and K−1 (K is typically less than N) and each cluster 2621 includes n sectors. The number of sectors per cluster, n, may be fixed and can depend on the size of a host sector, the geometry of the flash memory, the error correction code (ECC) used to store data in the flash memory, and/or other factors. In the example illustrated in FIG. 2, n=32, however, in other implementations, n may be greater than or less than 32. Furthermore, in general, n need not be a power of two.

In some implementations, and as shown in FIG. 26, the host sectors are aligned with the cluster boundaries. In other words, a host LBA is not allowed to span more than one host LBA cluster.

The mapping from host LBA space 2610 to SSD LBA space 2620 is accomplished by a hash function 2630. As previously discussed, the hash function can support fully associative caching with regard to clusters. In other words, the hash function 2630 allows any host cluster 2611 to be mapped to any SSD cluster 2621 as indicated by arrows 2640. However, the mapping may be constrained such that any host LBA can exist in only one SSD cluster at any given time. The offset within a cluster where an LBA is located within a cluster is fixed and is can be determined by the host LBA modulo the number of host LBAs per cluster, i.e., the remainder resulting from dividing the host LBA by n. Allowing a host LBA cluster to be mapped into any SSD cluster and ensuring that promotes and invalidates implemented by the FCTM layer are aligned to cluster boundaries avoids cache fragmentation.

Figure 27:
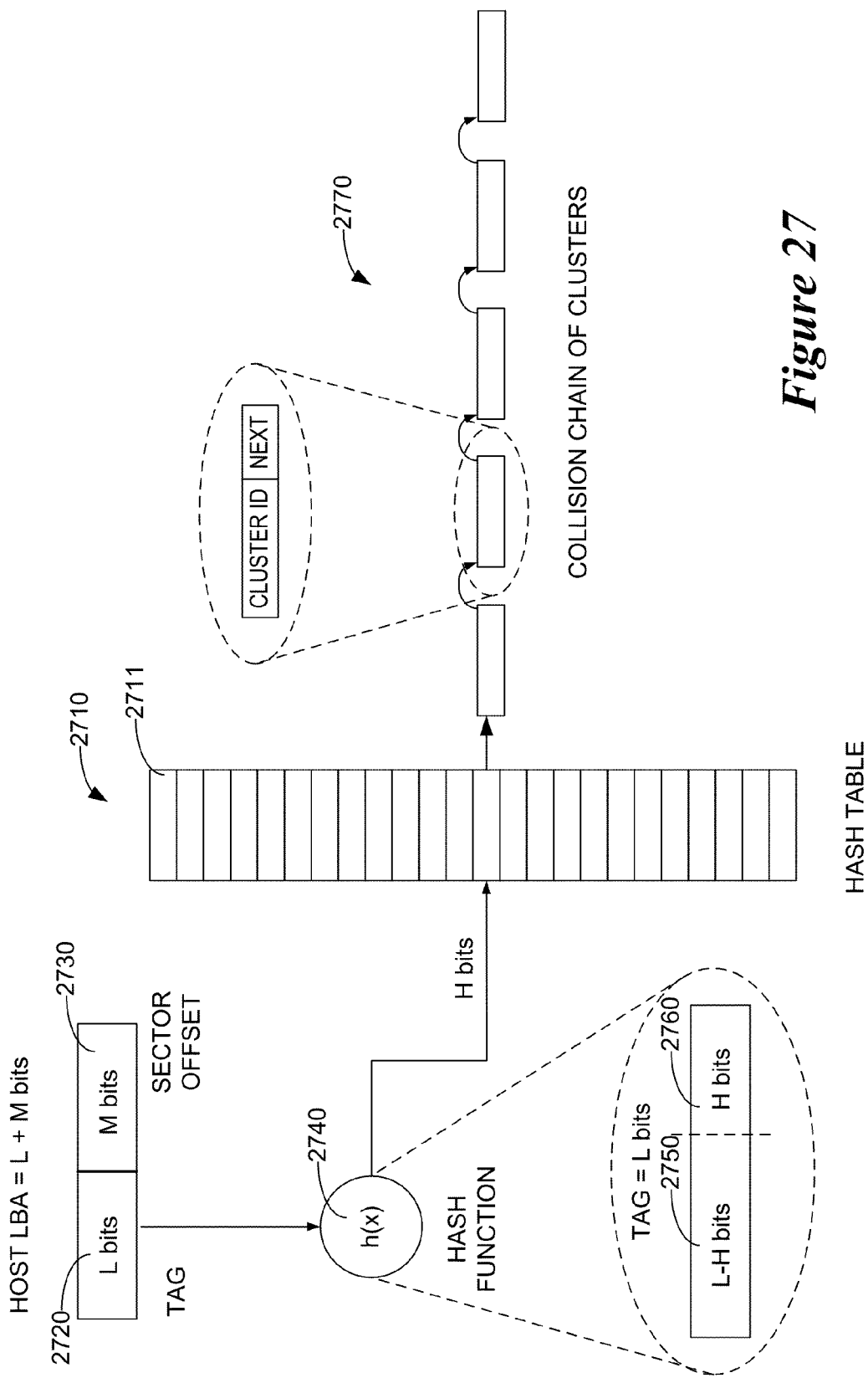
FIG. 27 illustrates a process of mapping host logical block addresses (LBAs) to cache LBAs in accordance with some embodiments.

FIG. 27 is a diagram that illustrates the implementation of the hash function which provides a process for keeping track of the host LBA clusters stored in the flash. In this example, the hash function 2740 is relatively simple, although more complex hash functions could be used. For most implementations, the hash function that is fastest is generally optimal. A hash table 2710 is used to keep track of the mapping of the host LBA space to the SSD space. A number, L, of the more significant bits 2720 of the host LBA are used as a tag to identify the corresponding cluster in the SSD LBA space. The remaining M less significant bits 2730 of the host LBA are used as a sector offset that identifies the sectors within the SSD cluster.

The hash function 2740 is used to convert the tag (upper L bits of the host LBA) into a hash table index in the hash table 2710. The entry in the hash table 2710 indicated by the hash table index 2711 (the tag converted by the hash function) points to one or more clusters in the SSD LBA space. For example, for a host LBA of L+M bits, the lower M bits can be used as a sector offset to identify the sector within an SSD cluster. The remaining L bits are used for the tag. The hash function 2740 operates on the tag 2720 to generate the index into the hash table 2710. For example, the hash function may discard the upper L-H bits 2750 of the tag and use the lower H bits as the hash table index. Discarding a portion of the tag means that in some cases a number of different host LBAs will map to the same entry in the hash table, and a collision will occur. An index 2711 in the hash table 2710 is associated with more than one cluster identification (ID) only if a collision occurs. In this scenario, $2^M$ host LBAs mapped to a cluster will all have the same tag. If the hash function discards the upper bits leaving only H lower bits for the hash table index, the theoretical maximum number of possible collisions (i.e., the number of clusters that map into the same SSD LBA space) is $2^{(L-H)}$. The L-H bits of the tag identify the cluster ID. The collisions are resolved using a linked list 2770. The linked list contains the cluster IDs that are hashed to the same entry in the hash table (i.e., have the same hash index). To access a particular cluster, the linked list is scanned for an entry with the correct cluster ID. For example, when the FCI layer requests a look up involving a particular host LBA cluster, the FCTM layer applies the hash function, and if there is a collision (two clusters that map to the same space) then the FCTM layer traverses through the linked list to locate the requested cluster.

The above description assumes that the number of host sectors per cluster is a power of two. However, non-power of two sector sizes may also be used. A representative set of host sector sizes that are supportable by the fully associative cache structure described herein include, but is not limited to, the following sector sizes: 512, 520, 524, 528, 4096, 4192, and 4224 bytes. For example, based on sector to cluster mapping calculations, there may be 30 5XX byte sectors per cluster (assuming a cluster is 16 KB of the flash, such as an 8 KB flash page size with dual plane support).

Non-powers of two can be handled by modifying the mapping described above as follows: The tag is determined as tag=host LBA/sectors per cluster, where/indicates an integer division via truncation and the host sector offset within the cluster is determined by host LBA modulo the sectors per cluster, i.e., the remainder after dividing the host LBA by the sectors per cluster.

The division and modulo operations can be implemented by executing a multiply instruction, e.g., a 64 bit multiply instruction on the FCTM processor, assuming the FCTM processor supports 64 bit multiple instructions. To facilitate the multiply, the value p=0xFFFFFFFF/sectors per cluster is pre-computed—is a constant value. The tag is now determined by tag=(host LBA*p)>>32, where * indicates a 64 bit multiply operation and where >>32 means that the result of (host LBA*p) is right shifted 32 times. Using this process, there is a possibility that the tag is off by one. To correct for this occurrence, the tag is incremented by one if the following condition is satisfied: (Host LBA−tag* sectors per cluster≥sector per cluster. The remainder can be similarly determined.

Additional information regarding the functionality of the FCTM layer is provided in the following concurrently filed U.S. patent application Ser. Nos. 13/543,079 and 13/543,100 which are incorporated herein by reference.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a computer-readable medium and transferred to the processor for execution as is known in the art. The structures and procedures shown above are only a representative example of embodiments that can be used to facilitate managing caching in data storage devices as described above.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. A controller comprising at least one hardware processor for a hybrid memory comprising a main memory and a cache for the main memory, the controller comprising a hierarchy of abstraction layers each abstraction layer configured to provide at least one component of a cache management structure, each pair of abstraction layers comprising processors communicating through an application programming interface (API), the controller configured to receive incoming memory access requests from a host processor and to manage outgoing memory access requests routed to the cache using the plurality of abstraction layers, wherein at least one of the abstraction layers is configured to:

receive the incoming memory access requests from the host processor, the incoming memory access requests including a range of host logical block addresses (LBAs);

route the incoming memory access requests to a set of incoming queues by implementing a priority scheme, the set of incoming queues comprising an incoming execute queue, the priority scheme comprising:

routing invalidate requests in the invalidate ready queue to the execute queue as a highest priority;

routing read requests in the read ready queue to the execute queue as a second highest priority; and routing promotion requests in the promotion ready queue as a third highest priority;

map the range of host LBAs into clusters of cache LBAs;

transform each incoming memory access request into one or more outgoing memory access requests, each outgoing memory access request including a range or cluster of cache LBAs;

route the outgoing memory access requests from the set of incoming queues into a set of outgoing queues, the outgoing queues comprising:

a set of outgoing execute queues, wherein each entry in the incoming execute queue is associated with a plurality of entries in an outgoing execute queue, and an outgoing free queue containing a number outgoing nodes, wherein an outgoing node is removed from the outgoing free queue when an outgoing memory access request is queued in one of the outgoing execute queues and the outgoing node is returned to the outgoing free queue; and access the cache using the outgoing memory access requests.

2. The controller of claim 1, wherein the main memory comprises a magnetic disk memory and the cache comprises flash memory.

3. The controller of claim 1, wherein the plurality of abstraction layers comprises first, second, and third abstraction layers.

4. The controller of claim 3, wherein:

the main memory comprises a memory space that corresponds to host logical block addresses (LBAs);

the first abstraction layer is configured to issue to the second abstraction layer memory access requests that include a host LBA range; and the second abstraction layer is configured map the host LBA range received from the first abstraction layer to one or more clusters of cache LBAs and to issue to the third abstraction layer memory access requests that include the cache LBA clusters.

5. The controller of claim 4, wherein:

the plurality of abstraction layers comprises a fourth abstraction layer; and the third abstraction layer is configured to map the clusters of cache LBAs to die, block, and page locations and to issue to the fourth abstraction layer memory access requests that include the die, block, and page locations.

6. The controller of claim 1, wherein:

the main memory comprises a memory space that corresponds to host logical block addresses (LBAs);

at least one of the abstraction layers comprises:

a history tracking module configured to track host read operations affecting a first host LBA;

an analysis module coupled to the history tracking module and configured to determine one or more criteria associated with the host read operations, the criteria being indicative of future read requests of second host LBA associated with the first host LBA; and a caching module coupled to the analysis module and configured to cause data of the at least the second host LBA from the main memory to be copied to the cache if the criteria meets a threshold.

7. The controller of claim 1, wherein at least one of the abstraction layers comprises:

a speculative read module configured to define a speculative address range proximate to a request address range associated with a host read request affecting the main memory, wherein speculative data stored in the speculative address range is not requested via the host read request;

an analysis module configured to determine a criterion indicative of future read requests of associated with the speculative data; and a caching module coupled to the speculative read module and configured to copy the speculative data from the main memory to the cache, the cache including at least one of a primary cache and a secondary cache, together with data of the host read request in response to the criterion meeting a threshold, the primary cache and the secondary cache mirroring respective portions of the main memory.

8. The controller of claim 1, wherein the cache comprises a primary cache and a secondary cache, and at least one of the abstraction layers is configured to cause a new segment of data to be copied to the primary cache mirroring a first portion of the main memory, the new segment of data copied in response to a read request from a host;

determine a criterion for copying data from the primary cache to the secondary cache, the secondary cache mirroring a second portion of the main memory, wherein the criterion gives higher priority to segments having addresses not yet selected for reading by the host; and in response to the new segment of data being copied into the secondary cache, copy a selected segment of data from the primary cache to the secondary cache in response to the selected segment satisfying the criterion.

9. The controller of claim 1, wherein:

the main memory comprises a memory space that corresponds to logical block addresses (LBAs) of the host processor; and at least one of the abstraction layers is configured to map clusters of host LBAs to clusters of cache LBAs, the cache LBAs corresponding to a memory space of the cache, the mapping of the host LBA clusters to the cache LBA clusters being fully associative wherein any host LBA cluster can be mapped to any cache LBA cluster.

10. A method of controlling a hybrid memory comprising a main memory and a cache for the main memory, the method comprising:

receiving incoming memory access requests from a host processor in a first abstraction layer of a hybrid memory controller, each memory access request including a range of host logical block addresses (LBAs);

implementing a first component of a cache management protocol in the first abstraction layer;

routing incoming memory access requests to a second abstraction layer, the first and second abstraction layers communicating through a software interface;

in the second abstraction layer, implementing a second component of the cache management protocol;

mapping the range of host LBAs to cache LBAs in the second abstraction layer;

transforming the incoming memory access requests to outgoing memory access requests that include the cache LBAs, wherein at least one of the abstraction layers is configured to:

receive the incoming memory access requests from the host processor, the incoming memory access requests including a range of host logical block addresses (LBAs);

route the incoming memory access requests to a set of incoming queues by implementing a priority scheme, the set of incoming queues comprising an incoming execute queue, the priority scheme comprising:

routing invalidate requests in the invalidate ready queue to the execute queue as a first highest priority;

routing read requests in the read ready queue to the execute queue as a second highest priority; and routing promotion requests in the promotion ready queue as a third highest priority; and accessing the cache using the outgoing memory access requests.

* * * * *